(12) United States Patent
Nagel

(10) Patent No.: US 9,938,603 B2
(45) Date of Patent: Apr. 10, 2018

(54) COMPOSITIONS OF MATTER: SYSTEM II

(71) Applicant: Electromagnetics Corporation, Fall River, MA (US)

(72) Inventor: Christopher J. Nagel, Wayland, MA (US)

(73) Assignee: Electromagnetics Corporation, Fall River, MA (US)

( * ) Notice: Subject to any disclaimer, the term of this patent is extended or adjusted under 35 U.S.C. 154(b) by 207 days.

(21) Appl. No.: 14/589,155

(22) Filed: Jan. 5, 2015

(65) Prior Publication Data

US 2015/0247215 A1    Sep. 3, 2015

Related U.S. Application Data

(60) Continuation of application No. 13/648,006, filed on Oct. 9, 2012, now Pat. No. 8,945,435, which is a continuation of application No. 12/640,421, filed on Dec. 17, 2009, now Pat. No. 8,308,992, which is a division of application No. 11/063,694, filed on Feb. 23, 2005, now Pat. No. 7,655,160.

(51) Int. Cl.
| | |
|---|---|
| H01B 1/02 | (2006.01) |
| C22B 15/00 | (2006.01) |
| C22F 3/00 | (2006.01) |
| C22C 9/00 | (2006.01) |
| C22B 9/16 | (2006.01) |
| C22B 9/22 | (2006.01) |
| F27D 11/06 | (2006.01) |
| F27D 11/12 | (2006.01) |

(52) U.S. Cl.
CPC ............ *C22B 15/0026* (2013.01); *C22B 9/16* (2013.01); *C22B 9/22* (2013.01); *C22B 9/221* (2013.01); *C22B 9/228* (2013.01); *C22C 9/00* (2013.01); *C22F 3/00* (2013.01); *F27D 11/06* (2013.01); *F27D 11/12* (2013.01); *H01B 1/02* (2013.01)

(58) Field of Classification Search
CPC .... H01B 1/00; H01B 1/02; F27D 7/00; F27D 7/06; F27D 11/00; C22F 1/00; C22F 3/00; C22C 2202/00
See application file for complete search history.

(56) References Cited

U.S. PATENT DOCUMENTS

| | | | |
|---|---|---|---|
| 3,960,548 A | 6/1976 | Varotto et al. | |
| 4,257,808 A | 3/1981 | Morris, Jr. et al. | |
| 4,260,008 A | 4/1981 | Kranz et al. | |
| 4,525,209 A | 6/1985 | Yamauchi et al. | |
| 5,281,939 A | 1/1994 | Juds et al. | |
| 7,167,501 B2 | 1/2007 | Roberts et al. | |
| 7,309,861 B2 | 12/2007 | Brown et al. | |
| 7,655,160 B2 * | 2/2010 | Nagel | C22C 9/00 148/559 |
| 7,848,383 B2 | 12/2010 | Roberts et al. | |
| 8,308,992 B2 * | 11/2012 | Nagel | C22C 9/00 148/559 |
| 8,945,435 B2 * | 2/2015 | Nagel | C22C 9/00 148/559 |
| 2005/0175063 A1 | 8/2005 | Roberts et al. | |
| 2006/0076484 A1 | 4/2006 | Brown et al. | |
| 2007/0147463 A1 | 6/2007 | Roberts et al. | |
| 2011/0075697 A1 | 3/2011 | Roberts et al. | |

FOREIGN PATENT DOCUMENTS

| | | |
|---|---|---|
| DE | 10009043 | 8/2000 |
| GB | 454094 | 9/1936 |
| GB | 1025234 | 10/1962 |
| GB | 2058132 | 4/1981 |
| JP | H1081595 A | 3/1998 |
| JP | 2005537627 | 12/2005 |
| JP | 2007524798 | 8/2007 |
| WO | 3206242 | 4/1992 |
| WO | 0126801 | 4/2001 |
| WO | WO 03/089676 A2 * | 10/2003 |

OTHER PUBLICATIONS

Extended European Search Report dated Jan. 2, 2017 issued in corresponding European Application No. 09824146.6.
Extended European Search Report dated Jan. 5, 2018 issued in corresponding European Application No. 11843615.3.
Japanese Office Action dated Jan. 5, 2018 issued in corresponding Japanese Application No. 2017-010786 with English translation.

* cited by examiner

*Primary Examiner* — Mark Kopec
(74) *Attorney, Agent, or Firm* — Onello & Mello, LLP

(57) ABSTRACT

The present invention relates to new compositions of matter, particularly metals and alloys, and methods of making such compositions. The new compositions of matter exhibit long-range ordering and unique electronic character.

33 Claims, No Drawings

US 9,938,603 B2

COMPOSITIONS OF MATTER: SYSTEM II

RELATED APPLICATIONS

This application is a continuation application of U.S. application Ser. No. 13/648,006, filed Oct. 9, 2012, which is a continuation application of U.S. application Ser. No. 12/640,421, filed Dec. 17, 2009 (now U.S. Pat. No. 8,308,992), which is a divisional of U.S. application Ser. No. 11/063,694, filed Feb. 23, 2005 (now U.S. Pat. No. 7,655,160). The entire teachings of the above applications are incorporated herein by reference.

BACKGROUND OF THE INVENTION

According to modern quantum theory, the chemical and physical properties of substances arise fundamentally from electrodynamic interactions. Modifying these interactions can alter electronic structures and thereby endow the elements of the periodic table and their compounds with new properties.

U.S. Pat. No. 6,572,792, which is incorporated herein by reference, to Christopher J. Nagel describes a process for modifying the electronic structure of a material and of the products that are produced by the process. For example, this patent describes metals, such as copper, cobalt, nickel, and alloys thereof, that possess novel properties, such as novel XRF patterns and magnetic properties. However, it is desired to further amplify or modify the effects achieved by the process.

SUMMARY OF THE INVENTION

The present invention relates to improved methods of modifying the electronic structure of a material. The process includes the iterative and/or cyclic addition of energy to a material.

In one embodiment, the present invention includes a method of processing a metal or an alloy of metals, comprising the steps of:
(1.) Melting the material;
(2.) Adding a carbon source to the material; and
(3.) Varying the temperature of the material between two temperatures over one or more cycles, wherein the material remains at a temperature above the melting point during the entire step.

The process can further comprise one or more of the steps, in one or more iterations or cycles:
(4.) Adding a flow of a gas (such as nitrogen, hydrogen and/or a noble gas) through the material;
(5.) Varying the temperature of the material between two temperatures over one or more cycles, wherein the material remains at a temperature above the melting point during the entire step;
(6.) Adding a carbon source to the material; and/or
(7.) Holding the material with optional gas addition.

The process in a preferred embodiment involves one or more iterations or cycles of adding energy to a material in a supersaturated state with carbon. In this embodiment, the process comprises, or further comprises, one or more of the steps, in one or more iterations or cycles:
(8.) Lowering the temperature of a molten material, wherein the material becomes supersaturated with carbon;
(9.) Varying the temperature of the material between two temperatures over one or more cycles, wherein supersaturation with carbon is maintained and the material remains at a temperature above the melting point during the entire step, optionally in the presence of gas addition during the entire step or any portion of the step (e.g., during one or more or all of the steps wherein temperature increases or decreases);
(10.) Holding the material at a selected temperature, optionally in the presence of gas addition;
(11.) Cooling the material, such that the material continues to be supersaturated with carbon and the material remains at a temperature above the melting point, optionally in the presence of gas addition; and/or
(12.) Cooling the material to room temperature, thereby obtaining a solidified manufactured material.

In one embodiment, steps 8 and 9 (or 9 and 11) are performed and repeated 1, 2, 3, 4 or more times, preferably 4 or more times.

In preferred embodiments, the improvement in the processes of the invention comprises at least one of the following:
(a) the gas or gaseous addition (e.g., nitrogen, hydrogen, and/or noble gas) is added to the material through a lance set at a level above the liquid level;
(b) at least one of the gases or gaseous additions comprises a gas mixture;
(c) at least one of the gases has been exposed to radiation;
(d) current, e.g., AC or DC current, is added to the material in a further step or during one or more of the above steps;
(e) during the cooling step, a gas is added to the material;
(f) during the cooling step, the material is quenched with water wherein the water is not stirred;
(g) at least one form of radiation has been filtered;
(h) the material is exposed to radiation in a further step or during one or more of the above steps; and/or
(i) varying the reactor power (e.g., above normal holding power) between two power levels over ½, one or more cycles.

Advantages of the present invention include a method of processing metals into new compositions of matter and producing and characterizing compositions of matter with altered physical and/or electrical properties.

DETAILED DESCRIPTION OF THE INVENTION

U.S. Pat. No. 6,572,792 to Christopher J. Nagel describes a process for modifying the electronic structure of a material and to the products that are produced by the process. For example, this patent, which is incorporated herein by reference in its entirety, describes metals, such as copper, cobalt, nickel, and alloys thereof, that are induced by the process to acquire novel properties, such as novel XRF patterns and magnetic properties. As described in that patent, electromagnetic chemistry is the science that affects the transfer and circulation of energy in many forms when induced by changes in electromagnetic energy. In empty space, a constant speed for light, independent of the frame of reference (i.e., "each ray of light moves in the coordinate system 'at rest' with the definite velocity V independent of whether this ray of light is emitted by a body at rest or a body in [uniform] motion") as advanced in "The Theory of Electrodynamics of Moving Bodies" (Einstein, 1905) implicitly embeds a discrete partition between its associated coordinate system at rest and the reference systems that are relative to it. A topological description of this partition, satisfying the postulates advanced in the above referenced paper, requires that when the electrodynamic components of matter are manipulated, discrete changes in energy exchange occur between meromorphic constructions while continuous changes in energy exchange occur along holomorphic mappings. Harmonics governing the redistribution of energy are the vehicles by which changes in (material) properties, such as the magnitude and/or the orientation, can occur. Alignment of the electrodynamic component induces effects that may result in significant changes in the underlying material species: (1) alignment of atoms with the resulting directionality of physical properties; (2) alignment of energy levels and the capability to modify harmonic structure, may establish physical properties conducive for energy transfer; (3) alignment of the electrodynamic component includes the opening of pathways for free electron flow, and; (4) alignment of electrodynamic field phase orientation.

The present invention relates to new materials and compositions of matter, and includes manufactured, or tailored, metals or alloys of metals. A "manufactured" or "tailored" metal or alloy is a metal or alloy, which exhibits a change in electronic structure, such as that seen in a fluid or adjustable XRF spectrum. The American Heritage College Dictionary, Third Edition defines "fluid" as changing or tending to change.

Metals of the present invention are generally p, d, or f block metals. Metals include transition metals such as Group 3 metals (e.g., scandium, yttrium, lanthanum), Group 4 metals (e.g., titanium, zirconium, hafnium), Group 5 metals (vanadium, niobium, tantalum), Group 6 metals (e.g., chromium, molybdenum, tungsten), Group 7 metals (e.g., manganese, technetium, rhenium), Group 8 metals (e.g., iron, ruthenium, osmium), Group 9 metals (e.g., cobalt, rhodium, iridium), Group 10 metals (nickel, palladium, platinum), Group 11 metals (e.g., copper, silver, gold), and Group 12 metals (e.g., zinc, cadmium, mercury). Metals of the present invention also include alkali metals (e.g., lithium, sodium, potassium, rubidium, and cesium) and alkaline earth metals (e.g., beryllium, magnesium, calcium, strontium, barium). Additional metals include aluminum, gallium, indium, tin, lead, boron, germanium, arsenic, antimony, tellurium, bismuth, thallium, polonium, astatine, and silicon.

The present invention also includes alloys of metals. Alloys are typically mixtures of metals. Alloys of the present invention can be formed, for example, by melting together two or more of the metals listed above. Preferred alloys include those comprised of copper, gold, and silver; tin, zinc, and lead; tin, sodium, magnesium, and potassium; iron, vanadium, chromium, and manganese; nickel, tantalum, hafnium, and tungsten; copper and ruthenium; nickel and ruthenium; cobalt and ruthenium; cobalt, vanadium and ruthenium; and nickel, vanadium and ruthenium.

The material can be added, or charged, to the reactor in a variety of forms. For example, where the material is a metal, it can be convenient to add the material as powder, flakes, pellets or ingots. The material can be charged all at once or in stages, including continuously during the initial melt or energy addition step.

The backspace of the reactor can be advantageously purged by a gas, such as a gas, as described below, or other gas. Nitrogen is a convenient gas for this purpose. In one example, a nitrogen flow is maintained throughout an entire method, such that a nitrogen pressure of about 0.4-0.6 psig or about 0.5 psig is maintained. Alternatively, other gases, such as argon may be used for such purposes.

Carbon sources of the present invention include materials that are partially, primarily, or totally comprised of carbon. Suitable carbon sources include graphite rods, graphite powder, graphite flakes, fullerenes, amorphous carbon, diamonds, natural gas, methane, ethane, propane, butane, pentane, and combinations thereof. A preferred carbon source has a high purity (<50 ppm, such as <10 ppm, preferably <5 ppm impurities). The carbon source is selected, in part, based on the system to which it is added. In one example, graphite rods and graphite flakes are added in a sequential manner. In another example, the carbon source can be added as a gas, such as through the introduction of methane.

Carbon sources can be contacted with the material for variable periods of time. The period of time the carbon source is in contact with the material is the time between adding the carbon source and removing the undissolved carbon source. The period of time can be from about 0.5 hours to about 12 hours, about 1 hour to about 10 hours, about 2 hours to about 8 hours, about 3 hours to about 6 hours, about 3.5 hours to about 4.5 hours, or about 3.9 hours to about 4.1 hours. Alternatively, the period of time can be from about 5 minutes to about 300 minutes, about 10 minutes to about 200 minutes, about 20 minutes to about 120 minutes, about 30 minutes to about 90 minutes, about 40 minutes to about 80 minutes, about 50 minutes to about 70 minutes, or about 59 minutes to about 61 minutes. As can be seen above, the process of the invention relies in part upon the cyclic, iterative and/or harmonic addition of energy to the material. In general, the carbon contact period will coincide with a cycle, series of cycles or iteration of steps.

A cycle of the present invention includes a period of time where the energy of a material is varied between a first and second selected energy endpoints with a return to the first energy endpoint. A half cycle is the completion of a single sweep or variant between a first and second energy endpoint. A full cycle is the completion of two sweeps between the first and second energy endpoints. A cyclic step refers to the repetition of two or more cycles without substantially changing the endpoints of each sweep. Iterations generally refer to the repeating of two or more steps, such as a cyclic step in combination with a cooling step.

An energy level, such as an endpoint, can often be conveniently measured by the material's (e.g., metal's) temperature and/or the degree to which a material (e.g., metal) is saturated with a second component (e.g. carbon). Over a period of time, varying the temperature involves a period of raising (or increasing) the temperature of a material (e.g., metal or alloy) and a period when the temperature of a material (e.g., metal or alloy) decreases (either passively, such as by convection or heat transfer to the surrounding environment, or actively, such as by a mechanical means or cooling, e.g., quenching). The time period of each sweep can be selected to produce a harmonic energy pattern. The time period is also, in part, dictated by the rate of heating and cooling which is practical by the equipment (e.g., induction furnace) used, the material selected and the mass of material being processed. In some experiments, a cycle comprising a 7 minute period to increase the energy level (sweep up) and a 7 minute period to decrease the energy level (sweep down) was used. However, other time periods (e.g., 2, 3, 4, 5, 6, 8, 9, 10, 20 or more minutes) can be used. Further, combinations can be used (7 minutes up and 5 minutes down). Where energy is added to a material by other means (e.g., ultraviolet or infrared radiation, current or reactor power), the time periods are not limited by the rate of heating or cooling the material.

Increasing the temperature of the metal or alloy increases the amount of carbon that can be dissolved into that metal or alloy, which therefore decreases the degree to which the metal or alloy is saturated with carbon (relative to the temperature and degree of carbon saturation when graphite saturation assemblies are removed the first time). Similarly, decreasing the temperature of the metal or alloy increases the (relative) degree to which the metal or alloy is saturated with carbon. Thus, carbon saturation levels of a material can also be used to measure or determine energy endpoints. Where the material to be modified is a non-metal (e.g., carbon, gas), the energy endpoints are better measured by temperature or associated emission spectra.

A cycle can also include, or be interrupted or ended with, a holding step. Thus, the material can be held at an energy level (as measured, for example, by the temperature or degree of carbon saturation) for a selected period of time. The holding period can be several minutes to several hours or more. In one example, the material was held for 60 minutes. In another example, the material was held for 5 minutes. More than one hold step can be incorporated into the process and can be included in an iteration of steps.

The degree to which a metal is saturated with carbon varies over the course of the process, as well as within a step. For example, the degree of carbon saturation can vary between 70% and 95% in the first cycling step, between 80% and 95% in the second cycling step, between 101% and 103% in the third cycling step, between 104% and 107% in the fourth cycling step, between 108% and 118% in the fifth cycling step, and between 114% and 118% in the sixth cycling step. It is preferred to conduct 4 or more supersaturation steps. Supersaturation is defined herein as follows:

$+n\%_{wt}$ represents the weight percent above the equilibrium saturation value of the material in its natural state. For example, $+1\%_{wt}$ represents $1\%_{wt}$ above the saturation value as defined in its natural or naturally occurring state.

$[n]_{eqsat}$ represents the equilibrium saturation of "n" in its natural state. For example, $[C]_{eqsat}$ represents the equilibrium saturation of carbon for the thermodynamic state specified (e.g., T, P, composition) when the composition is in its natural, or naturally occurring, state.

Gas, such as nitrogen, hydrogen or a noble gas, can be added during a cycle, except where it is specified that gas addition is ceased prior to that cycle. The gas provides a third body effect for the reaction facilitating energy exchange. For example, hydrogen, helium, nitrogen, neon, argon, krypton, xenon and carbon monoxide can be added. In a preferred embodiment, the gas is added as a mixture. A preferred mixture comprises argon, helium, neon and/or krypton. Preferably, at least 50%, more preferably at least 80% such as at least 90% by volume argon, helium or hydrogen is present in the mixture. Particularly preferred mixtures, by volume, include: (1) 93% argon, 5% helium and 2% neon; (2) 92% argon, 5% helium and 3% neon; (3) 95% argon and 5% helium or neon; (4) 95% helium and 5% krypton; (5) 95% nitrogen and 5% helium; (6) 97% helium and 3% neon (optionally trace amounts of krypton); (7) 97% argon and 3% neon; (8) 60% argon and 40% helium (optionally trace amounts of neon, hydrogen and/or krypton); (9) 49.5% hydrogen, 49.5% helium and 1% neon. In selecting the specific combination and concentrations of the gases, the following factors should be considered: emission profile, Hodge spectral character and required momentum/energy exchange.

In each embodiment, the gas can be added at various rates. In general, the gas is added in terms of the resulting agitation on the material and exchange with the material. As such, the gas can be added at a low rate, resulting in low agitation/exchange; at a modest, moderate or high or vigorous rate. The gases can be mixed prior to adding or added individually. Using conventional fluid dynamic scaling models and assuming a crucible size of 3.75 inches I.D., with a 14.5 inch height, holding 20 lbs of cobalt, examples of low agitation can be achieved by adding about 0.25 SLPM; modest agitation can be achieved by adding between about 1.25 SLPM; moderate agitation can be achieved by adding between about 2.5 SLPM and high agitation can be achieved agitation by adding between about 5.0 SLPM. Selecting low agitation generally results in clearly defined bubbles in a quiescent bath. High agitation generally results in a turbulent well-mixed bath. Modest and moderate agitation rates enables mixing and exchange to be adjusted between these extremes. In some instances, the rate of addition can begin at one level and be changed during the step to a different level (e.g., from a low rate to a vigorous rate). In general, it is desirable to add the gas at a rate of excess to assist in controlling the reaction and ensuring that rate limiting steps are not associated with mass transfer diffusion. Flow rates for a crucible size of 8.875 inches, with a 16.5 inch height, holding 100 lbs of copper can be determined using standard scaling techniques based on bubble size and residence time distributions to achieve similar transport phenomena.

The gas can be added to the material either below or above (including across) the surface level of the material. When the gas is added below the surface level, it can be added via injection ports from the bottom or sides of the reactor. However, it is often preferred to add the gas via a lance. The lance can be positioned to provide gas entry below the surface level, e.g. at the bottom of the reactor, midpoint or near the surface of the material. When the lance is to be submerged, it is often desirable to position the lance prior to or during the initial charging of the reactor with the material (e.g., as the reactor is being packed with metal pellets). Where the lance is not submerged, the lance can be placed to direct the gas across the surface of the material or toward at the surface. Where the gas is directed toward the material, the gas can be directed at a force that creates an indentation in the surface. The lance can be placed along the centerline of the reactor. However, it is often desirable to place the lance off center, e.g., at about two thirds radius point as measured from the center. Lance placement involves consideration of mass/energy transfer, interaction of multiple lances, and harmonic character of the reactants being added.

The material can be subjected or exposed to the gas either during the entire process or a cycle or series of cycles or alternating cycles, during the cooling step or thereafter as a post treatment step.

Superior results in controlling the reaction have been achieved by exposing at least one gas to radiation. The exposure can be applied in a continuous or batch mode. For example, the radiation source can be applied as the gas moves through a conduit for the gas source to the reactor. The conduit is preferably not opaque and is more preferably translucent or transparent. The radiation can be applied in an open or closed system. A closed system entails exposing the gas to the specified radiation in the substantial absence of other radiation sources (e.g., visible light, magnetic fields above background). This can be easily accomplished by building a black box surrounding a segment of the conduit and placing the radiation source(s) within the black box. An open system can also be employed where the radiation source(s) are not shielded from ambient light.

In yet other embodiments, the material itself can be subjected to radiation, either during or after the processes described herein. For example, a tailored metal can be subjected to radiation to further modify the properties of the metal.

The radiation sources can be selected to provide a broad range of emitted wavelengths. For example, the radiation can range from infrared to ultraviolet wavelengths. In one embodiment, examples of preferred radiation sources emit into the range of 160 nm to 1000 nm; in another embodiment, examples of preferred radiation sources emit and into the range of 180 nm to 1100 nm; and in a more preferred embodiment examples of preferred radiation sources emit into the range of 400 nm to 700 nm. The radiation can be conveniently supplied by short arc lamps, high intensity discharge lamps, pencil lamps, lasers, light emitting diodes, incandescent, fluorescent, and/or halogens for example. Examples of suitable high intensity discharge lamps include mercury vapor, sodium vapor and/or metal halide. Short arc lamps include mercury, xenon or mercury-xenon lamps. Pencil lamps include neon, argon, krypton, xenon, short wave ultraviolet, long wave ultraviolet, mercury, mercury/argon, mercury/neon, and the like. The radiation can also include (or exclude), incandescent or fluorescent light and/or natural sources of light, such as electromagnetic radiation emitted by celestial bodies.

The radiation sources can optionally be used in combination with light shields or wavelength filters. Examples of suitable shields and filters can be obtained from UVP, Inc. (Upland, Calif.). The filters and shields can direct or modify the emission output. Examples of UVP Pen-Ray Filters include the G-275 filter which absorbs visible light while transmitting ultraviolet at 254 nm and the G-278 filter which converts shortwave radiation to longwave radiation at 365 nm. Pen-Ray Shields include Shield A which has a 0.04 inch ID hole for point-like source, Shield B which has a 0.31× 0.63 inch window, and Shield C which has a 0.19×1.5 inch window. Filters and shields can also be obtained from Newport Corp. (Irvine, Calif.). The Newport 6041 Short Wave Filter absorbs visible lines; the 6042 Long Wave Conversion Filter attenuates the 253.7 nm Hg line and fluoresces from 300-400 nm; and the 6057 Glass Safety Filter absorbs the 253.7 nm Hg line and attenuates the 312.6 nm line. The Aperture Shields offered by Newport include the 6038 Pinhole Shield which has a 0.040 inch (1 mm) diameter, the 6039 Small Aperture Shield which has a 0.313×0.375 inch window and the 6040 Large Aperture Shield with a 0.188×1.50 inch window. Filters and shields can also be obtained from Edmund Industrial Optics Inc. (Barrington, N.J.). The Edmund UV Light Shield A has a 1 mm inner diameter drilled hole; Shield B has a 7.9 mm×15.9 mm aperture; and Shield C has a 4.8 mm×38.2 mm aperture.

The orientation of the lamp can also impact upon the result obtained. Thus, in the embodiment where a gas is subjected to a radiation source, the radiation source can be fixed to direct the radiation directly towards, perpendicular, away or parallel to the conduit directing the gas, or its entry or exit point. The gases can be those discussed above or other gases, such as air or oxygen. The radiation source can be positioned horizontally, vertically and/or at an angle above, below across from the conduit. For example, the base of a pencil lamp (or other radiation source) can be set at the same height of the conduit and the tip of the lamp directed or pointed toward the conduit. Alternatively, the base of the pencil lamp (or other radiation source) can be set at the height of the conduit and the lamp directed at a 30° (40°, 45°, 50°, 55°, 60°, or 90°) angle above (below) the conduit. Alternatively, the base of the pencil lamp can be fixed above or below the level of the conduit. The tip of the pencil lamp can be pointed up or down, in the direction of the gas flow or against the gas flow or at another angle with respect to any of the above. Further, more than one of the same or different pencil lamps alone or in combination with other radiation sources can be used, set at the same or different heights, orientations and angles. The lamps can be presented in alternative orders (first xenon, then mercury or vice versa).

In an embodiment wherein the material to be treated is subjected to the radiation source, similar positions can be achieved as above with respect to the gas conduit. The radiation source can be fixed to direct the radiation directly towards, perpendicular, away or parallel to the material. The radiation source can be positioned horizontally, vertically and/or at an angle above, below across from the material. As above, the base of a pencil lamp (or other radiation source) can be set at the same height of the material and the tip of the lamp directed or pointed toward the material. Alternatively, the base of the pencil lamp (or other radiation source) can be set at the height of the material and the lamp directed at a 30° (40°, 45°, 50°, 55°, 60°, or 90°) angle above (below) the material. Alternatively, the base of the pencil lamp can be fixed above or below the level of the material. The tip of the pencil lamp can be pointed up or down, in the direction of the gas flow or against the gas flow or at another angle with respect to any of the above. Further, more than one of the same or different pencil lamps alone or in combination with other radiation sources can be used, set at the same or different heights, orientations and angles.

In a preferred embodiment, the radiation source is a high intensity discharge lamp positioned to direct the radiation towards the material. The high intensity discharge lamp is combined with one or more pencil lamps positioned proximal to the high intensity discharge lamp. Often, high intensity discharge lamps are equipped with a hood or reflector to direct the radiation. In some instances, one or more pencil lamps can be placed inside and/or behind the reflector.

Further, the distance between the radiation source and the material and/or gas conduit can impact the results achieved. For example, the lamps can be placed between about 5 and 100 cm or more from the conduit and/or material. In other embodiments, the distance between the radiation source and the material and/or gas conduit can be between about 100 cm and 5 meters or more.

In other instances, the radiation can be filtered. Filters, such as colored glass filters, available from photography supply shops, for example, can be used. In yet other embodiments, the filter can be other materials, such as water, gas (air or other gas), a manufactured or tailored material, such as those materials described or made herein, or a material of selected density, chemical make-up, properties or structure. In one embodiment, the filter can be placed between the radiation source(s) and the target metal or alloy or gas used in the method. Filters can also be called "(harmonic) forcing functions." Forcing functions can be used in conjunction with electromagnetic radiation sources to affect a change in a material. In addition, gases may be injected into apparatus containing a forcing function to modify the performance of the assembly.

In one embodiment, the radiation source has an environment which is different from that of the material. This can be accomplished by directing a gas flow into the lamp environment. Where the radiation source is a pencil lamp within a box to radiate a gas, this can be accomplished by direct gas flow into the box. In other embodiments, the radiation source can be a short arc lamp or a short arc lamp assembly. In such embodiments, the gas can be introduced into the reflector proximate to the lamp. The gas includes those gases discussed above.

The radiation can be applied continuously or discontinuously (e.g. pulsed or toggled) and its intensity can be modulated. Where the radiation is applied continuously, the radiation can begin prior to introduction of the gas into the conduit or after. It can be applied for the duration of a cycle or series of cycles. Where the radiation is pulsed, the length of each pulse can be the same or different. Generally, the radiation is applied to induce harmonic change, altering the gas or target materials prior to their introduction into the reactor. This is conveniently accomplished by controlling the lamps with a computer. The factors to be considered in radiation source placement, exposure and sequence include the desired wavelength, intensity, and energy characteristics, the angle of incidence, and the harmonic profile to be injected into the targeted material (e.g. gas, metal, tailored metal, radiated gas and the like).

In some instances, the radiation source and/or pencil lamp(s) and/or filters and/or target material or gas are advantageously cooled. For example, where a high intensity discharge lamp is used in combination with a pencil lamp(s), it may be advantageous to cool the pencil lamp to prevent damage. Alternatively, where a short arc lamp is used in combination with pencil lamps and/or glass filters it may be advantageous to cool the pencil lamps to prevent damage as well as the glass filter to prevent breakage.

Other sources of energy can be used to further tailor the materials of the invention. For example, DC current can be applied continuously or the amperage varied, for example between 0-300 amps, such as 0-150 amps. AC current can be applied continuously or varied, e.g., in a wave pattern, such as a sinusoidal wave, square wave, or triangle wave pattern of a selected frequency and amplitude. Typically, 10 volts, peak to peak, is used at 0-3.5 MHz, 0-28 MHz, or 0-50 MHz. In other embodiments, the peak to peak voltage was less that about vdc, 10 vdc, 8 vdc, 7.2 vdc, 5 vdc, 1.7 vdc, and 1 vdc. In one embodiment, electrodes can be placed in the reactor, such as below the surface of the material, and current applied. As with the radiation discussed above, the current can be applied to coincide with a cycle or series of cycles or during all or a part of a single step of the process. Often the power supply is turned on prior to attachment to the electrodes to avoid any power surge impacts.

Further, the cooling step can alter the results of the process. Such cooling can include gradual and/or rapid cooling steps. Gradual cooling typically includes cooling due to heat exchange with air or other gas over 1 to 72 hours, 2 to 50 hours, 3 to 30 hours, or 8 to 72 hours. Rapid cooling, also known as quenching, typically includes an initial cooling with air or other gas to below the solidus temperature, thereby forming a solid mass, and placing the solid mass into a bath comprising a suitable fluid such as tap water, distilled water, deionized water, other forms of water, gases (as defined above), liquid nitrogen or other suitable liquified gases, a thermally-stable oil (e.g., silicone oil) or organic coolant, and combinations thereof. The bath should contain a suitable quantity of liquid at a suitable temperature, such that the desired amount of cooling occurs. The ingot can be removed from the crucible before or after completing the cooling. While the material is cooling, the environment can be stirred, mixed or agitated. This can be accomplished by maintaining a flow of coolant over the material, or agitating the cooling bath or environment. Alternatively, the coolant is not disturbed or agitated and circulation of the coolant is minimized.

In one embodiment, the material is cooled in a different vessel (cooling or quench chamber). The cooling chamber can be, for example, a polyethylene (or other plastic) container. The ingot can be placed directly, or indirectly, into the cooling vessel (e.g., in a vertical or horizontal orientation). Generally, the ingot can be placed at least about 6 inches from the inside wall of the container. The height of the coolant can be at least about 12 inches above and below the surface of the ingot. A refractory material (e.g., a ceramic block rinsed with coolant (e.g., DI water) and, optionally dried or allowed to dry) may be used to support the ingot in the quench chamber.

Where the material is cooled in a different vessel from the reactor or induction furnace, the material can be removed, manually or robotically, to a clean, protected surface. This removal may be accomplished manually using a pair of tongs (e.g. cast iron, steel, stainless steel, nickel, titanium, tungsten or other high temperature melting transition metal). Manual removal can also be accomplished by donning heavy, insulated, heat resistant gloves.

Where the crucible is removed from the reactor with the material, the crucible should be removed before or after cooling. The crucible can be removed by gently peeling it away from the material. A hammer, ram or wedge can be used to perform this function. However, care should be used to avoid striking the material hard with the hammer or otherwise causing a substantial impact upon or metal contact with the material. In one embodiment, the crucible removal can be performed in the presence of air at about 350±75° F., 750±250° F., 1100±250° F., or at $T_{solidus}-75°$ F., $T_{solidus}-5°$ F.

One example of the base method can be described in terms of carbon saturation values. After a metal or alloy is added to a suitable reactor, establish the dissolved carbon level at 70% to 95% of the equilibrium saturation of carbon for the thermodynamic state specified (e.g., T, P, composition) when the composition is in its natural state (hereinafter the equilibrium saturation of carbon is referred to as "$[C]_{eqsat}$"). Identify temperature set points for 80% and 95% $[C]_{eqsat}$. Vary the temperature between the predetermined set points, such that the temperature is decreased for 7 minutes and increased over 7 minutes per cycle, for 15 cycles. Next, establish a flow of argon. Vary the temperature between the predetermined set points, such that the temperature is decreased for 7 minutes and increased over 7 minutes per cycle, for 5 cycles; the temperature should be maintained above 70% $[C]_{eqsat}$ at all times and maintained below 95% $[C]_{eqsat}$ at all times. The carbon level is raised to saturation (i.e., $[C]_{eqsat}$) with continued argon addition. Hold for 60 minutes at saturation (i.e., $[C]_{eqsat}$) with continued argon addition. Raise the carbon level to $^+1\%_{wt}$ (i.e., $^+1\%_{wt}$ represents $1\%_{wt}$ above the saturation value as defined in its natural equilibrium state, $[C]_{eqsat}$) of $[C]_{eqsat}$ with continued argon addition and hold for 5 minutes. Vary the temperature for 20 cycles between $^+1\%_{wt}$ and $^+3\%_{wt}$ of $[C]_{eqsat}$, such that the temperature is decreased over 9 minutes and increased over 9 minutes per cycle. Cease argon addition. Cool the metal to $^+4\%_{wt}$ of $[C]_{eqsat}$. Vary the temperature for 4.5 cycles between $^+4\%_{wt}$ and $^+7\%_{wt}$ of $[C]_{eqsat}$, such that the temperature is decreased over 3 minutes and increased over 5 minutes. Argon is added as the carbon saturation increases and nitrogen is added as carbon saturation decreases. Cool the metal to obtain $^+8\%_{wt}$ with continued argon addition. Vary the temperature over 15.5 cycles between $^+8\%_{wt}$ and $^+18\%_{wt}$ of $[C]_{eqsat}$, such that the temperature is decreased over 15 minutes and increased over 15 minutes. Argon is added as the carbon saturation increases and nitrogen is added as carbon saturation decreases. After the 15.5 cycles are complete, gas addition is halted. Perform one complete cycle by varying the temperature between $^+18\%_{wt}$ to $^+14\%_{wt}$ of $[C]_{eqsat}$ (ending at $^+18\%_{wt}$), such that the temperature is increased over 15 minutes and decreased over 15 minutes. Proceed immediately to a cool down that leads to solidification. The present process also includes one or more of the further improvements described above.

Cycles of the present invention can vary in duration. The duration of a cycle can vary among cycles in a step. A cycle duration is, for example, about 2 minutes to about 90 minutes, about 3 minutes to about 67 minutes, about 5 minutes to about 45 minutes, about 8 minutes to about 30 minutes, about 10 minutes to about 20 minutes, about 14 minutes to about 18 minutes, about 7 minutes to about 9 minutes, about 13 minutes to about 15 minutes, about 17 minutes to about 19 minutes, about 28 minutes to about 32 minutes, or about 29 minutes to about 31 minutes.

A cycle can be symmetric or asymmetric. In a symmetric cycle, the period of increasing the metal or alloy temperature is equal to the period of decreasing the metal or alloy temperature. In an asymmetric cycle, the period of increasing the metal or alloy temperature is different than the period of decreasing the metal or alloy temperature. For an asymmetric cycle, the period of increasing the metal or alloy temperature can be longer than or shorter than the period of decreasing the metal or alloy temperature.

For example, in a cycle lasting about 7 minutes to about 9 minutes, the temperature can be increased for about 3 minutes and the temperature can be decreased for about 5 minutes. If the cycle lasts about 13 minutes to about 15 minutes, the temperature can be increased for about 7 minutes and the temperature can be decreased for about 7 minutes. If the cycle lasts about 17 minutes to about 19 minutes, the temperature can be increased for about 9 minutes and the temperature can be decreased for about 9 minutes. If the cycle lasts about 29 minutes to about 31 minutes, the temperature can be increased for about 15 minutes and the temperature can decreased for about 15 minutes.

The number of cycles in a step is generally an integer or half-integer value. For example, the number of cycles in a step can be one or more, one to forty, or one to twenty. The number of cycles can be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 or more. Alternatively, the number of cycles in a step can be 0.5, 1.5, 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, 20.5, 21.5, 22.5, 23.5, 24.5, 25.5, 26.5, 27.5, 28.5, 29.5, or 30.5 or more. In a step comprising a half-integer or a non-integer quantity of cycles, either heating or cooling can occur first.

After the initial heating step, the temperature of a metal or an alloy is sufficiently high, such that the temperature is equal to or greater than the solidus temperature. The solidus temperature varies depending on the metal or the alloy, and the amount of carbon dissolved therein. The temperature at the end of Step (F.) of the third paragraph of the summary is typically about 900° F. to about 3000° F., but varies from metal to metal. For example, the temperature at the end of Step (F.) can be about 1932° F. to about 2032° F., about 1957° F. to about 2007° F., or about 1932° F. to about 2467° F. for copper; about 2368° F. to about 2468° F., about 2393° F. to about 2443° F., or about 2368° F. to about 2855° F. for nickel; about 2358° F. to about 2458° F. or about 2373° F. to about 2423° F., or about 2358° F. to about 2805° F. for cobalt; about 1932° F. to about 2032° F., about 1957° F. to about 2007° F., or about 1932° F. to about 2467° F. for a copper/gold/silver alloy; about 399° F. to about 499° F., about 424° F. to about 474° F., or about 399° F. to about 932° F. for a tin/lead/zinc alloy; about 399° F. to about 499° F., about 424° F. to about 474° F., or about 399° F. to 932° F. for a tin/sodium/potassium/magnesium alloy; about 2550° F. to about 2650° F., about 2575° F. to about 2625° F., or about 2550° F. to about 2905° F. for silicon; about 2058° F. to about 2158° F., about 2073° F. to about 2123° F., or about 2058° F. to about 2855° F. for iron; about 2058° F. to about 2158° F., about 2073° F. to about 2123° F., or about 2058° F. to about 2855° F. for an iron/vanadium/chromium/manganese alloy; or 2368° F. to about 2468° F., about 2393° F. to about 2443° F., or about 2368° F. to about 2855° F. for a nickel/tantalum/hafnium/tungsten alloy.

Methods of the present invention are carried out in a suitable reactor. Suitable reactors are selected depending on the amount of metal or alloy to be processed, mode of heating, extent of heating (temperature) required, and the like. A preferred reactor in the present method is an induction furnace reactor, which is capable of operating in a frequency range of 0 Hz to about 10,000 Hz, 0 Hz to about 3,000 Hz, or 0 Hz to about 1,000 Hz. Reactors operating at lower frequencies are desirable for larger metal charges, such that a reactor operating at 0-3,000 Hz is generally suitable for 20 pound metal charges and a reactor operating at 0-1,000 Hz is generally suitable for 5000 pound metal charges.

Typically, reactors of the present method are lined with a suitable crucible and appropriately sealed from the external environment enabling very tight control of the internal chemical environment (e.g., part per thousand, part per million, or the like). Crucibles are selected, in part, based on the amount of metal or alloy to be heated and the temperature of the method. Crucibles selected for the present method typically have a capacity from about five pounds to about five tons. One preferred crucible is comprised of 89.07% $Al_2O_3$, 10.37% $SiO_2$, 0.16% $TiO_2$, 0.15% $Fe_2O_3$, 0.03% CaO, 0.01% MgO, 0.02% $Na_2O_3$, and 0.02% $K_2O$, and has a 9 inch outside diameter, a 7.75 inch inside diameter, and a 14 inch depth. A second preferred crucible is comprised of 99.68% $Al_2O_3$, 0.07% $SiO_2$, 0.08% $Fe_2O_3$, 0.04% CaO, and 0.12% $Na_2O_3$, and has a 4.5 inch outside diameter, a 3.75 inch inside diameter and a 10 inch depth.

A new composition of matter of the present invention can manifest itself as a transient, adjustable, or permanent change in energy and/or associated properties, as broadly defined. Property change can be exhibited as or comprise a change in: (1) structural atomic character (e.g., XES/XRF peak creation, peak fluidity, peak intensity, peak centroid, peak profile or shape as a function of material/sample orientation, atomic energy level(s), and TEM, STM, MFM scans); (2) electronic character (e.g., SQUID, scanning SQUID, scanning magnetoresistive microscopy, scanning magnetic microscope, magnetometer, non-contact MFM, electron electromagnetic interactions, quantum (or topological) order[1, 2], quantum entanglement[3], Jahn-Teller effect, ground state effects, electromagnetic field position/orientation, energy gradients, Hall effect, voltage, capacitance, voltage decay rate, voltage gradient, voltage signature including slope of decay and/or change of slope decay, voltage magnitude, voltage orientation); (3) structural molecular or atomic character (e.g., SEM, TEM, STM, AFM, LFM, and MFM scans, optical microscopy images, and structural orientation, ordering, long range alignment/ordering, anisotropy); (4) physical constants (e.g., color, crystalline form, specific rotation, emissivity, melting point, boiling point, density, refractive index, solubility, hardness, surface tension, dielectric, magnetic susceptibility, coefficient of friction, x-ray wavelengths); (5) physical properties (e.g., mechanical, chemical, electrical, thermal, engineering, and the like); and, (6) other changes that differentiate naturally occurring materials from manufactured materials created by inducing a change in matter.

A preferred analytical method is x-ray fluorescence spectrometry. X-ray fluorescence spectrometry is described in "X-Ray Fluorescence Spectrometry", by George J. Havrilla in "Handbook of Instrumental Techniques for Analytical Chemistry," Frank A. Settle, Ed., Prentice-Hall, Inc: 1997, which is incorporated herein by reference. XRF spectrometry is a well-known and long-practiced method, which has been used to detect and quantify or semi-quantify the elemental composition (for elements with $Z \geq 11$) of solid and liquid samples. This technique benefits from minimal sample preparation, wide dynamic range, and being nondestructive. Typically, XRF data are not dependent on which dimension (e.g., axial or radial) of a sample was analyzed. Accuracy of less than 1% error can generally be achieved with XRF spectrometry, and the technique can have detection limits of parts per million.

XRF spectrometry first involves exciting an atom, such that an inner shell electron is ejected. Upon ejection of an electron, an outer shell electron will "drop" down into the lower-energy position of the ejected inner shell electron. When the outer shell electron "drops" into the lower-energy inner shell, x-ray energy is released. Typically, an electron is ejected from the K, L, or M shell and is replaced by an electron from the L, M, or N shell. Because there are numerous combinations of ejections and replacements possible for any given element, x-rays of several energies are emitted during a typical XRF experiment. Therefore, each element in the Periodic Table has a standard pattern of x-ray emissions after being excited by a sufficiently energetic source, since each such element has its own characteristic electronic state. By matching a pattern of emitted x-ray energies to values found in tables, such as those on pages 10-233 to 10-271 of "Handbook of Chemistry and Physics, $73^{rd}$ Edition," edited by D. R. Lide, CRC Press, 1992, which is incorporated herein by reference, one can identify which elements are present in a sample. In addition, the intensity of the emitted x-rays allows one to quantify the amount of an element in a sample.

There are two standard variations of the XRF technique. First, as an energy-dispersive method (EDXRF), the XRF technique uses a detector such as a Si(Li) detector, capable of simultaneously measuring the energy and intensity of x-ray photons from an array of elements. EDXRF is well-suited for rapid acquisition of data to determine gross elemental composition. Typically, the detection limits for EDXRF are in the range of tens to hundreds of parts-per-million. A wavelength-dispersive technique (WDXRF) is generally better-suited for analyses requiring high accuracy and precision. WDXRF uses a crystal to disperse emitted x-rays, based on Bragg's Law. Natural crystals, such as lithium fluoride and germanium, are commonly used for high-energy (short wavelength) x-rays, while synthetic crystals are commonly used for low-energy (longer wavelength) x-rays. Crystals are chosen, in part, to achieve desired resolution, so that x-rays of different energies are dispersed to distinguishable $2\theta$ angles. WDXRF can either measure x-rays sequentially, such that a WDXRF instrument will step through a range of $2\theta$ angles in recording a spectrum, or there will be detectors positioned at multiple $2\theta$ angles, allowing for more rapid analysis of a sample. Detectors for WDXRF commonly include gas ionization and scintillation detectors. A further description of the use of WDXRF technique in the present invention can be found in Example 1. Results from EDXRF and results from WDXRF can be compared by determining the relationship between a $2\theta$ angle and the wavelength of the corresponding x-ray (e.g., using Bragg's Law) and converting the wavelength into energy (e.g., energy equals the reciprocal of the wavelength multiplied by Planck's constant and the velocity of light).

Analysis of emitted x-rays can be carried out automatically or semi-automatically, such as by using a software package (e.g., UniQuant, which is sold by Omega Data Systems BV, Veldhoven, The Netherlands) for either EDXRF or WDXRF. UniQuant is used for standard-less, semi-quantitative to quantitative XRF analysis using the intensities measured by a sequential x-ray spectrometer. The software package unifies all types of samples into one analytical program. The UniQuant software program is highly effective for analyzing samples for which no standards are available. Sample preparation is usually minimal or not required at all. Samples can be of very different natures, sizes and shapes. Elements from fluorine or sodium up to uranium, or their oxide compounds, can be analyzed in samples such as a piece of glass, a screw, metal drillings, lubricating oil, loose fly ash powder, polymers, phosphoric acid, thin layers on a substrate, soil, paint, the year rings of trees, and, in general, those samples for which no standards are available. The reporting is in weight % along with an estimated error for each element.

In software packages such as UniQuant, an XRF spectrum is composed of data channels. Each data channel corresponds to an energy range and contains information about the number of x-rays emitted at that energy. The data channels can be combined into one coherent plot to show the number or intensity of emitted x-rays versus energy or $2\theta$ angle (the $2\theta$ angle is related to the wavelength of an x-ray), such that the plot will show a series of peaks. An analysis of the peaks by one skilled in the art or the software package can identify the correspondence between the experimentally-determined peaks and the previously-determined peaks of individual elements. For an element, peak location (i.e., the centroid of the peak with respect to energy or $2\theta$ angle), peak profile/shape, peak creation, and peak fluidity would be expected to be essentially the same, within experimental error, for any sample containing the element. If the same quantity of an element is present in two samples, intensity will also be essentially the same, excepting experimental error and matrix effects.

A typical software package is programmed to correlate certain data channels with the emitted x-rays of elements. Quantification of the intensity of emitted x-rays is accomplished by integrating the XRF spectrum over a number of data channels. Based on the measured intensities and the previously-compiled data on elements, the software package will integrate over all data channels, correlate the emitted x-ray intensities, and will then calculate the relative abundance or quantity of elements which appear to be present in a sample, based upon comparison to the standards. Composition of matter changes produced by the present invention will generally be characterized by an XRF spectrum that reports: (1) the presence of an element which was not present in the starting material and was not added during the process; (2) an increased amount of an element that was not added to the process in the amount measured; or, (3) a decreased amount of an element that was not removed during the process in the amount indicated. Examples of (3) include a reduction in identifiable spectra referencing the sum before normalization and/or reappearance of an element upon combustion. Products of the present invention can also be characterized by the difference between XRF Uniquant analysis such as by burning the sample (e.g., LECO analysis), described in more detail below.

A "LECO" analysis is meant to include an analysis conducted by the CS-300 Carbon/Sulfur determinator supplied by a LECO computer. The CS-300 Carbon/Sulfur determinator is a microprocessor based, software driven instrument for measurement of carbon and sulfur content in metals, ores, ceramics and other inorganic materials.

Analysis begins by weighing out a sample (1 g nominal) into a ceramic crucible on a balance. Accelerator material is added, the crucible is placed on the loading pedestal, and the ANALYZE key is pressed. Furnace closure is performed automatically, then the combustion chamber is purged with oxygen to drive off residual atmospheric gases. After purging, oxygen flow through the system is restored and the induction furnace is turned on. The inductive elements of the sample and accelerator couple with the high frequency field of the furnace. The pure oxygen environment and the heat generated by this coupling cause the sample to combust. During combustion all elements of the sample oxidize. Carbon bearing elements are reduced, releasing the carbon, which immediately binds with the oxygen to form CO and $CO_2$, the majority being $CO_2$. Also, sulfur bearing elements are reduced, releasing sulfur, which binds with oxygen to form $SO_2$.

Sample gases are swept in the carrier stream. Sulfur is measured as sulfur dioxide in the first IR cell. A small amount of carbon monoxide is converted to carbon dioxide in the catalytic heater assembly while sulfur trioxide is removed from the system in a cellulose filter. Carbon is measured as carbon dioxide in the IR cells, as gases flow trough the IR cells.

Ideally, the relative abundances will total 100% prior to normalization. However, for a variety of reasons, such as improper or insufficient calibration, and/or non-planar sample surface the relative abundances will not total 100% prior to normalization. Another reason that the relative abundances of elements do not total 100% prior to normalization is that a portion of the XRF spectrum falls outside of the data channels that the software package correlates with an element (i.e., a portion of the XRF spectrum is not recognized as belonging to an element and is not included in the relative abundance calculation). In this case, the relative abundances will likely total less than 100% prior to normalization. Further, the samples will often have anisotropic characteristics whereby an axial scan is distinct from a radial scan. Thus, products of the invention may be characterized by an XRF spectrum that is not recognized by the Uniquant software (e.g., sum of known concentrations before normalization is less than 100%) described herein in an amount, for example, of less than 98%, such as less than 90%, such as less than 80%. In additional embodiments, the software package reports or detects one or more elements not detected by other methods or are detected in different quantities.

X-ray emission spectrometry (XES), a technique analogous to XRF, also provides electronic information about elements. In XES, a lower-energy source is used to eject electrons from a sample, such that only the surface (to several micrometers) of the sample is analyzed. Similar to XRF, a series of peaks is generated, which corresponds to outer shell electrons replacing ejected inner shell electrons. The peak shape, peak fluidity, peak creation, peak intensity, peak centroid, and peak profile are expected to be essentially the same, within experimental error and matrix effects, for two samples having the same composition.

Thus, XES analysis of the control standard compared to the atomically altered (i.e., manufactured or tailored) state can also be analyzed. Manufactured copper in the axial direction exhibits similar composition to natural copper (i.e., 99.98%$_{wt}$), but radial scans exhibit new peaks in the region close to naturally occurring S, Cl, and K. The shifting centroid of the observed peaks from the natural species (i.e., S, Cl, and K) confirms electronic change in the atomic state of the base element. Conventional chemical analysis performed using a LECO (IR) analyzer to detect $SO_x$ in the vapor phase post sample combustion confirmed the absence of sulfur at XES lower detection limits.

Non-contact, magnetic force microscopy image or scanning tunneling microscopy (STM) scan can also confirm the production of a new composition of matter or manufactured or tailored material, identified by an altered and aligned electromagnetic network. Individually, and from differing vantage points, these scans show the outline of the changed electromagnetic energy network.

New compositions of matter can be electronically modified to induce long range ordering/alignment. Optical microscopy and SEM imaging of the material verifies the degree and extent of long range ordering achieved.

Non-contact, magnetic force microscopy image or scanning tunneling microscopy (STM) scans can also confirm the production of a new composition of matter or manufactured or tailored material, identified by an altered and aligned electromagnetic network. Individually, and from differing vantage points, these scans can show the outline of the changed electromagnetic energy network. Non-contact MFM imaging can show that products of the invention often possess clear pattern repetition and intensity of the manufactured material when compared to the natural material, or starting material. Products of the invention can be characterized by the presence of magnetic properties in high purity, non-magnetic metals, such as elemental copper (e.g., 99.98%$_{wt}$).

Products can also be characterized by color changes. The variation in color of copper products ranged from black, copper, gold, silver and red. Other visual variations included translucency and near transparency at regions. While not being bound by theory, the alteration of copper's electronic state along the continuum enables the new composition of matter's color to be adjusted along the continuum.

In several examples of the present invention, the ingots obtained by the process possess a substantial internal void and absence of a crown of material on the top surface. In other examples of the invention, the ingot is characterized by essentially no void, with a crown of material on the top.

Other products of the processes are characterized by changes in hardness. The variation in diamond pyramid hardness between different manufactured copper samples ranged from about 25 to 90 (or 3 to 9 times higher than natural copper). Hardness change can be anisotropic.

The operations described in the embodiments presented herein did not result merely from empirical explorations. Rather, guidance was obtained from theoretical considerations regarding the topological aspects of electrodynamics. These enabled specification of the range and duration of temperature cycles, the selection of specific combinations and concentrations of gases to be used, geometric factors affecting the lance placement, and all other chief features of the experimental protocols. While not being bound by theory, the Applicant believes the application of topological principles[4, 5, 6, 7, 8, 9, 10] when applied to electrodynamics provides a powerful means for altering the properties of materials.

As noted in U.S. Ser. No. 09/416,720, the theoretical analysis can be formulated in terms of an allowed set of mathematical poles, defined as the zurn operator, and further characterized by the set of mathematical poles coalesced, defined as the isozurn value. Adjusting or manipulating the zurn causes the isozurn value to differ from its starting or naturally occurring value, thereby modifying the electronic structure from that of the natural state.

The products produced by the process have utilities readily apparent to those skilled in the art. Indeed, materials which comprise metals can be used to manufacture products having adjustable chemical properties (e.g., regioselectivity, regiospecificity, or reaction rate), electronic properties (e.g., band gap, susceptibility, resistivity, or magnetism), mechanical properties (e.g., ductility or hardness) and/or optical properties (e.g., color).

The invention further relates to the apparatus used to produce the materials. The apparatus of the invention includes a reactor comprising an induction furnace characterized by a gas source and at least one radiation source arranged to expose the gas and/or the contents of the reactor, in the manner discussed above, optional filters and optional environmental controls. As such, the invention includes an apparatus comprising a combination of the following: (a) a first and a second pencil lamp; (b) at least one short arc lamp within a housing; (c) a gas source proximal to (d) and an induction furnace.

In one embodiment, the radiation source is proximate to a gas source which is adapted to control the environment of the radiation source. In another embodiment, the short arc lamp housing further comprises at least one pencil lamp, such as those discussed above. In another embodiment, the apparatus further comprises a filter, such as those described herein.

EXEMPLIFICATION

Example 1

Experimental Procedure for Copper Method "AB" RUN 14-03-02

A cylindrical alumina-based crucible (99.68% $Al_2O_3$, 0.07% $SiO_2$, 0.08% $Fe_2O_3$, 0.04% CaO, 0.12% $Na_2O_3$; 4.5 inches O.D.×3.75 inches I.D.×14.5 inches depth) of a 100 pound induction furnace reactor (Inductotherm) fitted with a 73-30R Powertrak power supply was charged with 9080 g copper (99.98% purity) through its charging port. Prior to charging a gas addition lance was placed inside the reactor at the reactor centerline and placed two inches from the bottom of the bath. The reactor was fitted with a graphite cap and a ceramic liner (i.e., the crucible, from Engineering Ceramics). During the entire procedure, a slight positive pressure of 97% argon and 3% hydrogen (~0.5 psig) was maintained in the reactor using a continuous backspace purge. The reactor was heated to the metal charge liquidus point plus at least 300° F., at a rate no greater than 300° F./hr, as limited by the integrity of the crucible. The induction furnace operated in the frequency range of 0 Hz to 3000 Hz, with frequency determined by a temperature-controlled feedback loop implementing an Omega Model CN3000 temperature controller. The temperature was increased to 2462° F. again using a rate no greater than 300° F./hour. When this temperature was reached, graphite saturation assemblies (⅜ inches OD, 36 inches long high purity (<5 ppm impurities) graphite rods) were inserted to the bottom of the copper charge through ports located in the top plate. The copper was held at 2462° F. for 2 hours. Every 30 minutes during the hold period, an attempt was made to lower the graphite saturation assemblies as dissolution occurred. As the copper became saturated with carbon, the graphite saturation assemblies were consumed. After the 2-hour hold period was complete, the graphite saturation assemblies were removed.

The reactor temperature was increased to 2515° F. over 7 minutes. The temperature was then varied between 2476° F. and 2515° F. for 16.5 cycles. Each cycle consisted of raising the temperature continuously over 7 minutes and lowering the temperature continuously over 7 minutes. After the 15 cycles were completed, the gas flow rate was started in a bypass mode at a rate of 0.3 L/min of 97% argon and 3% neon (all gas compositions are constant unless stated otherwise). Five minutes into the $15.5^{th}$ cycle, a xenon radiation source is activated within the sealed enclosure. At 6 minutes into the $15.5^{th}$ cycle, a long wave ultraviolet radiation source was activated in the sealed enclosure. At sweep count 15.5, the gas flow was redirected to direct bath addition. At sweep count 16, a short wave ultraviolet radiation source was initiated in the sealed enclosure. At sweep count 16.5, the xenon radiation source was remotely rotated within the sealed enclosure. The temperature of the copper was varied over another 5 cycles between 2476° F. and 2515° F. After the fifth cycle, the reactor temperature was lowered to 2462° F. over a 10-minute period.

The graphite saturation assemblies were reinstalled in the copper and remained there for 1 hour. The graphite saturation assemblies were removed. The reactor temperature was lowered to 2459° F. over 5 minutes. The reactor was held at this temperature for 5 minutes with continued gas addition. The temperature was then varied between 2453° F. and 2459° F. over 20 cycles. Each cycle consisted of lowering the temperature continuously over 9 minutes and raising the temperature continuously over 9 minutes. After the $20^{th}$ cycle, third body addition (gas addition) was changed to a flow rate of 9 mL/min of 100% neon. The bath was then cooled to 2450° F. over 10 minutes.

The temperature was then varied between 2441° F. and 2450° F. over 4.5 cycles. Each cycle consisted of lowering the temperature continuously over 5 minutes and raising the temperature continuously over 3 minutes. In addition, while raising the temperature, a 0.15 L/min flow of 40% helium, 60% argon and trace neon was added, and while lowering the temperature, a 0.3 L/min flow of 40% argon, 60% helium, trace neon, trace hydrogen, and trace krypton was added. After the 4.5 cycles, the short wave radiation source within the sealed enclosure was terminated. The reactor temperature was then lowered to 2438° F. over 1 minute. The temperature was varied between 2406° F. and 2438° F. for 15.5 cycles. Each cycle consisted of lowering the temperature continuously over 15 minutes and raising the temperature continuously over 15 minutes. In addition, while raising the temperature, a 0.15 L/min flow of 40% helium, 60% argon and trace neon was added, and while lowering the temperature, a 0.3 L/min flow of 40% argon, 60% helium, trace neon, trace hydrogen, and trace krypton was added. After the final cycle (sweep), gas flow was changed to trace neon only.

The temperature was then varied between 2419° F. and 2406° F. for one cycle. The cycle consisted of raising the temperature continuously over 15 minutes and lowering the temperature continuously over 15 minutes. At the completion of this temperature sweep, the reactor temperature was lowered to $T_{solidus}$ plus 11° F. over 45 minutes.

Upon reaching $T_{solidus}$ plus 11° F., gas addition was changed to 0.3 L/min of 100% hydrogen and trace neon and held for five minutes. The reactor was then cooled to $T_{solidus}$ plus 10° F. over five minutes. Upon reaching $T_{solidus}$ plus 10° F., the gas addition lance was relocated into the headspace of the reactor, such that a quarter inch (¼ inches) dimple could be observed on the bath surface. The bath was held at $T_{solidus}$ plus 10° F. for an additional 5 minutes for conditioning and equilibrization. The reactor was then cooled to $T_{solidus}$ plus 8° F. while maintaining a temperature lowering rate of no more than 3° F./hr. Upon reaching $T_{solidus}$ plus 8° F. a manual power pulse of 2 kW was introduced with a single continuous up/down sweep from normal holding power. The reactor was then cooled to $T_{solidus}$ plus 2° F. while maintaining a temperature lowering rate of no more than 3° F./hr. Upon reaching $T_{solidus}$ plus 2° F. a manual power pulse of 1.5 kW was introduced with a single continuous up/down sweep from normal holding power. Furthermore, immediately following the manual power pulse the gas flow rate was changed to 0.15 L/min of 49.5% hydrogen, 49.5% helium and 1% neon. The reactor was then cooled to $T_{solidus}$ again maintaining a temperature-lowering rate of no more than 3° F./hr. Upon reaching $T_{solidus}$, the reactor temperature was lowered to $T_{solidus}$ minus 75° F. over five hours. Upon reaching $T_{solidus}$ minus 75° F., the flow rate was changed to 30 ml/min of 60% helium, 40% hydrogen and trace neon. The induction furnace power supply was then lowered to 0.75 kW and the reactor was allowed to cool to 1000° F. Upon reaching 1000° F., the flow rate was changed to 30 ml/min of 100% helium and trace neon. The induction furnace power supply was lowered to 0.50 kW and the reactor was allowed to cool to 350° F. Upon reaching 350° F., the induction furnace power supply was shut down. A timer was initiated. At a time of 5 minutes, the long wave radiation source within the sealed enclosure was terminated. At a time of 9 minutes, the xenon radiation source within the sealed enclosure was terminated. At a time of 15 minutes, the trace neon gas addition was terminated. At a time of 30 minutes, the helium gas addition was terminated. At a time of 45 minutes, the ingot and crucible were removed from the reactor in the presence of radiation sources (metal halide light sources) utilizing tongs.

Upon removal, the crucible was stripped from the metal ingot via a gentle wedging action. Immediately following removal, the ingot was transferred into a quench chamber containing water, ensuring that the top of the ingot surface was covered by at least 6 inches of water. The ingot was allowed to stay in the quench vessel for 6 hours prior to its removal from the quench vessel.

Note: An identical experimental program except for the use of pencil lamps—which provided a source of electromagnetic radiation to the third-body gases—was also performed verifying the efficacy of the improved process (See 14-03-03 in Table 1 and attending discussions).

Example 2

Experimental Procedure for Copper Method "HA" RUN 14-02-06

A cylindrical alumina-based crucible (99.68% $Al_2O_3$, 0.07% $SiO_2$, 0.08% $Fe_2O_3$, 0.04% CaO, 0.12% $Na_2O_3$; 4.5 inches O.D.×3.75 inches I.D.×14.5 inches depth) of a 100 pound induction furnace reactor (Inductortherm) fitted with a 73-30R Powertrak power supply was charged with 9080 g copper (99.98% purity) through its charging port. The reactor was fitted with a graphite cap and a ceramic liner (i.e., the crucible, from Engineering Ceramics). During the entire procedure, a slight positive pressure of nitrogen (~0.5 psig) was maintained in the reactor using a continuous backspace purge. The reactor was heated to the metal charge liquidus point plus at least 300° F., at a rate no greater than 300° F./hr, as limited by the integrity of the crucible. The induction furnace operated in the frequency range of 0 Hz to 3000 Hz, with frequency determined by a temperature-controlled feedback loop implementing an Omega Model CN3000 temperature controller. The temperature was increased to 2462° F. again using a rate no greater than 300° F./hour. When this temperature was reached, graphite saturation assemblies (⅜ inch OD, 36 inch long high purity (<5 ppm impurities) graphite rods) were inserted to the bottom of the copper charge through ports located in the top plate. The copper was held at 2462° F. for 2 hours. Every 30 minutes during the hold period, an attempt was made to lower the graphite saturation assemblies as dissolution occurred. As the copper became saturated with carbon, the graphite saturation assemblies were consumed. After the 2 hour hold period was complete, the graphite saturation assemblies were removed.

The reactor temperature was increased to 2539° F. over 14 minutes. At this point, a gas addition lance was lowered into the molten metal to a position approximately 2 inches from the bottom of the reactor and a 4.8 L/min flow of gas was begun. The gas composition was 92% argon, 3% neon, and 5% helium. The temperature was then lowered to 2515° F. over 10 minutes. Flow rate was then lowered to 2.4 L/min with the same ratio of gases (argon, neon, and helium). The temperature was then varied between 2476° F. and 2515° F. for 15 cycles. Each cycle consisted of raising the temperature continuously over 7 minutes and lowering the temperature continuously over 7 minutes. After the 15 cycles were completed, the gas flow rate was altered again to 1.4 L/min (all gas compositions are constant unless stated otherwise). The temperature of the copper was varied over another 5 cycles between 2476° F. and 2515° F. After the fifth cycle, the reactor temperature was lowered to 2462° F. over a 30 minute period with a lowered gas addition rate of 0.8 L/min.

The graphite saturation assemblies were reinstalled in the copper and remained there for 1 hour. The graphite saturation assemblies were removed. Flow rate was increased to 1.2 L/min. The reactor temperature was lowered to 2459° F. over 5 minutes. The reactor was held at this temperature for 5 minutes with continued gas addition. The temperature was then varied between 2453° F. and 2459° F. over 20 cycles. Each cycle consisted of lowering the temperature continuously over 9 minutes and raising the temperature continuously over 9 minutes. During the temperature lowering portion of the cycle, gas addition was at the rate of 1.4 L/min with a gas composition of 95% argon, 3% neon, 2% krypton. During the temperature increasing portion of the cycle, gas addition was at the rate of 2.8 L/min with a gas composition of 95% argon, 5% neon. After the $20^{th}$ cycle, third body addition (gas addition) was changed to a flow rate of 0.15 L/min with a gas composition of 95% helium, 5% krypton. The bath was then cooled to 2450° F. over 13 minutes.

The temperature was then varied between 2441° F. and 2450° F. over 4.5 cycles. Each cycle consisted of lowering the temperature continuously over 5 minutes and raising the temperature continuously over 3 minutes. In addition, while raising the temperature, a 1.2 L/min flow of 95% helium, 5% krypton was added, and while lowering the temperature, a 2.4 L/min flow of 95% argon, 5% neon was added. After the 4.5 cycles, the reactor temperature was lowered to 2438° F. over 1 minute. The temperature was varied between 2406° F. and 2438° F. for 15.5 cycles. Each cycle consisted of lowering the temperature continuously over 15 minutes and raising the temperature continuously over 15 minutes. In addition, while raising the temperature, a 1.2 L/min flow of 95% nitrogen, 5% helium was added, and while lowering the temperature, a 2.4 L/min flow of 95% argon, 5% neon was added. After the final cycle (sweep), gas flow was changed to 0.15 L/min with a gas composition of 95% helium, 5% argon. The reactor was then held for 16 minutes at 2406° F.

The temperature was then varied between 2419° F. and 2406° F. for one cycle. The cycle consisted of raising the temperature continuously over 15 minutes and lowering the temperature continuously over 15 minutes. In addition, while raising the temperature, a 2.4 L/min flow of 95% helium, 5% argon was added, and while lowering the temperature, a 1.2 L/min flow of 95% argon, 5% nitrogen was added. At the completion of this temperature sweep, the reactor temperature was lowered to $T_{solidus}$ plus 10° F.

The gas addition lance was relocated into the headspace of the reactor, such that a quarter inch (¼ inches) dimple could be observed on the bath surface (1.2 L/min flow of 95% argon, 5% nitrogen). The bath was held at $T_{solidus}$ plus 10° F. for an additional 5 minutes for conditioning and equilibrization. The reactor was then cooled to $T_{solidus}$ plus 8° F. while maintaining a temperature lowering rate of no more than 3° F./hr. Upon reaching $T_{solidus}$ plus 8° F. a manual power pulse of 2 kW was introduced with a single continuous up/down sweep from normal holding power. The reactor was then cooled to $T_{solidus}$ plus 2° F. while maintaining a temperature lowering rate of no more than 3° F./hr. Upon reaching $T_{solidus}$ plus 2° F. a manual power pulse of 1.5 kW was introduced with a single continuous up/down sweep from normal holding power. The reactor was then cooled to $T_{solidus}$ again maintaining a temperature lowering rate of no more than 3° F./hr. Upon reaching $T_{solidus}$, the induction furnace power supply was lowered to 1 kW and the reactor was allowed to cool from $T_{solidus}$ to $T_{solidus}$ minus 20° F. Upon reaching $T_{solidus}$ minus 20° F., the induction furnace power supply was lowered to 0.75 kW and the reactor was allowed to cool to 1000° F. Upon reaching 1000° F., the induction furnace power supply was lowered to 0.50 kW and the reactor was allowed to cool to 350° F. Immediately after setting the power to 0.5 kW, the gas flow rate was changed to 0.15 L/min with a gas composition of 95% argon, 5% nitrogen. Upon reaching 350° F., the induction furnace power supply was shut down. Thirty minutes were allowed to pass. The ingot and crucible were removed from the reactor using titanium metal tongs in the presence of light supplied by metal halide ceiling lamps.

Upon removal, the crucible was stripped from the metal ingot via a gentle wedging action. Immediately following removal, the ingot was transferred into a quench chamber containing deionized water, ensuring that the top of the ingot surface was covered by at least 6 inches of DI water. Upon entrance into the quench chamber, a timer was established. At a time of 10 hours and 30 minutes, the ingot was removed from the quench system using the titanium metal tongs and transferred to a clean surface. Exposure to external radiation sources included the metal halide light and placement directly under a skylight (which added filtered sunlight to the irradiation sources). The timer was then reset to zero. The ingot was irradiated for 10 minutes at which point an additional radiation source (krypton lamp) was initiated. At 18 minutes, two orthogonal fluorescent lamp racks were turned on. At 30 minutes, two angled metal halide lights were simultaneously turned on. At this point the timer was again reset. At a time of 6 hours, the krypton lamp, two orthogonal fluorescent lamp racks, and the two angled metal halide lights were sequentially turned off. The timer was again reset to zero. At a time of 6 hours, 30 minutes, normal lab lighting (metal halides) was turned off. The timer was reset to zero. For 48 hours, the ingot was allowed to stabilize with no manual intervention (i.e., no handling).

Example 3

Experimental Procedure for Aluminium Method "HA" RUN 14-04-02

A cylindrical alumina-based crucible (99.68% $Al_2O_3$, 0.07% $SiO_2$, 0.08% $Fe_2O_3$, 0.04% CaO, 0.12% $Na_2O_3$; 4.5 inches O.D.×3.75 inches I.D.×14.5 inches depth) of a 100 pound induction furnace reactor (Inductortherm) fitted with a 73-30R Powertrak power supply was charged with 4540 g Aluminum (99.99% purity) through its charging port. The reactor was fitted with a graphite cap and a ceramic liner (i.e., the crucible, from Engineering Ceramics). During the entire procedure, a slight positive pressure of nitrogen (~0.5 psig) was maintained in the reactor using a continuous backspace purge. The reactor was heated to the metal charge liquidus point plus at least 300° F., at a rate no greater than 300° F./hr, as limited by the integrity of the crucible. The induction furnace operated in the frequency range of 0 Hz to 3000 Hz, with frequency determined by a temperature-controlled feedback loop implementing an Omega Model CN3000 temperature controller. The temperature was increased to 1650° F. again using a rate no greater than 300° F./hour. When this temperature was reached, graphite saturation assemblies (⅜ inch OD, 36 inch long high purity (<5 ppm impurities) graphite rods) were inserted to the bottom of the aluminum charge through ports located in the top plate. The aluminum was held at 1650° F. for 2 hours. Every 30 minutes during the hold period, an attempt was made to lower the graphite saturation assemblies as dissolution occurred. As the aluminum became saturated with carbon, the graphite saturation assemblies were consumed. After the 2 hour hold period was complete, the graphite saturation assemblies were removed.

The reactor temperature was increased to 1690° F. over 14 minutes. At this point, a gas addition lance was lowered into the molten metal to a position approximately 2 inches from the bottom of the reactor and a 4.8 L/min flow of gas was begun. The gas composition was 92% argon, 3% neon, and 5% helium. The temperature was then lowered to 1678° F. over 10 minutes. Flow rate was then lowered to 2.4 L/min with the same ratio of gases (argon, neon, and helium). The temperature was then varied between 1657° F. and 1678° F. for 15 cycles. Each cycle consisted of raising the temperature continuously over 7 minutes and lowering the temperature continuously over 7 minutes. After the 15 cycles were completed, the gas flow rate was altered again to 1.4 L/min (all gas compositions are constant unless stated otherwise). The temperature of the aluminum was varied over another 5 cycles between 1657° F. and 1678° F. After the fifth cycle, the reactor temperature was lowered to 1650° F. over a 30 minute period with a lowered gas addition rate of 0.8 L/min.

The graphite saturation assemblies were reinstalled in the aluminum and remained there for 1 hour. The graphite saturation assemblies were removed. Flow rate was increased to 1.2 L/min. The reactor temperature was lowered to 1648° F. over 5 minutes. The reactor was held at this temperature for 5 minutes with continued gas addition. The temperature was then varied between 1646° F. and 1644° F. over 20 cycles. Each cycle consisted of lowering the temperature continuously over 9 minutes and raising the temperature continuously over 9 minutes. During the temperature lowering portion of the cycle, gas addition was at the rate of 1.4 L/min with a gas composition of 95% argon, 3% neon, 2% krypton. During the temperature increasing portion of the cycle, gas addition was at the rate of 2.8 L/min with a gas composition of 95% argon, 5% neon. After the 20$^{th}$ cycle, third body addition (gas addition) was changed to a flow rate of 0.15 L/min with a gas composition of 95% helium, 5% krypton. The bath was then cooled to 1643° F. over 13 minutes.

The temperature was then varied between 1639° F. and 1643° F. over 4.5 cycles. Each cycle consisted of lowering the temperature continuously over 5 minutes and raising the temperature continuously over 3 minutes. In addition, while raising the temperature, a 1.2 L/min flow of 95% helium, 5% krypton was added, and while lowering the temperature, a 2.4 L/min flow of 95% argon, 5% neon was added. After the 4.5 cycles, the reactor temperature was lowered to 1637° F. over 1 minute. The temperature was varied between 1620° F. and 1637° F. for 15.5 cycles. Each cycle consisted of lowering the temperature continuously over 15 minutes and raising the temperature continuously over 15 minutes. In addition, while raising the temperature, a 1.2 L/min flow of 95% nitrogen, 5% helium was added, and while lowering the temperature, a 2.4 L/min flow of 95% argon, 5% neon was added. After the final cycle (sweep), gas flow was changed to 0.15 L/min with a gas composition of 95% helium, 5% argon. The reactor was then held for 16 minutes at 1620° F.

The temperature was then varied between 1627° F. and 1620° F. for one cycle. The cycle consisted of raising the temperature continuously over 15 minutes and lowering the temperature continuously over 15 minutes. In addition, while raising the temperature, a 2.4 L/min flow of 95% helium, 5% argon was added, and while lowering the temperature, a 1.2 L/min flow of 95% argon, 5% nitrogen was added. At the completion of this temperature sweep, the reactor temperature was lowered to $T_{solidus}$ plus 10° F.

The gas addition lance was relocated into the headspace of the reactor, such that a quarter inch (¼ inches) dimple could be observed on the bath surface (1.2 L/min flow of 95% argon, 5% nitrogen). The bath was held at $T_{solidus}$ plus 10° F. for an additional 5 minutes for conditioning and equilibration. The reactor was then cooled to $T_{solidus}$ plus 8° F. while maintaining a temperature lowering rate of no more than 3° F./hr. Upon reaching $T_{solidus}$ plus 8° F. a manual power pulse of 2 kW was introduced with a single continuous up/down sweep from normal holding power. The reactor was then cooled to $T_{solidus}$ plus 2° F. while maintaining a temperature lowering rate of no more than 3° F./hr. Upon reaching $T_{solidus}$ plus 2° F. a manual power pulse of 1.5 kW was introduced with a single continuous up/down sweep from normal holding power. The reactor was then cooled to $T_{solidus}$ again maintaining a temperature lowering rate of no more than 3° F./hr. Upon reaching $T_{solidus}$, the induction furnace power supply was lowered to 1 kW and the reactor was allowed to cool from $T_{solidus}$ to $T_{solidus}$ minus 20° F. Upon reaching $T_{solidus}$ minus 20° F., the induction furnace power supply was lowered to 0.75 kW and the reactor was allowed to cool to 1000° F. Upon reaching 1000° F., the induction furnace power supply was lowered to 0.50 kW and the reactor was allowed to cool to 350° F. Immediately after setting the power to 0.5 kW, the gas flow rate was changed to 0.15 L/min with a gas composition of 95% argon, 5% nitrogen. Upon reaching 350° F., the induction furnace power supply was shut down. Thirty minutes were allowed to pass. The ingot and crucible were removed from the reactor using titanium metal tongs in the presence of light supplied by metal halide ceiling lamps.

Upon removal, the crucible was stripped from the metal ingot via a gentle wedging action. Immediately following removal, the ingot was transferred into a quench chamber containing deionized water, ensuring that the top of the ingot surface was covered by at least 6 inches of DI water. Upon entrance into the quench chamber, a timer was established. At a time of 10 hours and 30 minutes, the ingot was removed from the quench system using the titanium metal tongs and transferred to a clean surface. Exposure to external radiation sources included the metal halide light and placement directly under a skylight (which added filtered sunlight to the irradiation sources). The timer was then reset to zero. The ingot was irradiated for 10 minutes at which point an additional radiation source (krypton lamp) was initiated. At 18 minutes, two orthogonal fluorescent lamp racks were turned on. At 30 minutes, two angled metal halide lights were simultaneously turned on. At this point the timer was again reset. At a time of 6 hours, the krypton lamp, two orthogonal fluorescent lamp racks, and the two angled metal halide lights were sequentially turned off. The timer was again reset to zero. At a time of 6 hours, 30 minutes, normal lab lighting (metal halides) was turned off. The timer was reset to zero. For 48 hours, the ingot was allowed to stabilize with no manual intervention (i.e., no handling).

Example 4

Experimental Procedure for Cobalt, Vanadium, Rhenium Method "HD" RUN 14-01-20

A cylindrical alumina-based crucible (99.68% $Al_2O_3$, 0.07% $SiO_2$, 0.08% $Fe_2O_3$, 0.04% CaO, 0.12% $Na_2O_3$; 4.5 inches O.D.×3.75 inches I.D.×14.5 inches depth) of a 100 pound induction furnace reactor (Inductotherm) fitted with a 73-30R Powertrak power supply. A gas addition lance was installed to a position approximately ¼ inches from the bottom of the reactor. The reactor was charged with 8899 g cobalt (99.5% purity), 182 g vanadium (99.5% purity) and 7 g rhenium (99.997% purity) through its charging port. The reactor was fitted with a graphite cap and a ceramic liner (i.e., the crucible, from Engineering Ceramics). During the entire procedure, a slight positive pressure of 97% argon, 3% hydrogen (~0.5 psig) was maintained in the reactor using a continuous backspace purge. Bypass injection of gas addition was commenced (i.e., gas flow diverted around the reactor was initiated) at a rate of 0.15 L/min of argon. The incoming gas line for the gas addition lance passes through a sealed, light-tight enclosure whereby irradiation of the gas with precise radiation sources (e.g., wavelength, intensity, etc) could be achieved. When the entire gas line had been completely purged (assuming a plug flow model), a neon radiation source was activated within the sealed enclosure. A timer was set to zero. Bypass flow was adjusted to 100% argon at a flow rate of 0.15 L/min with trace neon present (trace can be defined as ≤0.005% vol. to ≤5%). At a time of 3 minutes, an argon radiation source was activated within the sealed enclosure. After completion of another gas line purge (assuming a plug flow model), the gas line was switched from bypass to direct injection through the gas addition lance.

The induction furnace power was then initiated. The reactor was heated to 450° F., at a rate no greater than 300° F./hr, as limited by the integrity of the crucible. The induction furnace operated in the frequency range of 0 Hz to 3000 Hz, with frequency determined by a temperature-controlled feedback loop implementing an Omega Model CN3000 temperature controller. Upon reaching 450° F., the gas addition lance was repositioned to 2 inches from the bottom of the reactor. The timer was again set to zero. At a time of 2 minutes, the gas composition was changed to 0.15 L/min of 66% nitrogen, 34% hydrogen with trace neon present. After completion of another gas line purge (assuming a plug flow model), a krypton radiation source was initiated in the sealed enclosure. Continue reactor heat up at a rate no greater than 300° F./hr, as limited by the integrity of the crucible, until $T_{solidus}$ minus 30° F. was achieved. The gas flow rate was then increased to 0.3 L/min with a constant gas composition. At $T_{solidus}$ a second argon radiation source was activated within the sealed enclosure. Approach $T_{solidus}$ plus 8° F. over a 3 to 5 minute time span. From $T_{solidus}$ plus 8° F. to $T_{solidus}$ plus 15° F., reduce the gas flow rate to 0.15 L/min with a constant gas composition. Immediately upon reaching $T_{solidus}$ plus 15° F., a second neon radiation source was initiated in the sealed enclosure. Immediately after the second neon radiation source was initiated, the gas composition was adjusted to 75% hydrogen, 22% nitrogen, 3% argon and trace neon. The molten bath was held at this condition for 5 minute for stabilization.

After the 5 minute hold, the gas composition was adjusted to 20% helium, 63% nitrogen, 17% argon, and trace neon. The bath was held under these conditions for an additional 15 minutes. Again, following the hold, the gas composition and flow rate were adjusted to 100% argon with trace neon at a rate of 0.3 L/min. The reactor was held at this condition for 3 minutes. The timer was reset to zero. At a time of 65 minutes, graphite saturation assemblies (⅜ inches OD, 36 inches long high purity (<5 ppm impurities) graphite rods) were inserted to the bottom of the cobalt alloy charge through ports located in the top plate. The cobalt was heated to 2504° F. over a one hour period. The bath was then held at this condition for 2 hours. Every 30 minutes during the hold period, an attempt was made to lower the graphite saturation assemblies as dissolution occurred. As the cobalt became saturated with carbon, the graphite saturation assemblies were consumed. After the 2 hour hold period was complete, the graphite saturation assemblies were removed. An additional 47 grams of graphite powder was charged into the reactor through the charging port. The bath was then heated to 3194° F. over three hours. Upon achieving 3194° F., the gas composition and flow rate were adjusted to 100% nitrogen with trace neon at a rate of 0.3 L/min. Hold reactor conditions for five minutes. Reduce the gas flow rate to 0.15 L/min with constant composition. Immediately following this reduction in gas flow, the krypton radiation source in the sealed enclosure was turned off. The timer was reset to zero. At a time of 3 minutes, the gas flow rate was reduced to 37.5 ml/min with constant composition. One of the argon radiation sources inside the sealed enclosure was turned off. At a time of 5 minutes, the nitrogen component of the gas flow was discontinued, while maintaining the flow of trace neon. At a time of 10 minutes, remotely rotate one of the neon radiation sources within the sealed enclosure. The reactor temperature was lowered to 3064° F. over 7 minutes.

The temperature was then varied between 2851° F. and 3064° F. for 16 cycles. Each cycle consisted of raising the temperature continuously over 7 minutes and lowering the temperature continuously over 7 minutes. After completion of the 14.5 cycles, argon was reintroduced at a flow rate of 0.15 L/min with trace neon. Five minutes into the 15$^{th}$ cycle, a xenon radiation source was activated within the sealed enclosure. At 6 minutes into the 15$^{th}$ cycle, a long wave ultraviolet radiation source was activated in the sealed enclosure. At sweep count 15.5, a short wave ultraviolet radiation source was initiated in the sealed enclosure. At sweep count 16, remotely rotate the xenon radiation source within the sealed enclosure. The temperature of the cobalt was varied over another 5 cycles between 2851° F. and 3064° F. After the fifth cycle, the reactor temperature was lowered to 2775° F. over a 10 minute period. Upon achieving the target temperature of 2775, the graphite saturation assemblies were reinstalled in the cobalt and remained there for 1 hour. The graphite saturation assemblies were then removed.

Two voltage probes (source and ground probe) were then installed in the headspace of the reactor and allowed to equilibrate for 5 minutes. Upon completion of the five minute hold the voltage probes were lowered into the bath. The source probe should be positioned 2 inches below the axial center and 1 inch from the radial center. The ground probe was positioned 0.75 inches above the axial position of the source probe and 1 inch from the radial center (180° from the source probe). Once the probes are installed a five minute hold at this condition is done to allow the bath to electronically equilibrate with the probes. Voltage was then applied to the probes and varied between multiple voltage set points. This voltage application was in a continuous up/down sweep between two predetermined voltages. The first voltage cycle was varied between 17 and 18 volts for 24 cycles. Each cycle consisted of raising the voltage continuously over 45 seconds and lowering the voltage continuously over seconds. The second voltage cycle was varied between 13.25 and 14.75 volts for 20 cycles. Each cycle consisted of raising the voltage continuously over 45 seconds and lowering the voltage continuously over 45 seconds. The third voltage cycle was varied between 8.75 and 10.25 volts for 17 cycles. Each cycle consisted of raising the voltage continuously over 45 seconds and lowering the voltage continuously over 45 seconds. The fourth voltage cycle was varied between 4.00 and 7.00 volts for 14 cycles. Each cycle consisted of raising the voltage continuously over 45 seconds and lowering the voltage continuously over 45 seconds. The fifth voltage cycle was varied between 1.50 and 5.00 volts for 10 cycles. Each cycle consisted of raising the voltage continuously over 45 seconds and lowering the voltage continuously over 45 seconds. The sixth voltage cycle was varied between 0.50 and 2.00 volts for 3 cycles. Each cycle consisted of raising the voltage continuously over 45 seconds and lowering the voltage continuously over 45 seconds. When the final cycle was completed the voltage was set onto a constant 1 volt setting. This voltage remained constant until a later step during which the leads were removed.

The reactor temperature was then lowered to 2759° F. over 5 minutes. The reactor was held at this temperature for 5 minutes with continued gas addition. The temperature was then varied between 2727° F. and 2759° F. over 20 cycles. Each cycle consisted of lowering the temperature continuously over 9 minutes and raising the temperature continuously over 9 minutes. After the 20$^{th}$ cycle, third body gas addition was changed by turning off the argon component of the gas leaving only trace neon gas flow. The bath was then cooled to 2711° F. over 5 minutes. Upon reaching 2711° F., one of the neon radiation sources within the sealed enclosure was remotely rotated.

The temperature was then varied between 2662° F. and 2711° F. over 4.5 cycles. Each cycle consisted of lowering the temperature continuously over 5 minutes and raising the temperature continuously over 3 minutes. In addition, while raising the temperature, a 0.15 L/min flow of 60% argon, 40% helium, and trace neon was added, and while lowering the temperature, a 0.3 L/min flow of 100% helium, trace neon, and trace krypton was added. At sweep count 0.5, a krypton radiation source was initiated in the sealed enclosure. At sweep count 1.0, an argon radiation source was initiated in the sealed enclosure. At sweep count 4.5, the short wave ultraviolet radiation source was terminated in the sealed enclosure. The reactor temperature was lowered to 2645° F. over 5 minutes. The temperature was varied between 2467° F. and 2645° F. for 15.5 cycles. Each cycle consisted of lowering the temperature continuously over 15 minutes and raising the temperature continuously over 15 minutes. In addition, while raising the temperature, a 0.15 L/min flow of 60% argon, 40% helium, and trace neon was added, and while lowering the temperature, a 0.3 L/min flow of 100% helium, trace neon, and trace krypton was added. After the 15.5$^{th}$ cycle, third body gas addition was changed by turning off all gas components except the trace neon gas flow.

After the 15.5$^{th}$ cycle, a timer was established. At a time of 3 minutes, the xenon radiation source within the sealed enclosure was remotely rotated. The timer was then reset to zero. At 60 minutes, flow rates were adjusted to 0.3 L/min of 100% argon and trace neon. At 65 minutes, flow rates were adjusted to 3.0 ml/min of 60% argon, 40% helium, and trace neon. Immediately after the flow was adjusted, one of the neon radiation sources within the sealed enclosure was remotely rotated. At 68 minutes, flow rates were adjusted to 0.15 L/min of 100% helium, trace neon and trace krypton. At 68 minutes 20 seconds, the 1 volt power was brought to zero output and the voltage power leads removed from the voltage probes. At 68 minutes 30 seconds, the long wave ultraviolet radiation source was turned off in the sealed enclosure. At 71 minutes 15 seconds, the voltage probes were repositioned to three inches above the bath surface. At 75 minutes, the source and ground probe were completely removed from the reactor.

After the voltage probes had been removed from the reactor, flow rates were adjusted to 0.15 L/min of 77% argon, 18% nitrogen, 5% helium and trace neon. The reactor was then held at temperature and flow rate for 15 minutes. After the 15 minute hold, an argon radiation source was turned off in the sealed enclosure. The flow rates were immediately readjusted to 0.15 L/min of 77% argon, 12% nitrogen, 11% helium and trace neon. The reactor was then held at temperature and flow rate for 25 minutes. After the 25 minute hold, the krypton radiation source was turned off in the sealed enclosure. The flow rates were immediately readjusted to 0.30 L/min of 10% argon, 90% helium and trace neon. The reactor was then held at temperature and flow rate for 3 minutes. After the 3 minute hold, flow rates were adjusted to 0.15 L/min of 10% argon, 90% helium and trace neon and held for 2 minutes. After the 2 minute hold, flow rates were adjusted to 0.30 L/min of 7% hydrogen, 93% nitrogen and trace neon and held for 10 minutes. After the 10 minute hold, flow rates were adjusted to 0.15 L/min of 7% hydrogen, 93% nitrogen and trace neon and held for 3 minutes. After the 3 minute hold, flow rates were adjusted to 30 ml/min of 7% hydrogen, 93% nitrogen and trace neon and held for 2 minutes. After the 2 minute hold, flow rates were adjusted to 0.15 L/min of 87% argon, 10% nitrogen, 3% helium and trace neon and held for 5 minutes. After the 5 minute hold, flow rates were adjusted to 0.6 L/min of 90% argon, 10% nitrogen and trace neon and held for 7 minutes. After the 7 minute hold, flow rates were adjusted to 30 ml/min of 90% argon, 10% nitrogen and trace neon and held for 2 minutes. After the 2 minute hold, flow rates were adjusted to 0.60 L/min of 95% argon, 5% nitrogen and trace neon and held for 15 minutes. After the 15 minute hold, flow rates were adjusted to 0.30 L/min of 95% argon, 5% nitrogen and trace neon and held for 5 minutes.

The reactor temperature was then lowered to 2541° F. over 21 minutes. The temperature was then varied between 2467° F. and 2541° F. for three cycles. The cycles consisted of raising the temperature continuously over 27 minutes and lowering the temperature continuously over 27 minutes. After the third cycle, the bath was held at 2541° F. for 5 minutes. The reactor temperature was then lowered to 2467° F. over 2 minutes 30 seconds. The temperature was then varied between 2541° F. and 2467° F. for two cycles. The cycles consisted of raising the temperature continuously over 11 minutes and lowering the temperature continuously over 7 minutes.

After the completion of the 2$^{nd}$ cycle, the induction power supply was placed into manual control. The power was then instantaneously increased 5 kW above the steady state power level and immediately upon hitting the 5 kW increase the power was instantaneously decreased back to the steady state power level. The power level was then varied up 3.7 kW and down 3.7 kW over 6 cycles. The cycles consisted of raising power 3.7 kW above the steady state power level over 25 seconds. Once raised, the power level was held at the additional 3.7 kW setting for 45 seconds. Following the 45 second hold, the power was lowered back to the steady state power level over a 15 second time frame.

After the 6$^{th}$ power cycle, the gas flows were adjusted to 0.60 L/min of 100% argon and trace neon and held for 7 minutes. Following the seven minute hold, the argon flow was secured leaving only the trace neon flow. Once the argon flow was secured, a second lance was positioned inside the reactor. This lance was placed at a distance ⅔ from the radial center and 1.5 inches from the bottom of the bath. The centerline lance was then repositioned to ¼ inch from the bottom. Once the centerline lance was repositioned, flow was started in the off-centerline lance at a rate of 30 ml/min of 100% argon and trace neon. A timer was initiated. At a time of 2 minutes, the trace neon flow in the centerline lance was secured. At a time of 2 minutes 30 seconds, flow was initiated in the centerline lance at a flow rate of 30 ml/min of 100% carbon monoxide and held for 3 minutes. After the 3 minute hold, flow rates were adjusted in the off-centerline lance to 0.15 L/min of 100% argon and trace neon and held for 15 minutes. After the 15 minute hold, flow rates were adjusted in the off-centerline lance to trace neon only. Furthermore, the flow rate was adjusted in the centerline lance to 0.60 L/min of 100% carbon monoxide and held for 10 minutes. After the 10 minute hold, the carbon monoxide in the centerline lance was secured. The reactor temperature was then lowered to T$_{solidus}$ plus 18° F. over 30 minutes. Upon reaching the T$_{solidus}$ plus 18° F., flow was adjusted in the centerline lance to 0.30 L/min of 100% carbon monoxide and held for 20 minutes. After the 20 minute hold, all flow was secured in the centerline lance and the lance was removed.

After the centerline lance was removed, adjust flow rates in the off-centerline lance to 30 ml/min of 88% argon, 12% nitrogen and trace neon, and held for 3 minutes. After the 3 minute hold, flow rates were adjusted to 0.30 L/min of 25% helium, 75% argon and trace neon and held for 10 minutes. After the 10 minute hold, flow rates were adjusted to 0.30 L/min of 88% argon, 12% nitrogen and trace neon and held for 10 minutes. After the 10 minute hold, flow rates were adjusted to 0.15 L/min of 88% argon, 12% nitrogen and trace neon and held for 5 minutes. After the 5 minute hold, flow rates were adjusted to 30 ml/min of 88% argon, 12% nitrogen and trace neon and held for 2 minutes. After the 2 minute hold, flow rates were adjusted to 0.15 L/min of 88% argon, 12% nitrogen and trace neon. Once the flow rates were adjusted, the reactor temperature was lowered to $T_{solidus}$ plus 15° F. over 45 minutes. Upon reaching the $T_{solidus}$ plus 15° F., flow was adjusted in the off-centerline lance to 0.30 L/min of 100% argon and trace neon and held for 5 minutes.

At the completion of the five minute hold, the reactor temperature was lowered to $T_{solidus}$ plus 11° F. while maintaining a temperature lowering rate of no more than 3° F./hr. Upon reaching $T_{solidus}$ plus 11° F., adjust flow rate in the off-centerline lance to 0.30 L/min of 100% hydrogen and trace neon. At the completion of flow adjustment, the reactor temperature was lowered to $T_{solidus}$ plus 10° F. while maintaining a temperature lowering rate of no more than 3° F./hr. Upon reaching $T_{solidus}$ plus 10° F., adjust flow rate in the off-centerline lance to 30 ml/min of 100% hydrogen and trace neon. At the completion of flow adjustment, the reactor temperature was lowered to $T_{solidus}$ plus 9° F. while maintaining a temperature lowering rate of no more than 3° F./hr. Upon reaching $T_{solidus}$ plus 9° F., the gas addition lance was relocated into the headspace of the reactor, such that a quarter inch dimple (e.g., a quarter inch depression) could be observed on the bath surface. The bath was held at $T_{solidus}$ plus 9° F. for an additional 5 minutes for conditioning and equilibration. The reactor was then cooled to $T_{solidus}$ plus 8° F. while maintaining a temperature lowering rate of no more than 3° F./hr. Upon reaching $T_{solidus}$ plus 8° F. a manual power pulse of 2 kW was introduced with a single continuous up/down sweep from normal holding power. The reactor was then cooled to $T_{solidus}$ plus 2° F. while maintaining a temperature lowering rate of no more than 3° F./hr. Upon reaching $T_{solidus}$ plus 2° F. a manual power pulse of 1.5 kW was introduced with a single continuous up/down sweep from normal holding power. Immediately after the 1.5 kW power pulse, flow was adjusted in the off-centerline lance to 0.15 L/min of 50% hydrogen, 50% helium and trace neon. The reactor was then cooled to $T_{solidus}$ again maintaining a temperature-lowering rate of no more than 3° F./hr. Upon reaching $T_{solidus}$, the induction furnace power supply was lowered to 1 kW and the reactor was allowed to cool from $T_{solidus}$ to $T_{solidus}$ minus 75° F. Upon reaching $T_{solidus}$ minus 75° F., flow rate in the off-centerline lance was adjusted to 30 ml/min of 60% helium, 40% hydrogen and trace neon. Following the flow adjustment, the induction furnace power supply was lowered to 0.75 kW and the reactor was allowed to cool to 1000° F. Upon reaching 1000° F., flow rate in the off-centerline lance was adjusted to 30 ml/min of 100% helium and trace neon. Following the flow adjustment, the induction furnace power supply was lowered to 0.50 kW and the reactor was allowed to cool to 350° F. Upon reaching 350° F., the induction furnace power supply was shut down and a timer initiated. At time of 5 minutes, flow rate in the off-centerline lance was adjusted to 0.60 L/min of 100% helium and trace neon. At time of 9 minutes, a neon radiation source within the sealed enclosure was remotely rotated. Upon completion of the rotation, flow in the off-centerline lance was adjusted to 0.30 L/min of 88% argon, 12% nitrogen and trace neon.

Following the flow adjustment, the timer was reinitiated. At a time of 25 seconds, a neon radiation source within the sealed enclosure was remotely rotated. At a time of 1 minute seconds, a neon radiation source within the sealed enclosure was terminated. At a time of 5 minutes an argon radiation source within the sealed enclosure was terminated. At a time of 6 minute 30 seconds, flow rate was adjusted to 0.30 L/min of 100% helium and trace neon. At a time of 7 minute, the second neon radiation source within the sealed enclosure was terminated.

The timer was reset to zero and restarted. At a time of 15 minutes, the trace neon gas flow in the off-centerline lance was terminated. At a time of 17 minutes 25 seconds, the xenon radiation source within the sealed enclosure was remotely rotated. At a time of 30 minutes, the trace helium gas flow in the off-centerline lance was terminated. The timer was reset to zero and restarted. At a time of 15 minutes, the xenon radiation source inside the sealed enclosure was terminated. Thirty minutes were allowed to pass. The ingot and crucible were removed from the reactor in the presence of radiation sources (metal halide light sources) utilizing titanium metal tongs.

Upon removal, the crucible was stripped from the metal ingot via a gentle wedging action. Immediately following removal, the ingot was transferred into a quench chamber containing deionized water, ensuring that the top of the ingot surface was covered by at least 6 inches of DI water. Upon entrance into the quench chamber, a timer was established. At a time of 2 hours 15 minutes, a long wave ultraviolet radiation source located above the quench vessel was initiated. At a time of 4 hours 7 minutes, a short wave ultraviolet radiation source located above the quench vessel was initiated. At a time of 5 hours 59 minutes 30 seconds the short wave ultraviolet radiation source located above the quench vessel was rotated to a tip up position.

At a time of 6 hours, the ingot was removed from the quench system using the titanium metal tongs and transferred to a clean radiation surface countertop. Exposure to external radiation sources included the metal halide light and placement directly under a skylight (which added filtered sunlight to the irradiation sources). The ingot was pat dried. Upon completion of the drying, the long wave ultraviolet radiation source located above the quench vessel was rotated vertically and moved up 1 inch. The timer was then reset to zero. The ingot was irradiated for 10 minutes at which point an additional radiation source (krypton lamp) was initiated. At 12 minutes 30 seconds, the long wave ultraviolet radiation source located above the quench vessel was rotated to horizontal and moved down to its original position. At 13 minutes, a xenon radiation source located above the quench vessel was initiated. At 18 minutes, two orthogonal fluorescent lamp racks located next to the countertop were turned on. At 30 minutes, two angled metal halide lights located next to the countertop were simultaneously turned on. At this point the timer was again reset. At 13 minutes 15 seconds, a neon radiation source located next to the countertop was turned on. At 15 minutes seconds, an argon radiation source located next to the countertop was turned on. At 23 minutes 45 seconds, the argon radiation source located next to the countertop was rotated to an angle of 35°. At 37 minutes 30 seconds the short wave ultraviolet radiation source located above the quench vessel was rotated to 35°. At 47 minutes 30 seconds, the xenon radiation source located above the quench vessel was rotated to horizontal. At 52 minutes 45 seconds, the long wave ultraviolet radiation source located above the quench vessel was rotated to 35°. At 58 minutes 30 seconds, the short wave ultraviolet radiation source located above the quench vessel was rotated to 55°. At 77 minutes, the krypton radiation source located next to the countertop was rotated to vertical. At 89 minutes, the krypton radiation source located next to the countertop was rotated to 78°. At 97 minutes, the krypton radiation source located next to the countertop was rotated to 88°.

At this point the timer was again reset. At a time of 6 hours, the krypton lamp, short wave ultraviolet, long wave ultraviolet, argon (located over quench vessel), xenon, argon (located next to countertop), neon, two orthogonal fluorescent lamp racks, and the two angled metal halide lights were sequentially terminated in the given order. The timer was again reset. At a time of 6 hours, 30 minutes, normal lab lighting (metal halides) was turned off. The timer was reset. For 48 hours, the ingot was allowed to stabilize with no manual intervention (i.e., no handling).

Example 5

Experimental Procedure for Nickel, Rhenium
Method "HD" RUN 14-01-21

A cylindrical alumina-based crucible (99.68% $Al_2O_3$, 0.07% $SiO_2$, 0.08% $Fe_2O_3$, 0.04% CaO, 0.12% $Na_2O_3$; 4.5 inches O.D.×3.75 inches I.D.×14.5 inches depth) of a 100-pound induction furnace reactor (Inductotherm) fitted with a 73-30R Powertrak power supply. A gas addition lance was installed to a position approximately ¼inches from the bottom of the reactor. The reactor was charged with 9080 g nickel (99.9% purity) and 5 g rhenium (99.997% purity) through its charging port. The reactor was fitted with a graphite cap and a ceramic liner (i.e., the crucible, from Engineering Ceramics). During the entire procedure, a slight positive pressure of 97% argon, 3% hydrogen (~0.5 psig) was maintained in the reactor using a continuous backspace purge. Bypass injection of gas addition was commenced (i.e., gas flow diverted around the reactor was initiated) at a rate of 0.15 L/min of argon. The incoming gas line for the gas addition lance passed through a sealed, light-tight enclosure whereby irradiation of the gas with precise radiation sources (e.g., wavelength, intensity, etc) was achieved. When the entire gas line had been completely purged (assuming a plug flow model), a neon radiation source was activated within the sealed enclosure. A timer was initiated. Bypass flow was adjusted to 100% argon at a flow rate of 0.15 L/min with trace neon present (trace can be defined as ≤0.005% vol. to ≤5%). At a time of 3 minutes, an argon radiation source was activated within the sealed enclosure. After completion of another gas line purge (assuming a plug flow model), the gas line was switched from bypass to direct injection through the gas addition lance.

The induction furnace power was then initiated. The reactor was heated to 450° F., at a rate no greater than 300° F./hr, as limited by the integrity of the crucible. The induction furnace operated in the frequency range of 0 Hz to 3000 Hz, with frequency determined by a temperature-controlled feedback loop implementing an Omega Model CN3000 temperature controller. Upon reaching 450° F., the gas addition lance was repositioned to 2 inches from the bottom of the reactor. The timer was reinitiated. At a time of 2 minutes, the gas composition was changed to 0.15 L/min of 66% nitrogen, 34% hydrogen and trace neon. After completion of another gas line purge (assuming a plug flow model), a krypton radiation source was initiated in the sealed enclosure. The reactor continued to heat up at a rate no greater than 300° F./hr, as limited by the integrity of the crucible, until $T_{solidus}$ minus 30° F. was achieved. The gas flow rate was then increased to 0.3 L/min with a constant gas composition. At $T_{solidus}$ a second argon radiation source was activated within the sealed enclosure. Approach $T_{solidus}$ plus 8° F. over a 3 to 5 minute time span. From $T_{solidus}$ plus 8° F. to $T_{solidus}$ plus 15° F., reduce the gas flow rate to 0.15 L/min with a constant gas composition. Immediately upon reaching $T_{solidus}$ plus 15° F., a second neon radiation source was initiated in the sealed enclosure. Immediately after the second neon radiation source was initiated, the gas composition was adjusted to 75% hydrogen, 22% nitrogen, 3% argon, and trace neon. The molten bath was held at this condition for 5 minutes for stabilization.

After the 5-minute hold, the gas composition was adjusted to 20% helium, 63% nitrogen, 17% argon, and trace neon. The bath was held under these conditions for an additional 15 minutes. Again, following the hold, the gas composition and flow rate were adjusted to 100% argon with trace neon at a rate of 0.3 L/min. The reactor was held at this condition for 3 minutes. The timer was reinitiated. At a time of 65 minutes, graphite saturation assemblies (⅜ inches OD, 36 inches long high purity (<5 ppm impurities) graphite rods) were inserted to the bottom of the nickel alloy charge through ports located in the top plate. The nickel was heated to 2540° F. over a one-hour period. The bath was then held at this condition for 2 hours. Every 30 minutes during the hold period, an attempt was made to lower the graphite saturation assemblies as dissolution occurred. As the nickel became saturated with carbon, the graphite saturation assemblies were consumed. After the 2-hour hold period was complete, the graphite saturation assemblies were removed. An additional 40 grams of graphite powder was charged into the reactor through the charging port. The bath was then heated to 3390° F. over three hours. Upon achieving 3390° F., the gas composition and flow rate were adjusted to 100% nitrogen with trace neon at a rate of 0.3 L/min. The reactor conditions were held for 5 minutes and the gas flow rate was reduced to 0.15 L/min with constant composition. Immediately following this reduction in gas flow, the krypton radiation source in the sealed enclosure was turned off. The timer was reinitiated. At a time of 3 minutes, the gas flow rate was reduced to 37.5 ml/min with constant composition. One of the argon radiation sources inside the sealed enclosure was turned off. At a time of 5 minutes, the nitrogen component of the gas flow was discontinued, while maintaining the flow of the trace neon. At a time of 10 minutes, one of the neon radiation sources within the sealed enclosure was remotely rotated. The reactor temperature was lowered to 3193° F. over 7 minutes.

The temperature was then varied between 2897° F. and 3193° F. for 16 cycles. Each cycle consisted of raising the temperature continuously over 7 minutes and lowering the temperature continuously over 7 minutes. After completion of the 14.5 cycles, argon is reintroduced at a flow rate of 0.15 L/min with trace neon. Five minutes into the $15^{th}$ cycle, a xenon radiation source was activated within the sealed enclosure. At 6 minutes into the $15^{th}$ cycle, a long wave ultraviolet radiation source was activated in the sealed enclosure. At sweep count 15.5, a short wave ultraviolet radiation source was initiated in the sealed enclosure. At sweep count 16, remotely rotate the xenon radiation source within the sealed enclosure. The temperature of the nickel was varied over another 5 cycles between 2897° F. and 3193° F. After the fifth cycle, the reactor temperature was lowered to 2800° F. over a 60-minute period. Upon achieving the target temperature of 2800° F., the graphite saturation assemblies were reinstalled in the nickel and remained there for 1 hour. The graphite saturation assemblies were then removed.

Two voltage probes (source and ground probe) were then installed in the headspace of the reactor and allowed to equilibrate for 5 minutes. Upon completion of the five-minute hold, the voltage probes are lowered into the bath. The source probe was positioned 2 inches below the axial center and 1 inch from the radial center. The ground probe was positioned 0.75 inches above the axial position of the source probe and 1 inch from the radial center (180° from the source probe). Once the probes were installed, a five-minute hold at this condition was done to allow the bath to electronically equilibrate with the probes. Voltage was then applied to the probes and varied between multiple voltage set points. This voltage was in a continuous up/down sweep between two predetermined voltages. The first voltage cycle was varied between 17 and 18 volts for 24 cycles. Each cycle consisted of raising the voltage continuously over 45 seconds and lowering the voltage continuously over 45 seconds. The second voltage cycle was varied between 13.25 and 14.75 volts for 20 cycles. Each cycle consisted of raising the voltage continuously over 45 seconds and lowering the voltage continuously over 45 seconds. The third voltage cycle was varied between 8.75 and 10.25 volts for 17 cycles. Each cycle consisted of raising the voltage continuously over 45 seconds and lowering the voltage continuously over 45 seconds. The fourth voltage cycle was varied between 4.00 and 7.00 volts for 14 cycles. Each cycle consisted of raising the voltage continuously over 45 seconds and lowering the voltage continuously over 45 seconds. The fifth voltage cycle was varied between 1.50 and 5.00 volts for 10 cycles. Each cycle consisted of raising the voltage continuously over 45 seconds and lowering the voltage continuously over 45 seconds. The sixth voltage cycle was varied between 0.50 and 2.00 volts for 3 cycles. Each cycle consisted of raising the voltage continuously over 45 seconds and lowering the voltage continuously over 45 seconds. When the final cycle was completed the voltage was set onto a constant 1-volt setting. This voltage remained constant until a later step during which the leads were removed.

The reactor temperature was then lowered to 2780° F. over 5 minutes. The reactor was held at this temperature for 5 minutes with continued gas addition. The temperature was then varied between 2741° F. and 2780° F. over 20 cycles. Each cycle consisted of lowering the temperature continuously over 9 minutes and raising the temperature continuously over 9 minutes. After the 20$^{th}$ cycle, turning off the argon component of the gas leaving only traces of neon gas flow changed third body gas addition. The bath was then cooled to 2722° F. over 5 minutes. Upon reaching 2722° F., one of the neon radiation sources within the sealed enclosure was remotely rotated.

The temperature was then varied between 2664° F. and 2722° F. over 4.5 cycles. Each cycle consisted of lowering the temperature continuously over 5 minutes and raising the temperature continuously over 3 minutes. In addition, while raising the temperature, a 0.15 L/min flow of 60% argon, 40% helium, and trace neon was added, and while lowering the temperature, a 0.3 L/min flow of 100% helium, trace neon, and trace krypton was added. At sweep count 0.5, a krypton radiation source was initiated in the sealed enclosure. At sweep count 1.0, an argon radiation source was initiated in the sealed enclosure. At sweep count 4.5, a short wave ultraviolet radiation source was terminated in the sealed enclosure. The reactor temperature was lowered to 2645° F. over 5 minutes. The temperature was varied between 2451° F. and 2645° F. for 15.5 cycles. Each cycle consisted of lowering the temperature continuously over 15 minutes and raising the temperature continuously over 15 minutes. In addition, while raising the temperature, a 0.15 L/min flow of 60% argon, 40% helium, and trace neon was added, and while lowering the temperature, a 0.3 L/min flow of 100% helium, trace neon, and trace krypton was added. After the 15.5$^{th}$ cycle, turning off all gas components except the trace neon gas flow changed third body gas addition.

After the 15.5$^{th}$ cycle, a timer was initiated. At a time of 3 minutes, the xenon radiation source within the sealed enclosure was remotely rotated. The timer was reinitiated. At 60 minutes, flow rates were adjusted to 0.3 L/min of 100% argon and trace neon. At 65 minutes, flow rates were adjusted to 3.0 ml/min of 60% argon, 40% helium, and trace neon. Immediately after the flow was adjusted, remotely rotate one of the neon radiation sources within the sealed enclosure. At 68 minutes, flow rates were adjusted to 0.15 L/min of 100% helium, trace neon and trace krypton. At 68 minutes 20 seconds, the 1-volt power was brought to zero output and the voltage power leads removed from the voltage probes. At 68 minutes 30 seconds, the long wave ultraviolet radiation source was turned off in the sealed enclosure. At 71 minutes 15 seconds, reposition the voltage probes to three inches above the bath surface. At 75 minutes, remove the source and ground probes completely from the reactor.

After the voltage probes had been removed from the reactor, flow rates were adjusted to 0.15 L/min of 77% argon, 18% nitrogen, 5% helium, and trace neon. The reactor was then held at temperature and flow rate for 15 minutes. After the 15-minute hold, an argon radiation source was turned off in the sealed enclosure. The flow rates were immediately readjusted to the flow rate 0.15 L/min of 77% argon, 12% nitrogen, 11% helium, and trace neon. The reactor was then held at temperature and flow rate for 25 minutes. After the 25-minute hold, the krypton radiation source was turned off in the sealed enclosure. The flow rates were immediately readjusted to the flow rate 0.30 L/min of 10% argon, 90% helium and trace neon. The reactor was then held at temperature and flow rate for 3 minutes. After the 3-minute hold, flow rates were adjusted to 0.15 L/min of 10% argon, 90% helium and trace neon and held for 2 minutes. After the 2-minute hold, flow rates were adjusted to 0.30 L/min of 7% hydrogen, 93% nitrogen and trace neon and held for 10 minutes. After the 10-minute hold, flow rates were adjusted to the flow rate of 0.15 L/min of 7% hydrogen, 93% nitrogen and trace neon and held for 3 minutes. After the 3-minute hold, flow rates were adjusted to 30 ml/min of 7% hydrogen, 93% nitrogen and trace neon and held for 2 minutes. After the 2-minute hold, flow rates were adjusted to 0.15 L/min of 87% argon, 10% nitrogen, 3% helium, and trace neon and held for 5 minutes. After the 5-minute hold, flow rates were adjusted to 0.6 L/min of 90% argon, 10% nitrogen and trace neon and held for 7 minutes. After the 7-minute hold, flow rates were adjusted to 30 ml/min of 90% argon, 10% nitrogen and trace neon and held for 2 minutes. After the 2-minute hold, flow rates were adjusted to 0.60 L/min of 95% argon, 5% nitrogen and trace neon and held for 15 minutes. After the 15-minute hold, flow rates were adjusted to 0.30 L/min of 95% argon, 5% nitrogen and trace neon and held for 5 minutes.

The reactor temperature was lowered to 2529° F. over 21 minutes. The temperature was then varied between 2451° F. and 2529° F. for three cycles. The cycle consisted of raising the temperature continuously over 27 minutes and lowering the temperature continuously over 27 minutes. After the third cycle, the bath was held at 2529° F. for 5 minutes. The reactor temperature was then lowered to 2451° F. over 2 minutes 30 seconds. The temperature was then varied between 2529° F. and 2451° F. for two cycles. The cycles consisted of raising the temperature continuously over 11 minutes and lowering the temperature continuously over 7 minutes.

After completion of the 2$^{nd}$ cycle, the induction power supply was placed into manual control. The power was then instantaneously increased 5 kW above the steady state power level and immediately upon hitting the 5 kW increase the power was instantaneously decreased back to the steady state power level. The power level was then varied up 3.7 kW and down 3.7 kW over 6 cycles. The cycles consisted of raising power 3.7 kW above the steady state power level over 25 seconds. Once raised, the power level was held at the additional 3.7 kW setting for 45 seconds. Following the 45 second hold, the power was lowered back to the steady state power level over a 15 second time frame.

After the $6^{th}$ power cycle, the gas flows were adjusted to 0.60 L/min of 100% argon and trace neon and held for 7 minutes. Following the seven-minute hold, the argon flow was secured leaving only the trace neon flow. Once the argon flow was secured, a second lance was positioned inside the reactor. This lance was placed at a distance ⅔ from the radial center and 1.5 inches from the bottom of the bath. The centerline lance was then repositioned to ¼ inch from the bottom. Once the centerline lance was repositioned, flow was started in the off-centerline lance at a rate of 30 ml/min of 100% argon and trace neon. A timer was reinitiated. At a time of 2 minutes, the trace neon flow in the centerline lance was secured. At a time of 2 minutes 30 seconds, flow was initiated in the centerline lance at a flow rate of 30 ml/min of 100% carbon monoxide and held for 3 minutes. After the 3-minute hold, flow rates were adjusted in the off-centerline lance to 0.15 L/min of 100% argon and trace neon and held for 15 minutes. After the 15-minute hold, flow rates were adjusted in the off-centerline lance to trace neon only. Furthermore, the flow rate was adjusted in the centerline lance to 0.60 L/min of 100% carbon monoxide and held for 10 minutes. After the 10-minute hold, the carbon monoxide in the centerline lance was secured. The reactor temperature was then lowered to $T_{solidus}$ plus 18° F. over 30 minutes. Upon reaching the $T_{solidus}$ plus 18° F., flow was adjusted in the centerline lance to 0.30 L/min of 100% carbon monoxide and held for 20 minutes. After the 20-minute hold, all flow was secured in the centerline lance and the lance was removed.

After the centerline lance was removed, flow rates in the off-centerline lance were adjusted to 30 ml/min of 88% argon, 12% nitrogen and trace neon, and held for 3 minutes. After the 3-minute hold, flow rates were adjusted to 0.30 L/min of 25% helium, 75% argon and trace neon and held for 10 minutes. After the 10-minute hold, flow rates were adjusted to 0.30 L/min of 88% argon, 12% nitrogen and trace neon and held for 10 minutes. After the 10-minute hold, flow rates were adjusted to 0.15 L/min of 88% argon, 12% nitrogen and trace neon and held for 5 minutes. After the 5-minute hold, flow rates were adjusted to 30 ml/min of 88% argon, 12% nitrogen and trace neon and held for 2 minutes. After the 2-minute hold, flow rates were adjusted to 0.15 L/min of 88% argon, 12% nitrogen and trace neon. Once the flow rate was adjusted, the reactor temperature was lowered to $T_{solidus}$ plus 15° F. over 45 minutes. Upon reaching the $T_{solidus}$ plus 15° F., flow was adjusted in the off-centerline lance to 0.30 L/min of 100% argon and trace neon and held for 5 minutes.

At the completion of the five minute hold, the reactor temperature was lowered to $T_{solidus}$ plus 11° F. while maintaining a temperature lowering rate of no more than 3° F./hr. Upon reaching $T_{solidus}$ plus 11° F., flow rate in the off-centerline lance was adjusted to 0.30 L/min of 100% hydrogen and trace neon. At the completion of flow adjustment, the reactor temperature was lowered to $T_{solidus}$ plus 10° F. while maintaining a temperature lowering rate of no more than 3° F./hr. Upon reaching $T_{solidus}$ plus 10° F., flow rate in the off-centerline lance was adjusted to 30 ml/min of 100% hydrogen and trace neon. At the completion of the flow adjustment, the reactor temperature was lowered to $T_{solidus}$ plus 9° F. while maintaining a temperature-lowering rate of no more than 3° F./hr. Upon reaching $T_{solidus}$ plus 9° F., the gas addition lance was relocated into the headspace of the reactor, such that a quarter inch (¼ inches) dimple could be observed on the bath surface. The bath was held at $T_{solidus}$ plus 9° F. for an additional 5 minutes for conditioning and equilibration. The reactor was then cooled to $T_{solidus}$ plus 8° F. while maintaining a temperature lowering rate of no more than 3° F./hr. Upon reaching $T_{solidus}$ plus 8° F. a manual power pulse of 2 kW was introduced with a single continuous up/down sweep from normal holding power. The reactor was then cooled to $T_{solidus}$ plus 2° F. while maintaining a temperature lowering rate of no more than 3° F./hr. Upon reaching $T_{solidus}$ plus 2° F. a manual power pulse of 1.5 kW was introduced with a single continuous up/down sweep from normal holding power. Immediately after the 1.5 kW power pulse, flow was adjusted in the off-centerline lance to 0.15 L/min of 50% hydrogen, 50% helium and trace neon. The reactor was then cooled to $T_{solidus}$ again maintaining a temperature-lowering rate of no more than 3° F./hr. Upon reaching $T_{solidus}$, the induction furnace power supply was lowered to 1 kW and the reactor was allowed to cool from $T_{solidus}$ to $T_{solidus}$ minus 75° F. Upon reaching $T_{solidus}$ minus 75° F., adjust flow rate in the off-centerline lance to 30 ml/min of 60% helium, 40% hydrogen and trace neon. Following the flow adjustment, the induction furnace power supply was lowered to 0.75 kW and the reactor was allowed to cool to 1000° F. Upon reaching 1000° F., flow rate in the off-centerline lance was adjusted to 30 ml/min of 100% helium and trace neon. Following the flow adjustment, the induction furnace power supply was lowered to 0.50 kW and the reactor was allowed to cool to 350° F. Upon reaching 350° F., the induction furnace power supply was shut down and a timer initiated. At a time of 5 minutes, flow rate in the off-centerline lance was adjusted to 0.60 L/min of 100% helium and trace neon. At a time of 9 minutes, a neon radiation source within the sealed enclosure was remotely rotated. Upon completion of the rotation, flow in the off-centerline lance was adjusted to 0.30 L/min of 88% argon, 12% nitrogen and trace neon.

Following the flow adjustment, the timer was reinitiated. At a time of 25 seconds, a neon radiation source within the sealed enclosure was remotely rotated. At a time of 1 minute seconds, a neon radiation source within the sealed enclosure was terminated. At a time of 5 minutes, an argon radiation source within the sealed enclosure was terminated. At a time of 6 minutes 30 seconds, flow rate was adjusted to 0.30 L/min of 100% helium and trace neon. At a time of 7 minute, the second neon radiation source within the sealed enclosure was terminated.

The timer was reinitiated. At a time of 15 minutes, the trace neon gas flow in the off-centerline lance was terminated. At a time of 17 minutes 25 seconds, the xenon radiation source within the sealed enclosure was remotely rotated. At a time of 30 minutes, the trace helium gas flow in the off-centerline lance was terminated. The timer was reinitiated. At a time of 15 minutes, the xenon radiation source inside the sealed enclosure was terminated. Thirty minutes were allowed to pass. The ingot and crucible were removed from the reactor in the presence of radiation sources (metal halide light sources) utilizing titanium metal tongs.

Upon removal, the crucible was stripped from the metal ingot via a gentle wedging action. Immediately following removal, the ingot was transferred into a quench chamber containing deionized water, ensuring that the top of the ingot surface was covered by at least 6 inches of DI water. Upon entrance into the quench chamber, a timer was established. At a time of 2 hours 15 minutes, a long wave ultraviolet radiation source located above the quench vessel was initiated. At a time of 4 hours 7 minutes, a short wave ultraviolet radiation source located above the quench vessel was initiated. At a time of 5 hours 59 minutes 30 seconds, the short wave ultraviolet radiation source located above the quench vessel was rotated to a vertical position.

At a time of 6 hours, the ingot was removed from the quench system using the titanium metal tongs and transferred to a clean radiation surface countertop. Exposure to external radiation sources included the metal halide light and placement directly under a skylight (which added filtered sunlight to the irradiation sources). The ingot was pat dried. Upon completion of the drying, the long wave ultraviolet radiation source located above the quench vessel was rotated vertical and moved up 1 inch. The timer was then reinitiated. The ingot was irradiated for 10 minutes at which point an additional radiation source (krypton lamp) was initiated. At 12 minutes 30 seconds, the long wave ultraviolet radiation source located above the quench vessel was rotated horizontal and moved down to its original position. At 13 minutes, a xenon radiation source located above the quench vessel was initiated. At 18 minutes, two orthogonal fluorescent lamp racks located next to the countertop were turned on. At 30 minutes, two angled metal halide lights located next to the countertop were simultaneously turned on. At this point the timer was again reinitiated. At 13 minutes seconds, a neon radiation source located next to the countertop was turned on. At 15 minutes 30 seconds, an argon radiation source located next to the countertop was turned on. At 23 minutes 45 seconds, the argon radiation source located next to the countertop was rotated to an angle of 35°. At 37 minutes 30 seconds, the short wave ultraviolet radiation source located above the quench vessel was rotated to 35°. At 47 minutes 30 seconds, the xenon radiation source located above the quench vessel was rotated to horizontal. At 52 minutes 45 seconds, the long wave ultraviolet radiation source located above the quench vessel was rotated to 35°. At 58 minutes 30 seconds, the short wave ultraviolet radiation source located above the quench vessel was rotated to 55°. At 77 minutes, the krypton radiation source located next to the countertop was rotated to vertical. At 89 minutes, the krypton radiation source located next to the countertop was rotated 78°. At 93 minutes, the ingot was lifted using composite black rubber gloves and a tailored material that acts as an energy filter was placed under the ingot. The tailored material used as an energy filter has an XRF as depicted in the Appendix 1. The ingot was then lowered onto the tailored energy filter.

At this point the timer was again reset. At a time of 6 hours, the krypton lamp, short wave ultraviolet, long wave ultraviolet, argon (located over quench vessel), xenon, argon (located next to countertop), neon, two orthogonal fluorescent lamp racks, and the two angled metal halide lights were sequentially terminated in the given order. The timer was again reset. At a time of 6 hours, 30 minutes, normal lab lighting (metal halides) was turned off. The timer was reset. For 48 hours, the ingot was allowed to stabilize with no manual intervention (i.e., no handling).

Example 6

Experimental Procedure for Iron, Vanadium, Chromium, Manganese Method "HD" RUN 14-01-13

A cylindrical alumina-based crucible (99.68% $Al_2O_3$, 0.07% $SiO_2$, 0.08% $Fe_2O_3$, 0.04% CaO, 0.12% $Na_2O_3$; 4.5 inches O.D.×3.75 inches I.D.×14.5 inches depth) of a 100-pound induction furnace reactor (Inductotherm) fitted with a 73-30R Powertrak power supply. A gas addition lance was installed to a position approximately ¼ inches from the bottom of the reactor. The reactor was charged with 8534 g iron (99.98% purity), 182 g vanadium (99.5% purity), 182 g chromium (99.999% purity) and 182 g manganese (99.99% purity) through its charging port. The reactor was fitted with a graphite cap and a ceramic liner (i.e., the crucible, from Engineering Ceramics). During the entire procedure, a slight positive pressure of 97% argon, 3% hydrogen (~0.5 psig) was maintained in the reactor using a continuous backspace purge. Bypass injection of gas addition was commenced (i.e., gas flow diverted around the reactor was initiated) at a rate of 0.15 L/min of argon. The incoming gas line for the gas addition lance passed through a sealed, light-tight enclosure whereby irradiation of the gas with precise radiation sources (e.g., wavelength, intensity, etc) was achieved. When the entire gas line had been completely purged (assuming a plug flow model), a neon radiation source was activated within the sealed enclosure. A timer was initiated. Bypass flow was adjusted to 100% argon at a flow rate of 0.15 L/min with trace neon present (trace can be defined as ≤0.005% volume to ≤5%). At a time of 3 minutes, an argon radiation source was activated within the sealed enclosure. After completion of another gas line purge (assuming a plug flow model), the gas line was switched from bypass to direct injection through the gas addition lance.

The induction furnace power was then initiated. The reactor was heated to 450° F., at a rate no greater than 300° F./hr, as limited by the integrity of the crucible. The induction furnace operated in the frequency range of 0 Hz to 3000 Hz, with frequency determined by a temperature-controlled feedback loop implementing an Omega Model CN3000 temperature controller. Upon reaching 450° F., the gas addition lance was repositioned to 2 inches from the bottom of the reactor. The timer was reinitiated. At a time of 2 minutes, the gas composition was changed to 0.15 L/min of 66% nitrogen, 34% hydrogen and trace neon. After completion of another gas line purge (assuming a plug flow model), a krypton radiation source was initiated in the sealed enclosure. The reactor heat up continued at a rate no greater than 300° F./hr, as limited by the integrity of the crucible, until $T_{solidus}$ minus 30° F. was achieved. The gas flow rate was then increased to 0.3 L/min with a constant gas composition. At $T_{solidus}$ a second argon radiation source was activated within the sealed enclosure. Approach $T_{solidus}$ plus 8° F. over a 3 to 5 minute time span. From $T_{solidus}$ plus 8° F. to $T_{solidus}$ plus 15° F., reduce the gas flow rate to 0.15 L/min with a constant gas composition. Immediately upon reaching $T_{solidus}$ plus 15° F., a second neon radiation source was initiated in the sealed enclosure. Immediately after the second neon radiation source was initiated, the gas composition was adjusted to 75% hydrogen, 22% nitrogen, 3% argon, and trace neon. The molten bath was held at this condition for 5 minute for stabilization.

After the 5-minute hold, the gas composition was adjusted to 20% helium, 63% nitrogen, 17% argon, and trace neon. The bath was held under these conditions for an additional 15 minutes. Again, following the hold, the gas composition and flow rate were adjusted to 100% argon with trace neon at a rate of 0.3 L/min. The reactor was held at this condition for 3 minutes. The timer was reinitiated. At a time of 65 minutes, graphite saturation assemblies (⅜ inches OD, 36 inches long high purity (<5 ppm impurities) graphite rods) were inserted to the bottom of the iron alloy charge through ports located in the top plate. The iron was cooled to 2243°

F. over a two-hour period. The bath was cooled due to the t-solidus temperature of an iron bath with no carbon versus the temperature requirement of a carbon-containing bath. The bath was then held at this condition for 2 hours. Every 30 minutes during the hold period, an attempt was made to lower the graphite saturation assemblies as dissolution occurred. As the iron alloy became saturated with carbon, the graphite saturation assemblies were consumed. After the 2-hour hold period was complete, the graphite saturation assemblies were removed. An additional 90 grams of graphite powder was charged into the reactor through the charging port. The bath was then heated to 3525° F. over three hours. Upon achieving 3525° F., the gas composition and flow rate were adjusted to 100% nitrogen with trace neon at a rate of 0.3 L/min and held for 5 minutes. Reduce the gas flow rate to 0.15 L/min with constant composition. Immediately following this reduction in gas flow, the krypton radiation source in the sealed enclosure was turned off. The timer was reinitiated. At a time of 3 minutes, the gas flow rate was reduced to 37.5 ml/min with constant composition. One of the argon radiation sources inside the sealed enclosure was turned off. At a time of 5 minutes, the nitrogen component of the gas flow was discontinued while maintaining the flow of the trace neon. At a time of 10 minutes, one of the neon radiation sources within the sealed enclosure was remotely rotated. The reactor temperature was lowered to 3360° F. over 7 minutes.

The temperature was then varied between 2993° F. and 3360° F. for 16 cycles. Each cycle consisted of raising the temperature continuously over 7 minutes and lowering the temperature continuously over 7 minutes. After completion of the 14.5 cycles, argon was reintroduced at a flow rate of 0.15 L/min with trace neon. Five minutes into the 15$^{th}$ cycle, a xenon radiation source was activated within the sealed enclosure. At 6 minutes into the 15$^{th}$ cycle, a long wave ultraviolet radiation source was activated in the sealed enclosure. At sweep count 15.5, a short wave ultraviolet radiation source was initiated in the sealed enclosure. At sweep count 16, the xenon radiation source within the sealed enclosure was remotely rotated. The temperature of the iron alloy was varied over another 5 cycles between 2993° F. and 3360° F. After the fifth cycle, the reactor temperature was then lowered to 2850° F. over a 60-minute period. Upon achieving the target temperature of 2850, the graphite saturation assemblies were reinstalled in the iron alloy and remained there for 1 hour. The graphite saturation assemblies were then removed.

Two voltage probes (source and ground probe) were then installed in the headspace of the reactor and allowed to equilibrate for 5 minutes. Upon completion of the five-minute hold the voltage probes were lowered into the bath. The source probe was positioned 2 inches below the axial center and 1 inch from the radial center. The ground probe was positioned 0.75 inches above the axial position of the source probe and 1 inch from the radial center (180° from the source probe). Once the probes were installed a five-minute hold at this condition was done to allow the bath to electronically equilibrate with the probes. Voltage was then applied to the probes and varied between multiple voltage set points. This voltage was in a continuous up/down sweep between two predetermined voltages. The first voltage cycle was varied between 17 and 18 volts for 24 cycles. Each cycle consisted of raising the voltage continuously over 45 seconds and lowering the voltage continuously over 45 seconds. The second voltage cycle was varied between 13.25 and 14.75 volts for 20 cycles. Each cycle consisted of raising the voltage continuously over 45 seconds and lowering the voltage continuously over 45 seconds. The third voltage cycle was varied between 8.75 and 10.25 volts for 17 cycles. Each cycle consisted of raising the voltage continuously over 45 seconds and lowering the voltage continuously over 45 seconds. The fourth voltage cycle was varied between 4.00 and 7.00 volts for 14 cycles. Each cycle consisted of raising the voltage continuously over 45 seconds and lowering the voltage continuously over 45 seconds. The fifth voltage cycle was varied between 1.50 and 5.00 volts for 10 cycles. Each cycle consisted of raising the voltage continuously over 45 seconds and lowering the voltage continuously over 45 seconds. The sixth voltage cycle was varied between 0.50 and 2.00 volts for 3 cycles. Each cycle consisted of raising the voltage continuously over 45 seconds and lowering the voltage continuously over 45 seconds. When the final cycle was completed the voltage was set onto a constant 1-volt setting. This voltage remains constant until a later step when the leads are removed.

The reactor temperature was lowered to 2819° F. over 5 minutes. The reactor was held at this temperature for 5 minutes with continued gas addition. The temperature was then varied between 2757° F. and 2819° F. over 20 cycles. Each cycle consisted of lowering the temperature continuously over 9 minutes and raising the temperature continuously over 9 minutes. After the 20$^{th}$ cycle, turning off the argon component of the gas leaving only trace neon gas flow changed third body gas addition. The bath was then cooled to 2724° F. over 5 minutes. Upon reaching 2724° F., one of the neon radiation sources within the sealed enclosure was remotely rotated.

The temperature was then varied between 2622° F. and 2724° F. over 4.5 cycles. Each cycle consisted of lowering the temperature continuously over 5 minutes and raising the temperature continuously over 3 minutes. In addition, while raising the temperature, a 0.15 L/min flow of 60% argon, 40% helium, and trace neon was added, and while lowering the temperature, a 0.3 L/min flow of 100% helium, trace neon, and trace krypton was added. At sweep count 0.5, a krypton radiation source was initiated in the sealed enclosure. At sweep count 1.0, an argon radiation source was initiated in the sealed enclosure. At sweep count 4.5, a short wave ultraviolet radiation source was terminated in the sealed enclosure. The reactor temperature was lowered to 2586° F. over 5 minutes. The temperature was varied between 2133° F. and 2586° F. for 15.5 cycles. Each cycle consisted of lowering the temperature continuously over 15 minutes and raising the temperature continuously over 15 minutes. In addition, while raising the temperature, a 0.15 L/min flow of 60% argon, 40% helium, and trace neon was added, and while lowering the temperature, a 0.3 L/min flow of 100% helium, trace neon, and trace krypton was added. After the 15.5$^{th}$ cycle, turning off all gas components except the trace neon gas flow changed third body gas addition.

After the 15.5$^{th}$ cycle, a timer was initiated. At a time of 3 minutes, remotely rotate the xenon radiation source within the sealed enclosure. The timer was then reinitiated. At 60 minutes, flow rates were adjusted to 0.3 L/min of 100% argon and trace neon. At 65 minutes, flow rates were adjusted to 30 ml/min of 60% argon, 40% helium, and trace neon. Immediately after the flow was adjusted, one of the neon radiation sources within the sealed enclosure was remotely rotated. At 68 minutes, flow rates were adjusted to 0.15 L/min of 100% helium, trace neon and trace krypton. At 68 minutes 20 seconds, the 1-volt power was brought to zero output and the voltage power leads removed from the voltage probes. At 68 minutes 30 seconds, the long wave ultraviolet radiation source was turned off in the sealed enclosure. At 71 minutes 15 seconds, the voltage probes were repositioned to three inches above the bath surface. At 75 minutes, the source and ground probe were removed completely from the reactor.

After the voltage probes had been removed from the reactor, flow rates were adjusted to 0.15 L/min of 77% argon, 18% nitrogen, 5% helium, and trace neon. The reactor was then held at temperature and flow rate for 15 minutes. After the 15-minute hold, an argon radiation source was turned off in the sealed enclosure. The flow rates were immediately readjusted to the flow rate 0.15 L/min of 77% argon, 12% nitrogen, 11% helium, and trace neon. The reactor was then held at temperature and flow rate for 25 minutes. After the 25-minute hold, the krypton radiation source was turned off in the sealed enclosure. The flow rates were immediately readjusted to a flow rate of 0.30 L/min of 10% argon, 90% helium and trace neon. The reactor was then held at temperature and flow rate for 3 minutes. After the 3-minute hold, flow rates were adjusted to 0.15 L/min of 10% argon, 90% helium and trace neon and held for 2 minutes. After the 2-minute hold, flow rates were adjusted to 0.30 L/min of 7% hydrogen, 93% nitrogen and trace neon and held for 10 minutes. After the 10-minute hold, flow rates were adjusted to 0.15 L/min of 7% hydrogen, 93% nitrogen and trace neon and held for 3 minutes. After the 3-minute hold, flow rates were adjusted to 30 ml/min of 7% hydrogen, 93% nitrogen and trace neon and held for 2 minutes. After the 2-minute hold, flow rates were adjusted to 0.15 L/min of 87% argon, 10% nitrogen, 3% helium, and trace neon and held for 5 minutes. After the 5-minute hold, flow rates were adjusted to 0.6 L/min of 90% argon, 10% nitrogen and trace neon and held for 7 minutes. After the 7-minute hold, flow rates were adjusted to 30 ml/min of 90% argon, 10% nitrogen and trace neon and held for 2 minutes. After the 2-minute hold, flow rates were adjusted to 0.60 L/min of 95% argon, 5% nitrogen and trace neon and held for 15 minutes. After the 15-minute hold, flow rates were adjusted to 0.30 L/min of 95% argon, 5% nitrogen and trace neon and held for 5 minutes.

The reactor temperature was raised to 2340° F. over 21 minutes. The temperature was then varied between 2133° F. and 2340° F. for three cycles. The cycle consisted of raising the temperature continuously over 27 minutes and lowering the temperature continuously over 27 minutes. After the third cycle, the bath was held at 2340° F. for 5 minutes. The reactor temperature was then lowered to 2133° F. over 2 minutes 30 seconds. The temperature was then varied between 2340° F. and 2133° F. for two cycles. The cycle consisted of raising the temperature continuously over 11 minutes and lowering the temperature continuously over 7 minutes.

After completion of the $2^{nd}$ cycle, the induction power supply was placed into manual control. The power was then instantaneously increased 5 kW above the steady state power level and immediately upon hitting the 5 kW increased the power was instantaneously decreased back to the steady state power level. The power level was then varied up 3.7 kW and down 3.7 kW over 6 cycles. The cycles consisted of raising power 3.7 kW above the steady state power level over 25 seconds. Once raised, the power level was held at the additional 3.7 kW setting for 45 seconds. Following the 45 second hold, the power was lowered back to the steady state power level over a 15 second time frame.

After completion of the $6^{th}$ power cycle, the gas flows were adjusted to 0.60 L/min of 100% argon and trace neon and held for 7 minutes. Following the seven-minute hold, the argon flow was secured leaving only the trace neon flow.

Once the argon flow was secured, a second lance was positioned inside the reactor. This lance was placed at a distance ⅔ from the radial center and 1.5 inches from the bottom of the bath. The centerline lance was then repositioned to ¼ inch from the bottom. Once the centerline lance was repositioned, flow was started in the off-centerline lance at a rate of 30 ml/min of 100% argon and trace neon. A timer was initiated. At a time of 2 minutes, the trace neon flow in the centerline lance was secured. At a time of 2 minutes 30 seconds, flow was initiated in the centerline lance at a flow rate of 30 ml/min of 100% carbon monoxide and held for 3 minutes. After the 3-minute hold, flow rates were adjusted in the off-centerline lance to 0.15 L/min of 100% argon and trace neon and held for 15 minutes. After the 15-minute hold, flow rates were adjusted in the off-centerline lance to trace neon only. Furthermore, the flow rate was adjusted in the centerline lance to 0.60 L/min of 100% carbon monoxide and held for 10 minutes. After the 10-minute hold, the carbon monoxide in the centerline lance was secured. The reactor temperature was then lowered to $T_{solidus}$ plus 18° F. over 30 minutes. Upon reaching the $T_{solidus}$ plus 18° F., flow was adjusted in the centerline lance to 0.30 L/min of 100% carbon monoxide and held for 20 minutes. After the 20-minute hold, all flow was secured in the centerline lance and the lance was removed.

After the centerline lance was removed, adjust flow rates in the off-centerline lance to 30 ml/min of 88% argon, 12% nitrogen and trace neon and held for 3 minutes. After the 3-minute hold, flow rates were adjusted to 0.30 L/min of 25% helium, 75% argon and trace neon and held for 10 minutes. After the 10-minute hold, flow rates were adjusted to 0.30 L/min of 88% argon, 12% nitrogen and trace neon and held for 10 minutes. After the 10-minute hold, flow rates were adjusted to 0.15 L/min of 88% argon, 12% nitrogen and trace neon and held for 5 minutes. After the 5-minute hold, flow rates were adjusted to 30 cc/min of 88% argon, 12% nitrogen and trace neon and held for 2 minutes. After the 2-minute hold, flow rates were adjusted to 0.15 L/min of 88% argon, 12% nitrogen and trace neon. Once the flow rate was adjusted, the reactor temperature was lowered to $T_{solidus}$ plus 15° F. over 45 minutes. Upon reaching the $T_{solidus}$ plus 15° F., flow was adjusted in the off-centerline lance to 0.30 L/min of 100% argon and trace neon and held for 5 minutes.

At the completion of five minute hold, the reactor temperature was lowered to $T_{solidus}$ plus 11° F. while maintaining a temperature lowering rate of no more than 3° F./hr. Upon reaching $T_{solidus}$ plus 11° F., flow rate in the off-centerline lance was adjusted to 0.30 L/min of 100% hydrogen and trace neon. At the completion of the flow adjustment, the reactor temperature was then lowered to $T_{solidus}$ plus 10° F. while maintaining a temperature lowering rate of no more than 3° F./hr. Upon reaching $T_{solidus}$ plus 10° F., flow rate in the off-centerline lance was adjusted to 30 ml/min of 100% hydrogen and trace neon. At the completion of the flow adjustment, the reactor temperature was lowered to $T_{solidus}$ plus 9° F. while maintaining a temperature-lowering rate of no more than 3° F./hr. Upon reaching $T_{solidus}$ plus 9° F., the gas addition lance was relocated into the headspace of the reactor, such that a quarter inch (¼ inches) dimple could be observed on the bath surface. The bath was held at $T_{solidus}$ plus 9° F. for an additional 5 minutes for conditioning and equilibration. The reactor was then cooled to $T_{solidus}$ plus 8° F. while maintaining a temperature lowering rate of no more than 3° F./hr. Upon reaching $T_{solidus}$ plus 8° F. a manual power pulse of 2 kW was introduced with a single continuous up/down sweep from normal holding power. The reactor was then cooled to $T_{solidus}$ plus 2° F. while maintaining a temperature lowering rate of no more than 3° F./hr. Upon reaching $T_{solidus}$ plus 2° F. a manual power pulse of 1.5 kW was introduced with a single continuous up/down sweep from normal holding power. Immediately after the 1.5 kW power pulse, flow was adjusted in the off-centerline lance to 0.15 L/min of 50% hydrogen, 50% helium and trace neon. The reactor was then cooled to $T_{solidus}$ again maintaining a temperature-lowering rate of no more than 3° F./hr. Upon reaching $T_{solidus}$, the induction furnace power supply was lowered to 1 kW and the reactor was allowed to cool from $T_{solidus}$ to $T_{solidus}$ minus 75° F. Upon reaching $T_{solidus}$ minus 75° F., flow rate in the off-centerline lance was adjusted to 30 ml/min of 60% helium, 40% hydrogen and trace neon. Following the flow adjustment, the induction furnace power supply was lowered to 0.75 kW and the reactor was allowed to cool to 1000° F. Upon reaching 1000° F., flow rate in the off-centerline lance was adjusted to 30 ml/min of 100% helium and trace neon. Following the flow adjustment, the induction furnace power supply was lowered to 0.50 kW and the reactor was allowed to cool to 350° F. Upon reaching 350° F., the induction furnace power supply was shut down and the timer reinitiated. At a time of 5 minutes, flow rate in the off-centerline lance was adjusted to 0.60 L/min of 100% helium and trace neon. At a time of 9 minutes, a neon radiation source within the sealed enclosure was remotely rotated. Upon completion of the rotation, flow in the off-centerline lance was adjusted to 0.30 L/min of 88% argon, 12% nitrogen and trace neon.

Following the flow adjustment, the timer was reinitiated. At a time of 25 seconds, a neon radiation source within the sealed enclosure was remotely rotated. At a time of 1 minute seconds, a neon radiation source within the sealed enclosure was terminated. At a time of 5 minutes an argon radiation source within the sealed enclosure was terminated. At a time of 6 minute 30 seconds, flow rate was adjusted to 0.30 L/min of 100% helium and trace neon. At a time of 7 minute, the second neon radiation source within the sealed enclosure was terminated.

The timer was reinitiated. At a time of 15 minutes, the trace neon gas flow in the off-centerline lance was terminated. At a time of 17 minutes 25 seconds, the xenon radiation source within the sealed enclosure was remotely rotated. At a time of 30 minutes, the trace helium gas flow in the off-centerline lance was terminated. The timer was reinitiated. At a time of 15 minutes, the xenon radiation source inside the sealed enclosure was terminated. Thirty minutes were allowed to pass. The ingot and crucible were removed from the reactor in the presence of radiation sources (metal halide light sources) utilizing titanium metal tongs.

Upon removal, the crucible was stripped from the metal ingot via a gentle wedging action. Immediately following removal, the ingot was transferred into a quench chamber containing deionized water, ensuring that the top of the ingot surface was covered by at least 6 inches of DI water. Upon entrance into the quench chamber, a timer was initiated. At a time of 2 hours 15 minutes, a long wave ultraviolet radiation source located above the quench vessel was initiated. At a time of 4 hours 7 minutes, a short wave ultraviolet radiation source located above the quench vessel was initiated. At a time of 5 hours 59 minutes 30 seconds, the short wave ultraviolet radiation source located above the quench vessel was rotated to the vertical position.

At a time of 6 hours, the ingot was removed from the quench system using the titanium metal tongs and transferred to a clean radiation surface countertop. Exposure to external radiation sources included the metal halide light and placement directly under a skylight (which added filtered sunlight to the irradiation sources). The ingot was pat dried. Upon completion of the drying, the long wave ultraviolet radiation source located above the quench vessel was rotated vertically and moved up 1 inch. The timer was then reinitiated. The ingot was irradiated for 10 minutes at which point an additional radiation source (krypton lamp) was initiated. At 12 minutes 30 seconds, the long wave ultraviolet radiation source located above the quench vessel was rotated horizontal and moved down to its original position. At 13 minutes, a xenon radiation source located above the quench vessel was initiated. At 18 minutes, two orthogonal fluorescent lamp racks located next to the countertop were turned on. At 30 minutes, two angled metal halide lights located next to the countertop were simultaneously turned on. At this point the timer was again reinitiated. At 13 minutes seconds, a neon radiation source located next to the countertop was turned on. At 15 minutes 30 seconds, an argon radiation source located next to the countertop was turned on. At 23 minutes 45 seconds, the argon radiation source located next to the countertop was rotated to an angle of 35°. At 37 minutes 30 seconds, the short wave ultraviolet radiation source located above the quench vessel was rotated to 35°. At 47 minutes 30 seconds, the xenon radiation source located above the quench vessel was rotated to horizontal. At 52 minutes 45 seconds, the long wave ultraviolet radiation source located above the quench vessel was rotated to 35°. At 58 minutes 30 seconds, the short wave ultraviolet radiation source located above the quench vessel was rotated to 55°. At 77 minutes, the krypton radiation source located next to the countertop was rotated to vertical. At 89 minutes, the krypton radiation source located next to the countertop was rotated to 78°. At 97 minutes, the krypton radiation source located next to the countertop was rotated to 88°.

The timer was reinitiated. At a time of 6 hours, the krypton lamp, short wave ultraviolet, long wave ultraviolet, argon (located over quench vessel), xenon, argon (located next to countertop), neon, two orthogonal fluorescent lamp racks, and the two angled metal halide lights were sequentially terminated in the given order. The timer was again reinitiated. At a time of 6 hours, 30 minutes, normal lab lighting (metal halides) was turned off. The timer was reinitiated. For 48 hours, the ingot was allowed to stabilize with no manual intervention (i.e., no handling).

Example 7

Experimental Procedure for Copper, Gold, Silver, Rhenium Alloy Method "HD" RUN 14-04-03

A cylindrical alumina-based crucible (99.68% $Al_2O_3$, 0.07% $SiO_2$, 0.08% $Fe_2O_3$, 0.04% CaO, 0.12% $Na_2O_3$; 4.5 inches O.D.×3.75 inches I.D.×14.5 inches depth) of a 100 pound induction furnace reactor (Inductotherm) fitted with a 73-30R Powertrak power supply. A gas addition lance was installed to a position approximately ¼inches from the bottom of the reactor. The reactor was charged with 9080 g copper (99.98% purity), 7 g rhenium, 5 g silver and 2 g gold through its charging port. The reactor was fitted with a graphite cap and a ceramic liner (i.e., the crucible, from Engineering Ceramics). During the entire procedure, a slight positive pressure of 97% argon, 3% hydrogen (~0.5 psig) was maintained in the reactor using a continuous backspace purge. Bypass injection of gas addition was commenced (i.e., gas flow diverted around the reactor was initiated) at a rate of 0.15 L/min of argon. The incoming gas line for the gas addition lance passes through a sealed, light-tight enclosure whereby irradiation of the gas with precise radiation sources (e.g., wavelength, intensity, etc) can be achieved. When the entire gas line had been completely purged (assuming a plug flow model), a neon radiation source was activated within the sealed enclosure. A timer was set to zero. Bypass flow was adjusted to 100% argon at a flow rate of 0.15 L/min with trace neon present (≤0.005% vol. to ≤5%). At a time of 3 minutes, an argon radiation source was activated within the sealed enclosure. After completion of another gas line purge (assuming a plug flow model), the gas line was switched from bypass to direct injection through the gas addition lance.

The induction furnace power was then initiated. The reactor was heated to 450° F., at a rate no greater than 300° F./hr, as limited by the integrity of the crucible. The induction furnace operated in the frequency range of 0 Hz to 3000 Hz, with frequency determined by a temperature-controlled feedback loop implementing an Omega Model CN3000 temperature controller. Upon reaching 450° F., the gas addition lance was repositioned to within 2 inches of the bottom of the reactor. The timer was again set to zero. At a time of 2 minutes, the gas composition was changed to 0.15 L/min of 66% nitrogen, 34% hydrogen with trace neon present. After completion of another gas line purge (assuming a plug flow model), a krypton radiation source is initiated in the sealed enclosure. The reactor heat up continued at a rate no greater than 300° F./hr, as limited by the integrity of the crucible, until $T_{solidus}$ minus 30° F. was achieved. The gas flow rate was then increased to 0.3 L/min with a constant gas composition. At $T_{solidus}$ a second argon radiation source was activated within the sealed enclosure. $T_{solidus}$ plus 8° F. was approached over a 3 to 5 minute time span. From $T_{solidus}$ plus 8° F. to $T_{solidus}$ plus 15° F., the gas flow rate was reduced to 0.15 L/min with a constant gas composition. Immediately upon reaching $T_{solidus}$ plus 15° F., a second neon radiation source was initiated in the sealed enclosure. Immediately after the second neon radiation source is initiated, the gas composition is adjusted to 75% hydrogen, 22% nitrogen, and 3% argon with trace neon. The molten bath was held at this condition for 5 minutes for stabilization.

After the 5 minute hold, the gas composition was adjusted to 20% helium, 63% nitrogen, 17% argon, and trace neon. The bath was held under these conditions for an additional 15 minutes. Again, following the hold, the gas composition and flow rate were adjusted to 100% argon with trace neon at a rate of 0.3 L/min. The reactor was held at this condition for 3 minutes. The timer was reset to zero. At a time of 65 minutes, graphite saturation assemblies (⅜ inches OD, 36 inches long high purity (<5 ppm impurities) graphite rods) were inserted to the bottom of the copper alloy charge through ports located in the top plate. The copper alloy was heated to 2359° F. over a 1 hour period. The bath was then held at this condition for 2 hours. Every 30 minutes during the hold period, an attempt was made to lower the graphite saturation assemblies as dissolution occurred. As the copper became saturated with carbon, the graphite saturation assemblies were consumed. After the 2 hour hold period was complete, the graphite saturation assemblies were removed. An additional 2.06 grams of graphite powder was charged into the reactor through the charging port. The bath was then heated to 2474° F. over one hour. Upon achieving 2474° F., the gas composition and flow rate were adjusted to 100% nitrogen with trace neon at a rate of 0.3 L/min. Hold reactor conditions for 5 minutes. The gas flow rate was reduced to 0.15 L/min with constant composition. Immediately following this reduction in gas flow, the krypton radiation source in the sealed enclosure was turned off. The timer was reset to zero. At a time of 3 minutes, the gas flow rate was reduced to 37.5 ml/min with constant composition. One of the argon radiation sources inside the sealed enclosure was turned off. At a time of 5 minutes, the nitrogen component of the gas flow was discontinued, while maintaining the flow of trace neon. At a time of 10 minutes, one of the neon radiation sources within the sealed enclosure was rotated. The reactor temperature is lowered to 2451° F. over 7 minutes.

The temperature was then varied between 2413° F. and 2451° F. for 16 cycles. Each cycle consisted of raising the temperature continuously over 7 minutes and lowering the temperature continuously over 7 minutes. After completion of the 14.5 cycles, argon was reintroduced at a flow rate of 0.15 L/min with trace neon. Five minutes into the 15$^{th}$ cycle, a xenon radiation source was activated within the sealed enclosure. At 6 minutes into the 15$^{th}$ cycle, a long wave ultraviolet radiation source was activated in the sealed enclosure. At sweep count 15.5, a short wave ultraviolet radiation source was initiated in the sealed enclosure. At sweep count 16, the xenon radiation source was remotely rotated within the sealed enclosure. The temperature of the copper was varied over another 5 cycles between 2413° F. and 2451° F. After the fifth cycle, the reactor temperature was lowered to 2400° F. over a 10 minute period. Upon achieving the target temperature of 2400, the graphite saturation assemblies were reinstalled in the copper and remained there for 1 hour. The graphite saturation assemblies were then removed.

Two voltage probes (source and ground probe) were then installed in the headspace of the reactor and allowed to equilibrate for 5 minutes. Upon completion of the five minute hold the voltage probes were lowered into the bath. The source probe was positioned 2 inches below the axial center and 1 inch from the radial center. The ground probe was positioned 0.75 inches above the axial position of the source probe and 1 inch from the radial center (180° from the source probe). Once the probes were installed, a five minute hold at this condition was done to allow the bath to electronically equilibrate with the probes. Voltage was then applied to the probes and varied between multiple voltage set points. This voltage application was in a continuous up/down sweep between two predetermined voltages. The first voltage cycle was varied between 17 and 18 volts for 24 cycles. Each cycle consisted of raising the voltage continuously over 45 seconds and lowering the voltage continuously over seconds. The second voltage cycle was varied between 13.25 and 14.75 volts for 20 cycles. Each cycle consisted of raising the voltage continuously over 45 seconds and lowering the voltage continuously over 45 seconds. The third voltage cycle was varied between 8.75 and 10.25 volts for 17 cycles. Each cycle consisted of raising the voltage continuously over 45 seconds and lowering the voltage continuously over 45 seconds. The fourth voltage cycle was varied between 4.00 and 7.00 volts for 14 cycles. Each cycle consisted of raising the voltage continuously over 45 seconds and lowering the voltage continuously over 45 seconds. The fifth voltage cycle was varied between 1.50 and 5.00 volts for 10 cycles. Each cycle consisted of raising the voltage continuously over 45 seconds and lowering the voltage continuously over 45 seconds. The sixth voltage cycle was varied between 0.50 and 2.00 volts for 3 cycles. Each cycle consisted of raising the voltage continuously over 45 seconds and lowering the voltage continuously over 45 seconds. When the final cycle was completed the voltage was set onto a constant 1 volt setting. This voltage setting remained constant until a later step during which the leads are removed.

The reactor temperature was then lowered to 2397° F. over 5 minutes. The reactor was held at this temperature for 5 minutes with continued gas addition. The temperature was then varied between 2391° F. and 2397° F. over 20 cycles. Each cycle consisted of lowering the temperature continuously over 9 minutes and raising the temperature continuously over 9 minutes. After the 20$^{th}$ cycle, third body gas addition was changed by turning off the argon component of the gas leaving only trace neon gas flow. The bath was then cooled to 2388° F. over 5 minutes. Upon reaching 2388° F., one of the neon radiation sources was remotely rotated within the sealed enclosure.

The temperature was then varied between 2380° F. and 2388° F. over 4.5 cycles. Each cycle consisted of lowering the temperature continuously over 5 minutes and raising the temperature continuously over 3 minutes. In addition, while raising the temperature, a 0.15 L/min flow of 60% argon, 40% helium, and trace neon was added, and while lowering the temperature, a 0.3 L/min flow of 100% helium, trace neon, and trace krypton was added. At sweep count 0.5, a krypton radiation source was initiated in the sealed enclosure. At sweep count 1.0, an argon radiation source was initiated in the sealed enclosure. At sweep count 4.5, the short wave ultraviolet radiation source was terminated in the sealed enclosure. The reactor temperature was then lowered to 2377° F. over 5 minutes. The temperature was varied between 2346° F. and 2377° F. for 15.5 cycles. Each cycle consisted of lowering the temperature continuously over 15 minutes and raising the temperature continuously over 15 minutes. In addition, while raising the temperature, a 0.15 L/min flow of 60% argon, 40% helium, and trace neon was added, and while lowering the temperature, a 0.3 L/min flow of 100% helium, trace neon, and trace krypton was added. After the 15.5$^{th}$ cycle, third body gas addition was changed by turning off all gas components except the trace neon gas flow.

After the 15.5$^{th}$ cycle, a timer was started. At a time of 3 minutes, the xenon radiation source was remotely rotated within the sealed enclosure. The timer was then reset to zero. At 60 minutes, flow rates were adjusted to 0.3 L/min of 100% argon and trace neon. At 65 minutes, flow rates were adjusted to 30 ml/min of 60% argon, 40% helium, and trace neon. Immediately after the flow was adjusted, one of the neon radiation sources was remotely rotated within the sealed enclosure. At 68 minutes, flow rates were adjusted to 0.15 L/min of 100% helium, trace neon, and trace krypton. At 68 minutes 20 seconds, the 1 volt power was brought to zero output and the voltage power leads removed from the voltage probes. At 68 minutes 30 seconds, the long wave ultraviolet radiation source was turned off in the sealed enclosure. At 71 minutes 15 seconds, the voltage probes were repositioned to three inches above the bath surface. At 75 minutes, the source and ground probes are removed completely from the reactor.

After the voltage probes have been removed from the reactor, flow rates were adjusted to 0.15 L/min of 77% argon, 18% nitrogen, 5% helium and trace neon. The reactor was then held at temperature and flow rate for 15 minutes. After the 15 minute hold, one of the argon radiation sources was turned off in the sealed enclosure. The flow rates were immediately readjusted to 0.15 L/min of 77% argon, 12% nitrogen, 11% helium and trace neon. The reactor was then held at temperature and flow rate for 25 minutes. After the 25 minute hold, the krypton radiation source was turned off in the sealed enclosure. The flow rates were immediately readjusted to 0.30 L/min of 10% argon, 90% helium and trace neon. The reactor was then held at temperature and flow rate for 3 minutes. After the 3 minute hold, flow rates were adjusted to the flow rate 0.15 L/min of 10% argon, 90% helium and trace neon and held for 2 minutes. After the 2 minute hold, flow rates were adjusted to 0.30 L/min of 7% hydrogen, 93% nitrogen and trace neon and held for 10 minutes. After the 10 minute hold, flow rates were adjusted to 0.15 L/min of 7% hydrogen, 93% nitrogen and trace neon and held for 3 minutes. After the 3 minute hold, flow rates were adjusted to 30 ml/min of 7% hydrogen, 93% nitrogen and trace neon and held for 2 minutes. After the 2 minute hold, flow rates were adjusted to 0.15 L/min of 87% argon, 10% nitrogen, 3% helium and trace neon and held for 5 minutes. After the 5 minute hold, flow rates were adjusted to 0.6 L/min of 90% argon, 10% nitrogen and trace neon and held for 7 minutes. After the 7 minute hold, flow rates were adjusted to 30 ml/min of 90% argon, 10% nitrogen and trace neon and held for 2 minutes. After the 2 minute hold, flow rates were adjusted to 0.60 L/min of 95% argon, 5% nitrogen and trace neon and held for 15 minutes. After the 15 minute hold, flow rates were adjusted to 0.30 L/min of 95% argon, 5% nitrogen and trace neon and held for 5 minutes.

The reactor temperature was then lowered to 2359° F. over 21 minutes. The temperature was then varied between 2346° F. and 2359° F. for three cycles. The cycles consisted of raising the temperature continuously over 27 minutes and lowering the temperature continuously over 27 minutes. After the third cycle, the bath was held at 2359° F. for 5 minutes. The reactor temperature was then lowered to 2346° F. over 2 minutes 30 seconds. The temperature was then varied between 2359° F. and 2346° F. for two cycles. The cycles consisted of raising the temperature continuously over 11 minutes and lowering the temperature continuously over 7 minutes.

After completion of the 2$^{nd}$ cycle, the induction power supply was placed into manual control. The power was then instantaneously increased 5 kW above the steady state power level and immediately upon hitting the 5 kW, the power was instantaneously decreased back to the steady state power level. The power level was then varied up 3.7 kW and down 3.7 kW over 6 cycles. The cycles consisted of raising power 3.7 kW above the steady state power level over 25 seconds. Once raised, the power level was held at the additional 3.7 kW setting for 45 seconds. Following the 45 second hold, the power was lowered back to the steady state power level over a 15 second time frame.

After the 6$^{th}$ power cycle, the gas flows were adjusted to 0.60 L/min of 100% argon and trace neon and held for 7 minutes. Following the seven minute hold, the argon flow was secured leaving only the trace neon flow. Once the argon flow was secured, a second lance was positioned inside the reactor. This lance was placed at a distance ⅔ from the radial center and 1.5 inches from the bottom of the bath. The centerline lance was then repositioned to ¼ inch off the bottom. Once the centerline lance was repositioned, flow was started in the off-centerline lance at a rate of 30 ml/min of 100% argon and trace neon. A timer was then initiated. At a time of 2 minutes, the trace neon flow in the centerline lance was discontinued. At a time of 2 minutes 30 seconds, flow was initiated in the centerline lance at a flow rate of 30 ml/min of 100% carbon monoxide and held for 3 minutes. After the 3 minute hold, flow rates were adjusted in the off-centerline lance to 0.15 L/min of 100% argon and trace neon and held for 15 minutes. After the 15 minute hold, flow rates were adjusted in the off-centerline lance to trace neon only. Furthermore, the flow rate was adjusted in the centerline lance to 0.60 L/min of 100% carbon monoxide and held for 10 minutes. After the 10 minute hold, the carbon monoxide in the centerline lance was turned off. The reactor temperature was then lowered to $T_{solidus}$ plus 18° F. over 30 minutes. Upon reaching the $T_{solidus}$ plus 18° F., flow was adjusted in the centerline lance to 0.30 L/min of 100% carbon monoxide and held for 20 minutes. After the 20 minute hold, all flow was secured in the centerline lance and the lance was removed.

After the centerline lance was removed, flow rates in the off-centerline lance were adjusted to 30 ml/min of 88% argon, 12% nitrogen and trace neon and held for 3 minutes. After the 3 minute hold, flow rates were adjusted to 0.30 L/min of 25% helium, 75% argon and trace neon and held for 10 minutes. After the 10 minute hold, flow rates were adjusted to 0.30 L/min of 88% argon, 12% nitrogen and trace neon and held for 10 minutes. After the 10 minute hold, flow rates were adjusted to 0.15 L/min of 88% argon, 12% nitrogen and trace neon and held for 5 minutes. After the 5 minute hold, flow rates were adjusted to 30 ml/min of 88% argon, 12% nitrogen and trace neon and held for 2 minutes. After the 2 minute hold, flow rates were adjusted to 0.15 L/min of 88% argon, 12% nitrogen and trace neon. Once the flow rate was adjusted, the reactor temperature was lowered to $T_{solidus}$ plus 15° F. over 45 minutes. Upon reaching the $T_{solidus}$ plus 15° F., flow was adjusted in the off-centerline lance to 0.30 L/min of 100% argon and trace neon and held for 5 minutes.

At the completion of five minute hold, the reactor temperature was lowered to $T_{solidus}$ plus 11° F. while maintaining a temperature lowering rate of no more than 3° F./hr. Upon reaching $T_{solidus}$ plus 11° F., flow rate in the off-centerline lance was adjusted to 0.30 L/min of 100% hydrogen and trace neon. At the completion of the flow adjustment, the reactor temperature was lowered to $T_{solidus}$ plus 10° F. while maintaining a temperature lowering rate of no more than 3° F./hr. Upon reaching $T_{solidus}$ plus 10° F., flow rate in the off-centerline lance was adjusted to 30 ml/min of 100% hydrogen and trace neon. At the completion of the flow adjustment, the reactor temperature was lowered to $T_{solidus}$ plus 9° F. while maintaining a temperature lowering rate of no more than 3° F./hr. Upon reaching $T_{solidus}$ plus 9° F., the gas addition lance was relocated into the headspace of the reactor, such that a quarter inch (¼ inches) dimple could be observed on the bath surface. The bath was held at $T_{solidus}$ plus 9° F. for an additional 5 minutes for conditioning and equilibration. The reactor was then cooled to $T_{solidus}$ plus 8° F. while maintaining a temperature lowering rate of no more than 3° F./hr. Upon reaching $T_{solidus}$ plus 8° F. a manual power pulse of 2 kW was introduced with a single continuous up/down sweep from normal holding power. The reactor was then cooled to $T_{solidus}$ plus 2° F. while maintaining a temperature lowering rate of no more than 3° F./hr. Upon reaching $T_{solidus}$ plus 2° F., a manual power pulse of 1.5 kW was introduced with a single continuous up/down sweep from normal holding power. Immediately after the 1.5 kW power pulse, flow was adjusted in the off-centerline lance to 0.15 L/min of 50% hydrogen, 50% helium, and trace neon. The reactor was then cooled to $T_{solidus}$ again maintaining a temperature-lowering rate of no more than 3° F./hr. Upon reaching $T_{solidus}$, the induction furnace power supply was lowered to 1 kW and the reactor was allowed to cool from $T_{solidus}$ to $T_{solidus}$ minus 75° F. Upon reaching $T_{solidus}$ minus 75° F., flow rate in the off-centerline lance was adjusted to 30 ml/min of 60% helium, 40% hydrogen and trace neon. Following the flow adjustment, the induction furnace power supply was lowered to 0.75 kW and the reactor was allowed to cool to 1000° F. Upon reaching 1000° F., flow rate in the off-centerline lance was adjusted to 30 ml/min of 100% helium and trace neon. Following the flow adjustment, the induction furnace power supply was lowered to 0.50 kW and the reactor was allowed to cool to 350° F. Upon reaching 350° F., the induction furnace power supply was shut down and a timer initiated as time zero (e.g., Timer=$T_0$). At a time of 5 minutes, flow rate in the off-centerline lance was adjusted to 0.60 L/min of 100% helium and trace neon. At a time of 9 minutes, a neon radiation source was remotely rotated within the sealed enclosure. Upon completion of the 90° rotation, flow in the off-centerline lance was adjusted to 0.30 L/min of 88% argon, 12% nitrogen and trace neon.

Following the flow adjustment, the timer was reinitiated to time zero. At a time of 25 seconds, a neon radiation source within the sealed enclosure was remotely rotated. At a time of 1 minute 30 seconds, a neon radiation source within the sealed enclosure was turned off. At a time of 5 minutes, an argon radiation source within the sealed enclosure was turned off. At a time of 6 minute 30 seconds, flow rate was adjusted to 0.30 L/min of 100% helium and trace neon. At a time of 7 minute, the second neon radiation source within the sealed enclosure was turned off.

The timer was reinitiated to time zero (e.g., Timer=$T_0$). At a time of 15 minutes, the trace neon gas flow in the off-centerline lance was stopped. At a time of 17 minutes 25 seconds, the xenon radiation source was remotely rotated 90° within the sealed enclosure. At a time of 30 minutes, the trace helium gas flow in the off-centerline lance was turned off. The timer was reinitiated to time zero (e.g., Timer=$T_0$). At a time of 15 minutes, the xenon radiation source inside the sealed enclosure was turned off. Thirty minutes were allowed to pass. The ingot and crucible were removed from the reactor using titanium metal tongs in the presence of light from metal halide lamps.

Upon removal from the reactor assembly, the crucible was stripped from the metal ingot via a gentle wedging action. Immediately following removal, the ingot was transferred into a quench chamber containing deionized water, ensuring that the top of the ingot surface was covered by at least 6 inches of deionized (DI) water. Upon immersion into the quench chamber, a timer was established. At a time of 2 hours 15 minutes, a long wave ultraviolet radiation source located above the quench vessel was initiated. At a time of 4 hours 7 minutes, a short wave ultraviolet radiation source located above the quench vessel was initiated. At a time of 5 hours 59 minutes 30 seconds, the short wave ultraviolet radiation source located above the quench vessel was rotated to a vertical position.

At a time of 6 hours, the ingot was removed from the quench system using the titanium metal tongs and transferred to a clean radiation surface countertop. Exposure to external radiation sources included the metal halide light and placement directly under a skylight (which added filtered sunlight to the irradiation sources). The ingot was pat dried. Upon completion of the drying, the long wave ultraviolet radiation source located above the quench vessel was rotated to a vertical position and moved up 1 inch. The timer was then reset to zero. The ingot was irradiated for 10 minutes at which point an additional radiation source (krypton lamp) was initiated. At 12 minutes 30 seconds, the long wave ultraviolet radiation source located above the quench vessel was rotated and moved down to its original position. At 13 minutes, a xenon radiation source located above the quench vessel was initiated. At 18 minutes, two orthogonal fluorescent lamp racks located next to the countertop were turned on. At 30 minutes, two angled metal halide lights located next to the countertop were simultaneously turned on. At this point the timer was again reset. At 13 minutes 15 seconds, a neon radiation source located next to the countertop was turned on. At 15 minutes seconds, an argon radiation source located next to the countertop was turned on. At 23 minutes 45 seconds, the argon radiation source located next to the countertop was rotated to an angle of 35°. At 37 minutes 30 seconds, the short wave ultraviolet radiation source located above the quench vessel was rotated to 35°. At 47 minutes 30 seconds, the xenon radiation source located above the quench vessel was rotated to horizontal. At 52 minutes 45 seconds, the long wave ultraviolet radiation source located above the quench vessel was rotated to 35°. At 58 minutes 30 seconds, the short wave ultraviolet radiation source located above the quench vessel was rotated to 55°. At 77 minutes, the krypton radiation source located next to the countertop was rotated to vertical. At 89 minutes, the krypton radiation source located next to the countertop was rotated to 78°. At 93 minutes, the ingot was lifted using composite black rubber gloves and a tailored material that acts an energy filter was placed under the ingot. The tailored material used as an energy filter has an XRF as depicted in Appendix 1. The ingot was then lowered onto the tailored energy filter. During the installation no direct skin contact with the ingot was allowed. At 97 minutes, the krypton radiation source located next to the countertop was rotated to 88°.

At this point the timer was again reset. At a time of 6 hours, the krypton lamp, short wave ultraviolet, long wave ultraviolet, argon (located over quench vessel), xenon, argon (located next to countertop), neon, two orthogonal fluorescent lamp racks, and the two angled metal halide lights were sequentially terminated in the given order. The timer was again reset. At a time of 6 hours, 30 minutes, normal lab lighting (metal halides) was turned off. The timer was reset. For 48 hours, the ingot was allowed to stabilize with no manual intervention (i.e., no handling).

Example 8

Experimental Procedure for Copper Method "HD" RUN 14-04-05

A cylindrical alumina-based crucible (99.68% $Al_2O_3$, 0.07% $SiO_2$, 0.08% $Fe_2O_3$, 0.04% CaO, 0.12% $Na_2O_3$; 4.5 inches O.D.×3.75 inches I.D.×14.5 inches depth) of a 100 pound induction furnace reactor (Inductotherm) fitted with a 73-30R Powertrak power supply. A gas addition lance was installed to a position approximately ¼ inches from the bottom of the reactor. The reactor was charged with 9080 g copper (99.98% purity) through its charging port. The reactor was fitted with a graphite cap and a ceramic liner (i.e., the crucible, from Engineering Ceramics). During the entire procedure, a slight positive pressure of 97% argon, 3% hydrogen (~0.5 psig) was maintained in the reactor using a continuous backspace purge. Bypass injection of gas addition was commenced (i.e., gas flow diverted around the reactor was initiated) at a rate of 0.15 L/min of argon. The incoming gas line for the gas addition lance passed through a sealed, light-tight enclosure whereby irradiation of the gas with precise radiation sources (e.g., wavelength, intensity, etc.) was achieved. When the entire gas line was completely purged (assuming a plug flow model), a neon radiation source was activated within the sealed enclosure. A timer was set to zero. Bypass flow was adjusted to 100% argon at a flow rate of 0.15 L/min with trace neon present (trace can be defined as ≤0.005% vol. to ≤5%). At a time of 3 minutes, an argon radiation source was activated within the sealed enclosure. After completion of another gas line purge (assuming a plug flow model), the gas line was switched from bypass to direct injection through the gas addition lance.

The induction furnace power was then initiated. The reactor was heated to 450° F., at a rate no greater than 300° F./hr, as limited by the integrity of the crucible. The induction furnace operated in the frequency range of 0 Hz to 3000 Hz, with frequency determined by a temperature-controlled feedback loop implementing an Omega Model CN3000 temperature controller. Upon reaching 450° F., the gas addition lance was repositioned to 2 inches from the bottom of the reactor. The timer was again set to zero. At a time of 2 minutes, the gas composition was changed to 0.15 L/min of 66% nitrogen, 34% hydrogen with trace neon present. After completion of another gas line purge (assuming a plug flow model), a krypton radiation source was initiated in the sealed enclosure. The reactor heat up was continued at a rate no greater than 300° F./hr, as limited by the integrity of the crucible, until $T_{solidus}$ minus 30° F. was achieved. The gas flow rate was then increased to 0.3 L/min with a constant gas composition. At $T_{solidus}$ a second argon radiation source was activated within the sealed enclosure. $T_{solidus}$ plus 8° F. was approached over a 3 to 5 minute time span. From $T_{solidus}$ plus 8° F. to $T_{solidus}$ plus 15° F., the gas flow rate was reduced to 0.15 L/min with a constant gas composition. Immediately upon reaching $T_{solidus}$ plus 15° F., a second neon radiation source was initiated in the sealed enclosure. Immediately after the second neon radiation source was initiated, the gas composition was adjusted to 75% hydrogen, 22% nitrogen, 3% argon and trace neon. The molten bath was held at this condition for 5 minute for stabilization.

After the 5 minute hold, the gas composition was adjusted to 20% helium, 63% nitrogen, 17% argon, and trace neon. The bath was held under these conditions for an additional 15 minutes. Again, following the hold, the gas composition and flow rate were adjusted to 100% argon with trace neon at a rate of 0.3 L/min. The reactor was held at this condition for 3 minutes. The timer was reset to zero. At a time of 65 minutes, graphite saturation assemblies (⅜ inches OD, 36 inches long high purity (<5 ppm impurities) graphite rods) were inserted to the bottom of the copper charge through ports located in the top plate. The copper was heated to 2359° F. over a one hour period. The bath was then held at this condition for 2 hours. Every 30 minutes during the hold period, an attempt was made to lower the graphite saturation assemblies as dissolution occurred. As the copper became saturated with carbon, the graphite saturation assemblies were consumed. After the 2 hour hold period was complete, the graphite saturation assemblies were removed. An additional 2.06 grams of graphite powder was charged into the reactor through the charging port. The bath was then heated to 2474° F. over one hour. Upon achieving 2474° F., the gas composition and flow rate were adjusted to 100% nitrogen with trace neon at a rate of 0.3 L/min. The reactor conditions were held for 5 minutes. The gas flow rate was reduced to 0.15 L/min with constant composition. Immediately following this reduction in gas flow, the krypton radiation source in the sealed enclosure was turned off. The timer was reset to zero. At a time of 3 minutes, the gas flow rate was reduced to 37.5 ml/min with constant composition. One of the argon radiation sources inside the sealed enclosure was turned off. At a time of 5 minutes, the nitrogen component of the gas flow was discontinued, while maintaining the flow of the trace neon. At a time of 10 minutes, one of the neon radiation sources was remotely rotated (90°) within the sealed enclosure. The reactor temperature was lowered to 2451° F. over 7 minutes.

The temperature was then varied between 2413° F. and 2451° F. for 16 cycles. Each cycle consisted of raising the temperature continuously over 7 minutes and lowering the temperature continuously over 7 minutes. After completion of the 14.5 cycles, argon was reintroduced at a flow rate of 0.15 L/min with trace neon. Five minutes into the 15$^{th}$ cycle, a xenon radiation source was activated within the sealed enclosure. At 6 minutes into the 15$^{th}$ cycle, a long wave ultraviolet radiation source was activated in the sealed enclosure. At sweep count 15.5, a short wave ultraviolet radiation source was initiated in the sealed enclosure. At sweep count 16, remotely rotate the xenon radiation source within the sealed enclosure. The temperature of the copper was varied over another 5 cycles between 2413° F. and 2451° F. After the fifth cycle, the reactor temperature was lowered to 2400° F. over a 10 minute period. Upon achieving the target temperature of 2400, the graphite saturation assemblies were reinstalled in the copper and remained there for 1 hour. The graphite saturation assemblies were then removed.

Two voltage probes (source and ground probe) were then installed in the headspace of the reactor and allowed to equilibrate for 5 minutes. Upon completion of the five minute hold the voltage probes were lowered into the bath. The source probe should be positioned 2 inches below the axial center and 1 inch from the radial center. The ground probe was positioned 0.75 inches above the axial position of the source probe and 1 inch from the radial center (180° from the source probe). Once the probes were installed a five minute hold at this condition was done to allow the bath to electronically equilibrate with the probes. Voltage was then applied to the probes and varied between multiple voltage set points. This voltage application was in a continuous up/down sweep between two predetermined voltages. The first voltage cycle was varied between 17 and 18 volts for 24 cycles. Each cycle consisted of raising the voltage continuously over 45 seconds and lowering the voltage continuously over seconds. The second voltage cycle was varied between 13.25 and 14.75 volts for 20 cycles. Each cycle consisted of raising the voltage continuously over 45 seconds and lowering the voltage continuously over 45 seconds. The third voltage cycle was varied between 8.75 and 10.25 volts for 17 cycles. Each cycle consisted of raising the voltage continuously over 45 seconds and lowering the voltage continuously over 45 seconds. The fourth voltage cycle was varied between 4.00 and 7.00 volts for 14 cycles. Each cycle consisted of raising the voltage continuously over 45 seconds and lowering the voltage continuously over 45 seconds. The fifth voltage cycle was varied between 1.50 and 5.00 volts for 10 cycles. Each cycle consisted of raising the voltage continuously over 45 seconds and lowering the voltage continuously over 45 seconds. The sixth voltage cycle was varied between 0.50 and 2.00 volts for 3 cycles. Each cycle consisted of raising the voltage continuously over 45 seconds and lowering the voltage continuously over 45 seconds. When the final cycle was completed the voltage was set onto a constant 1 volt setting. This voltage setting remains constant until a later step during which the leads are removed.

The reactor temperature was lowered to 2397° F. over 5 minutes. The reactor was held at this temperature for 5 minutes with continued gas addition. The temperature was then varied between 2391° F. and 2397° F. over 20 cycles. Each cycle consisted of lowering the temperature continuously over 9 minutes and raising the temperature continuously over 9 minutes. After the 20$^{th}$ cycle, third body gas addition was changed by turning off the argon component of the gas leaving only trace neon gas flow. The bath was then cooled to 2388° F. over 5 minutes. Upon reaching 2388° F., remotely rotate one of the neon radiation sources within the sealed enclosure.

The temperature was then varied between 2380° F. and 2388° F. over 4.5 cycles. Each cycle consisted of lowering the temperature continuously over 5 minutes and raising the temperature continuously over 3 minutes. In addition, while raising the temperature, a 0.15 L/min flow of 60% argon, 40% helium, and trace neon was added, and while lowering the temperature, a 0.3 L/min flow of 100% helium, trace neon, and trace krypton was added. At sweep count 0.5, a krypton radiation source was initiated in the sealed enclosure. At sweep count 1.0, an argon radiation source was initiated in the sealed enclosure. At sweep count 4.5, the short wave ultraviolet radiation source was terminated in the sealed enclosure. The reactor temperature was lowered to 2377° F. over 5 minute. The temperature was varied between 2346° F. and 2377° F. for 15.5 cycles. Each cycle consisted of lowering the temperature continuously over 15 minutes and raising the temperature continuously over 15 minutes. In addition, while raising the temperature, a 0.15 L/min flow of 60% argon, 40% helium, and trace neon was added, and while lowering the temperature, a 0.3 L/min flow of 100% helium, trace neon, and trace krypton was added. After the 15.5$^{th}$ cycle, third body gas addition was changed by turning off all gas components except the trace neon gas flow.

After the 15.5$^{th}$ cycle, a timer was established. At a time of 3 minutes, the xenon radiation source was rotated 90° within the sealed enclosure. The timer was then reset to zero. At 60 minutes, flow rates were adjusted to 0.3 L/min of 100% argon and trace neon. At 65 minutes, flow rates were adjusted to 30 ml/min of 60% argon, 40% helium, and trace neon. Immediately after the flow was adjusted, one of the neon radiation sources was remotely rotated 90° within the sealed enclosure. At 68 minutes, flow rates were adjusted to 0.15 L/min of 100% helium, trace neon and trace krypton. At 68 minutes 20 seconds, the 1 volt power was brought to zero output and the voltage power leads removed from the voltage probes. At 68 minutes 30 seconds, the long wave ultraviolet radiation source was turned off in the sealed enclosure. At 71 minutes 15 seconds, the voltage probes were repositioned to three inches above the bath surface. At 75 minutes, the source and ground probes were removed completely from the reactor.

After the voltage probes had been removed from the reactor, flow rates were adjusted to 0.15 L/min of 77% argon, 18% nitrogen, 5% helium and trace neon. The reactor was then held at temperature and flow rate for 15 minutes. After the 15 minute hold, an argon radiation source was turned off in the sealed enclosure. The flow rates were immediately readjusted to 0.15 L/min of 77% argon, 12% nitrogen, 11% helium and trace neon. The reactor was then held at temperature and flow rate for 25 minutes. After the 25 minute hold, the krypton radiation source was turned off in the sealed enclosure. The flow rates were immediately readjusted to 0.30 L/min of 10% argon, 90% helium and trace neon. The reactor was then held at temperature and flow rate for 3 minutes. After this 3 minute hold, flow rates were adjusted to 0.15 L/min of 10% argon, 90% helium and trace neon and held for 2 minutes. After this 2 minute hold, flow rates were adjusted to 0.30 L/min of 7% hydrogen, 93% nitrogen and trace neon and held for 10 minutes. After this 10 minute hold, flow rates were adjusted to 0.15 L/min of 7% hydrogen, 93% nitrogen and trace neon and held for 3 minutes. After this 3 minute hold, flow rates were adjusted to 30 ml/min of 7% hydrogen, 93% nitrogen and trace neon and held for 2 minutes. After this 2 minute hold, flow rates were adjusted to 0.15 L/min of 87% argon, 10% nitrogen, 3% helium and trace neon and held for 5 minutes. After this 5 minute hold, flow rates were adjusted to 0.6 L/min of 90% argon, 10% nitrogen and trace neon and held for 7 minutes. After this 7 minute hold, flow rates were adjusted to 30 ml/min of 90% argon, 10% nitrogen and trace neon and held for 2 minutes. After this 2 minute hold, flow rates were adjusted to 0.60 L/min of 95% argon, 5% nitrogen and trace neon and held for 15 minutes. After this 15 minute hold, flow rates were adjusted to 0.30 L/min of 95% argon, 5% nitrogen and trace neon and held for 5 minutes.

The reactor temperature was then lowered to 2359° F. over 21 minutes. The temperature was then varied between 2346° F. and 2359° F. for three cycles. The cycles consisted of raising the temperature continuously over 27 minutes and lowering the temperature continuously over 27 minutes. After the third cycle, the bath was held at 2359° F. for 5 minutes. The reactor temperature was then lowered to 2346° F. over 2 minutes 30 seconds. The temperature was then varied between 2359° F. and 2346° F. for two cycles. The cycles consisted of raising the temperature continuously over 11 minutes and lowering the temperature continuously over 7 minutes.

After the completion of the $2^{nd}$ cycle, the induction power supply was placed into manual control. The power was then instantaneously increased 5 kW above the steady state power level and immediately upon hitting the 5 kW increase the power was instantaneously decreased back to the steady state power level. The power level was then varied up 3.7 kW and down 3.7 kW over 6 cycles. The cycles consisted of raising power 3.7 kW above the steady state power level over 25 seconds. Once raised, the power level was held at the additional 3.7 kW setting for 45 seconds. Following the 45 second hold, the power was lowered back to the steady state power level over a 15 second time frame.

After the $6^{th}$ power cycle, the gas flows were adjusted to 0.60 L/min of 100% argon and trace neon and held for 7 minutes. Following the seven minute hold, the argon flow was turned off leaving only the trace neon flow. Once the argon flow was turned off, a second lance was positioned inside the reactor. This lance should be placed at a position ⅔ of the distance from the radial center and 1.5 inches from the bottom of the bath. The centerline lance was then repositioned to ¼ inch from the bottom. Once the centerline lance was repositioned, flow was started in the off-centerline lance at a rate of 30 ml/min of 100% argon and trace neon. A timer was then initiated at zero (e.g., Timer=$T_0$). At a time of 2 minutes, the trace neon flow in the centerline lance was stopped. At a time of 2 minutes 30 seconds, flow was initiated in the centerline lance at a flow rate of 30 ml/min of 100% carbon monoxide and held for 3 minutes. After the 3 minute hold, flow rates were adjusted in the off-centerline lance to 0.15 L/min of 100% argon and trace neon and held for 15 minutes. After the 15 minute hold, flow rates were adjusted in the off-centerline lance to trace neon only. Furthermore, the flow rate was adjusted in the centerline lance to 0.60 L/min of 100% carbon monoxide and held for 10 minutes. After the 10 minute hold, the carbon monoxide in the centerline lance was turned off. The reactor temperature was then lowered to $T_{solidus}$ plus 18° F. over 30 minutes. Upon reaching the $T_{solidus}$ plus 18° F., flow was adjusted in the centerline lance to 0.30 L/min of 100% carbon monoxide and held for 20 minutes. After the 20 minute hold, all flow was discontinued in the centerline lance and the lance was removed.

After the centerline lance was removed, flow rates are adjusted in the off-centerline lance to 30 ml/min of 88% argon, 12% nitrogen and trace neon and held for 3 minutes. After the 3 minute hold, flow rates were adjusted to 0.30 L/min of 25% helium, 75% argon and trace neon and held for 10 minutes. After the 10 minute hold, flow rates were adjusted to 0.30 L/min of 88% argon, 12% nitrogen and trace neon and held for 10 minutes. After the 10 minute hold, flow rates were adjusted to 0.15 L/min of 88% argon, 12% nitrogen and trace neon and held for 5 minutes. After the 5 minute hold, flow rates were adjusted to 30 ml/min of 88% argon, 12% nitrogen and trace neon and held for 2 minutes. After the 2 minute hold, flow rates were adjusted to 0.15 L/min of 88% argon, 12% nitrogen and trace neon. Once the flow rate was adjusted, the reactor temperature was then lowered to $T_{solidus}$ plus 15° F. over 45 minutes. Upon reaching the $T_{solidus}$ plus 15° F., flow was adjusted in the off-centerline lance to 0.30 L/min of 100% argon and trace neon and held for 5 minutes.

At the completion of the 5 minute hold, the reactor temperature was then lowered to $T_{solidus}$ plus 11° F. while maintaining a temperature lowering rate of no more than 3° F./hr. Upon reaching $T_{solidus}$ plus 11° F., the flow rate in the off-centerline lance was adjusted to 0.30 L/min of 100% hydrogen and trace neon. At the completion of the flow adjustment, the reactor temperature was then lowered to $T_{solidus}$ plus 10° F. while maintaining a temperature lowering rate of no more than 3° F./hr. Upon reaching $T_{solidus}$ plus 10° F., the flow rate in the off-centerline lance was adjusted to 30 ml/min of 100% hydrogen and trace neon. At the completion of the flow adjustment, the reactor temperature was lowered to $T_{solidus}$ plus 9° F. while maintaining a temperature lowering rate of no more than 3° F./hr. Upon reaching $T_{solidus}$ plus 9° F., the gas addition lance was relocated into the headspace of the reactor, such that a quarter inch (¼ inches) dimple could be observed on the bath surface. The bath was held at $T_{solidus}$ plus 9° F. for an additional 5 minutes for conditioning and equilibration. The reactor was then cooled to $T_{solidus}$ plus 8° F. while maintaining a temperature lowering rate of no more than 3° F./hr. Upon reaching $T_{solidus}$ plus 8° F. a manual power pulse of 2 kW was introduced with a single continuous up/down sweep from normal holding power. The reactor was then cooled to $T_{solidus}$ plus 2° F. while maintaining a temperature lowering rate of no more than 3° F./hr. Upon reaching $T_{solidus}$ plus 2° F. a manual power pulse of 1.5 kW was introduced with a single continuous up/down sweep from normal holding power. Immediately after the 1.5 kW power pulse, flow was adjusted in the off-centerline lance to 0.15 L/min of 50% hydrogen, 50% helium and trace neon. The reactor was then cooled to $T_{solidus}$ again maintaining a temperature-lowering rate of no more than 3° F./hr. Upon reaching $T_{solidus}$, the induction furnace power supply was lowered to 1 kW and the reactor was allowed to cool from $T_{solidus}$ to $T_{solidus}$ minus 75° F. Upon reaching $T_{solidus}$ minus 75° F., flow rate in the off-centerline lance was adjusted to 30 ml/min of 60% helium, 40% hydrogen and trace neon. Following the flow adjustment, the induction furnace power supply was lowered to 0.75 kW and the reactor was allowed to cool to 1000° F. Upon reaching 1000° F., flow rate in the off-centerline lance was adjusted to 30 ml/min of 100% helium and trace neon. Following the flow adjustment, the induction furnace power supply was lowered to 0.50 kW and the reactor was allowed to cool to 350° F. Upon reaching 350° F., the induction furnace power supply was shut down and a timer initiated at time zero. At a time of 5 minutes, flow rate in the off-centerline lance was adjusted to 0.60 L/min of 100% helium and trace neon. At a time of 9 minutes, a neon radiation source within the sealed enclosure was remotely rotated 90°. Upon completion of the rotation, flow in the off-centerline lance was adjusted to 0.30 L/min of 88% argon, 12% nitrogen and trace neon.

Following the flow adjustment, reinitiate the timer to zero. At a time of 25 seconds, remotely rotate a neon radiation source within the sealed enclosure (90°). At a time of 1 minute 30 seconds, a neon radiation source within the sealed enclosure was turned off. At a time of 5 minutes, an argon radiation source within the sealed enclosure was turned off. At a time of 6 minute 30 seconds, flow rate was adjusted to 0.30 L/min of 100% helium and trace neon. At a time of 7 minute, the second neon radiation source within the sealed enclosure was turned off.

The timer was reinitiated to time zero. At a time of 15 minutes, the trace neon gas flow in the off-centerline lance was turned off. At a time of 17 minutes 25 seconds, the xenon radiation source within the sealed enclosure was remotely rotated 90°. At a time of 30 minutes, the trace helium gas flow in the off-centerline lance was turned off. The timer was reinitiated to time zero. At a time of 15 minutes, the xenon radiation source inside the sealed enclosure was turned off. Thirty minutes were allowed to pass. The ingot and crucible were removed from the reactor in the presence of radiation sources (metal halide light sources) utilizing titanium metal tongs.

Upon removal, the crucible was stripped from the metal ingot via a gentle wedging action. Immediately following removal, the ingot was transferred into a quench chamber containing deionized water, ensuring that the top of the ingot surface was covered by at least 6 inches of DI water. Upon entrance into the quench chamber, a timer was established at time zero. At a time of 2 hours 15 minutes, a long wave ultraviolet radiation source located above the quench vessel was initiated. At a time of 4 hours 7 minutes, a short wave ultraviolet radiation source located above the quench vessel was initiated. At a time of 5 hours 59 minutes 30 seconds, the short wave ultraviolet radiation source located above the quench vessel was rotated (90°) to a tip up position.

At a time of 6 hours, the ingot was removed from the quench system using the titanium metal tongs and transferred to a clean radiation surface countertop. Exposure to external radiation sources included the metal halide light and placement directly under a skylight (which added filtered sunlight to the irradiation sources). The ingot was pat dried.

Upon completion of the drying, the long wave ultraviolet radiation source located above the quench vessel was rotated to a vertical orientation and moved up 1 inch. The timer was then reset to zero. The ingot was irradiated for 10 minutes at which point an additional radiation source (krypton lamp) was initiated. At 12 minutes 30 seconds, the long wave ultraviolet radiation source located above the quench vessel was rotated (90°) and moved down to its original position. At 13 minutes, a xenon radiation source located above the quench vessel was initiated. At 18 minutes, two orthogonal fluorescent lamp racks located next to the countertop were turned on. At 30 minutes, two angled metal halide lights located next to the countertop were simultaneously turned on. At this point the timer was again reset to zero. At 13 minutes 15 seconds, a neon radiation source located next to the countertop was turned on. At 15 minutes 30 seconds, an argon radiation source located next to the countertop was turned on. At 23 minutes 45 seconds, the argon radiation source located next to the countertop was rotated to an angle of 35°. At 37 minutes 30 seconds, rotate the short wave ultraviolet radiation source located above the quench vessel to 35°. At 47 minutes 30 seconds, the xenon radiation source located above the quench vessel was rotated to a horizontal orientation. At 52 minutes 45 seconds, the long wave ultraviolet radiation source located above the quench vessel was rotated to 35°. At 58 minutes 30 seconds, the short wave ultraviolet radiation source located above the quench vessel was rotated to 55°. At 77 minutes, the krypton radiation source located next to the countertop was rotated to a vertical orientation. At 89 minutes, the krypton radiation source located next to the countertop was rotated to 78°. At 93 minutes, the ingot was lifted using composite black rubber gloves and a tailored material that acts as an energy filter was placed under the ingot. The tailored material used as an energy filter has an XRF as depicted in Appendix 1. The ingot was then lowered onto the tailored energy filter. At 97 minutes, the krypton radiation source located next to the countertop was rotated to 88°.

At this point the timer was again reset to zero. At a time of 6 hours, the krypton lamp, short wave ultraviolet, long wave ultraviolet, argon (located over quench vessel), xenon, argon (located next to countertop), neon, two orthogonal fluorescent lamp racks, and the two angled metal halide lights were sequentially turned off in the given (aforementioned) order. The timer was again reset to zero. At a time of 6 hours, 30 minutes, normal lab lighting (metal halides) was turned off. The timer was reset to zero. For 48 hours, the ingot was allowed to stabilize with no manual intervention (i.e., no handling).

Analytical Protocols:

X-Ray Fluorescence

An ARL 8410 XRF was used to analyze each of the sample ingots. An ARL 8410 is a sequential wavelength dispersive spectrometer (WDS). Specific emission lines are used to determine the presence or absence, and the concentrations of various elements. Each characteristic x-ray line is measured in sequence by the instrument by controlling the instrument geometry.

The ARL 8410 (WDS) spectrometer relies on the fundamentals of x-ray diffraction. X-ray fluorescence occurs when matter is bombarded by a stream of high-energy incident x-ray photons. When the incident X-radiation strikes the sample, the incident x-rays may be absorbed, scattered, or transmitted for the measurement of the fluorescent yield.

The ARL 8410 utilizes an end-window rhodium (Rh) x-ray tube. The end-window is composed of beryllium, and holds the tube at high vacuum. The filaments are heated giving off electrons by thermoionic emission. This beam of electrons then bombards the target Rh anode across a 10-70 keV voltage potential. Thus, primary x-rays are produced during the collision. The emitted x-ray spectrum consists of (1) "Continuum" or "Bremstrahlung" radiation, (2) Characteristic x-ray lines of the target material (e.g., K and L series), and (3) Characteristic lines from any contaminants. Thus, the primary spectrum appears as a series of sharp intense peaks arrayed over a broad hump of continuum radiation. The ARL is equipped with and uses two types of photon detectors, the Flow Proportional Counter (FPC) and the Scintillation Counter (SC).

The manufactured metal samples, unless otherwise specified, are prepared by cutting a sample with an approximate cross-section of 1.1875" from the cooled ingot. The axial edge and radial edge are then denoted. For non-brittle samples, a cube-shaped sample is used. When possible, a smooth surface is prepared for analysis; the axial and radial faces are sequentially polished. The sample faces are sanded to 400 grit and then a polishing wheel is employed with 600 grit paper. Finally, a 1 μm polishing compound completes the smoothing process.

Prior to analysis, the sample is cleaned with isopropyl alcohol (IPA) and placed in a sample cassette/holder. The sample holder is then loaded into the XRF.

The orientation of the detector crystal with respect to the sample and the photon detector is controlled synchronously such that characteristic x-ray lines can be accurately measured. A sequential measurement consists of positioning the diffraction crystal at a given theta (diffraction angle) and the detector at two-theta and counting for a given period of time. The crystal and detector are then rotated to a different angle for the next characteristic x-ray line.

XRF 386 Software by Fisons Instruments is used to control the crystal and detector placement. Uniquant Version 2 software, developed by Omega Data Systems provides the data reduction algorithms for each analytical protocol. The sample results include an elemental composition list along with the associated concentrations for each sample.

Measurement of Magnetism and Material Attraction

The magnetic and material attraction properties of the manufactured ingots were tested via four methods:

Magnetic Attraction: An ⅛ inch diameter (0.0625 inch thick) neodymium iron boron magnet (NdFeB) was scanned consistently and uniformly across the surface of the ingot to detect areas of attraction. Areas of attraction were then noted at specific sites on the surface in both a vertical and horizontally inverted (i.e., upside down) orientation.

Attraction to Iron: The attraction of iron chips (99%$_{wt}$ purity; between 10 and 25 mesh), iron powder (94%$_{wt}$ Fe, 3%$_{wt}$ C, 3%$_{wt}$ S), and spherical sponge iron (99.8%$_{wt}$ purity, $^-$50 to $^+$100 mesh) to specific areas on the tailored ingots was observed and recorded. The retention of the iron media (chips, sponge balls, or powder) on the ingot surface was observed in a vertical and horizontally inverted (i.e., upside-down) orientation.

Gauss Measurement: An F. W. Bell 4048 Gauss meter was used to perform precise measurements of the magnetic fields observable across the surfaces of the ingots. A scan of each face was performed to create grids of the magnetic force. These scans provide an indication of the magnetic flux density, the property of magnetic fields that determines the force that is exerted upon a current or moving charge. Hence, a large magnetic field measurement should be indicative of strong attraction and conversely no magnetic field measurement should be indicative of no attraction. The magnetic behavior of various points on the ingot were specifically quantified to note that even though they exhibited clear magnetic attraction, an insignificant Gauss reading was observed (e.g., comparable to the background magnetic field measured at the earth's surface).

Non-Magnetic Attraction: Many of the manufactured materials were found to exhibit unique attraction to non-magnetic, non-ferromagnetic materials. For example, sulfur powder was shown to exhibit an attraction to the surface of the tailored ingots. The sulfur powder (99.9% purity, 20 mesh) was spread evenly over the surface of the clean, polished, dry manufactured ingot. The ingot was then rotated to a vertical position (90° to the ground). The retention of powder was documented via photography and manual mapping in a lab notebook. The sample was inverted completely (180° rotation from its resting position on the surface). Again, powder retention was documented. This procedure was repeated on both the top and bottom surfaces of the manufactured ingot.

Hardness

Hardness testing was performed via multiple techniques, including Moh's hardness testing and Rockwell hardness testing (both standard techniques). In Moh's hardness testing the test angle approaches 0°, while in Rockwell testing the test angle approaches 90°. By testing at multiple angles, changes to different contributing aspects of changing the composition of matter could be tested.

The Rockwell method (ASTM 18-84 Standard Test Methods for Rockwell Hardness and Rockwell Superficial Hardness of Metallic Materials) employs either a ball or a diamond cone in a precision-testing instrument that is designed to measure depth of penetration accurately. Two superimposed impressions are made, one with a load of 10 kg and the second with a load of 100 kg. The depth to which the major load drives the ball or cone below that depth to which the minor load has previously driven it is taken as a measure of the hardness. For hardened steels, greater accuracy is obtained by using a diamond cone (120° with slightly rounded tip) applied under a major load of 150 kg. The Rockwell hardness test B uses the 1/16" diameter steel ball with a 100 kg load. Scale B is appropriate for copper alloys, soft steels, aluminum alloys, malleable iron, etc.; Scale C is appropriate for steel, hard cast irons, pearlitic malleable iron, titanium, deep case hardened steel and other materials harder than B 100. The method using the cone is designated Rockwell C test. Based on the depth of the indentation, the hardness scale can be read directly from the scale, the higher the number, the harder the material. The dial-like scale is really a depth gauge, graduated in special units specific to the test being performed, e.g., Rockwell Hardness C.

The Rockwell results are a useful measure of relative resistance to indentation; however, the Rockwell test does not serve well as a predictor of other properties such as strength or resistance to scratches, abrasion, or wear. Hence, the Rockwell hardness test cannot be used alone for product specifications.

The Moh's Scales, in use since 1822, is used to rank the relative hardness of minerals via the ability of materials to resist scratching by another material. Moh's scale consists of 10 minerals arranged in order from 1 to 10. Diamond is rated as the hardest and is indexed as 10. Talc is indexed as 1 and is the softest. Each mineral in the scale will scratch those below it:

| Mineral | Index |
|---|---|
| Diamond | 10 |
| Corundum | 9 |
| Topaz | 8 |
| Quartz | 7 |
| Orthoclase (Feldspar) | 6 |
| Apatite | 5 |
| Fluorite | 4 |
| Calcite | 3 |
| Gypsum | 2 |
| Talc | 1 |

The steps are not of equal value (i.e., nonlinear) and the difference in hardness between 9 and 10 is much greater than between 1 and 2 (i.e., step size approaches an exponential function). The hardness is determined by finding which of the standard minerals the test material will scratch or not scratch; the hardness will lie between two points on the scale—the first point being the mineral which is scratched and the next point being the mineral which is not scratched.

In the determination procedure, it is necessary to be certain that a scratch is actually made and not just a "chalk" mark that will rub off. Natural copper is between 2 and 3 and tool steel is between 6 and 7.

Appearance/Color

The color of each sample is noted via visual evaluation. In addition, unique surface configurations are documented (for example, the expulsion of material from the bath upon cooling). Digital photography is used to document the physical appearance.

Results:

The following is a list of manufactured materials prepared by the techniques described herein and the ingot compositions.

TABLE 1

Manufactured Ingots Prepared via Specified Technique

| Experimental Protocol/Method | Experimental Run Number | Metal | Quantity (grams) | Purity (wt %) |
|---|---|---|---|---|
| "AB" (Example 1) | 14-03-02 | Copper | 9080 | 99.98 |
| "AB" without EM radiation | 14-03-03 | Copper | 9080 | 99.98 |
| "AB" | 14-01-10 | Aluminum | 3454 | 99.9 |
| "AB" | 14-01-11 | Aluminum | 3454 | 99.9 |
| "HA" (Example 2) | 14-02-06 | Copper | 9080 | 99.98 |
| "HA" (Example 3) | 14-04-02 | Aluminum | 4540 | 99.99 |
| "HD" (Example 4) | 14-01-20 | Cobalt | 8899 | 99.5 |
|  |  | Vanadium | 182 | 99.5 |
|  |  | Rhenium | 7 | 99.997 |
| "HD" (Example 5) | 14-01-21 | Nickel | 9080 | 99.97 |
|  |  | Rhenium | 5 | 99.997 |
| "HD" (Example 6) | 14-01-13 | Iron | 8534 | 99.98 |
|  |  | Vanadium | 182 | 99.5 |
|  |  | Chromium | 182 | 99.999 |
|  |  | Manganese | 182 | 99.99 |
| "HD" (Example 7) | 14-04-03 | Copper | 9080 | 99.98 |
|  |  | Rhenium | 7 | 99.997 |
|  |  | Silver | 5 | 99.99 |
|  |  | Gold | 2 | 99.99 |
| "HD" (Example 8) | 14-04-05 | Copper | 9080 | 99.98 |
| "HD" with modulated cool down | 14-01-15 | Iron | 8534 | 99.98 |
|  |  | Vanadium | 182 | 99.5 |
|  |  | Chromium | 182 | 99.999 |
|  |  | Manganese | 182 | 99.99 |
| "HD" with modulated EM radiation | 14-02-03 | Iron | 9973.4 | 99.98 |
|  |  | Vanadium | 212.2 | 99.5 |
|  |  | Chromium | 212.2 | 99.999 |
|  |  | Manganese | 212.2 | 99.99 |
| "HD" with modulated (EM radiation) angle of incidence | 14-04-06 | Copper | 9080 | 99.98 |

XRF Results:

Appendix 2 shows tables of XRF data results for the manufactured materials. Note in each table the apparent detection of materials not present in the initial starting materials. Such detections are indicative of a shift in the energy of the manufactured materials, manifesting itself in "false positives" for the detection of elements not present.

In addition, despite the fact that the manufactured ingots were prepared in a very well-mixed reactor, where composition should be homogeneous, significant "apparent" compositional differences exist in the axial and radial directions. Note XRF data for each ingot is presented in back-to-back tables in Appendix 2. This anisotropic behavior is again indicative of changes in the energy patterning of the manufactured materials.

Such shifts in energy are demonstrated best in identical experiments that were performed manufacturing copper (Runs 14-03-02 and 14-03-03). The primary difference in these two experimental runs was to perform electromagnetic (EM) energy addition to the third-body gases prior to injection into the reactor. The XRF results for these experiments are summarized below in Table 2:

TABLE 2

XRF Results Summary for 14-03-02 and 14-03-03

| Element (wt %) | 14-03-02 (EM radiation addition through third-body gases) | | 14-03-03 | |
|---|---|---|---|---|
|  | Axial | Radial | Axial | Radial |
| Cu | 97.95 | 99.03 | 99.55 | 99.23 |
| Al | 1.79 | 0.79 | 0.23 | 0.29 |
| Si | 0.111 | — | 0.038 | 0.27 |
| La | 0.012 | — | 0.02 | — |
| Pr | 0.005 | — | — | 0.006 |
| Gd | — | — | 0.003 | 0.003 |
| Er | — | 0.008 | 0.013 | 0.017 |
| ΣConc. | 99.8 | 99.5 | 99.0 | 99.3 |

Note the differences in axial and radial concentrations; the detection of elements not present in any of the initial feed materials or reactor materials; and the differences in experimental results for identical experimental programs except for the addition of EM radiation through third-body gases.

Physical Appearance and Color

Visual inspection of the manufactured materials indicates that the physical characteristics of the material have been dramatically altered. Major physical changes can include color, texture, the appearance of void spaces in the ingot internals, the expulsion of metal during the cooling process, and apparent volumetric changes.

Comparison of ingots of similar composition, but manufactured via alternate techniques, can exemplify the physical manifestations of changes to the composition of matter. The exterior volume of ingot 14-04-01 (Example 1 of U.S. Ser. No. 10/123,028, substituting Al for Cu) is significantly greater (~30%) than 14-04-02 with an internal void in the ingot that runs approximately 80% down the length of the ingot. Interestingly, the ingot 14-04-01 was subjected to lower volumetric gas flow rates than ingot 14-04-02; hence gas expansion is not a plausible explanation for the physical differences. Additionally, the ingot prepared via the subject method exhibits a definite charcoal appearance, as opposed to the silvery appearance of 14-04-01. The exteriors are also different: smooth versus foil-like. Note that the magnetic behavior of ingot 14-04-01 was stronger than that of 14-04-02; yet both exhibited magnetic behavior not seen in natural aluminum. See magnetic attraction section for a discussion of magnetic attraction in tailored materials.

Similar differences in physical appearance were observed in manufactured copper ingots as well. The observed physical differences between the two ingots were:

14-01-01 (Example 1 of U.S. Ser. No. 10/123,028) had a void running approximately ⅓-½ the depth of the ingot; while 14-02-06 actually had major expulsion of material from the bath.

14-01-01 had the traditional copper color with some iridescence while the ingot 14-02-06 exhibited a strong red color, also with some iridescence and apparent band gap shift.

Interesting physical characteristics were also observable in copper ingots prepared by one of the alternate techniques described herein. Based on alterations to the experimental plan, for example changes to the third body addition and/or electromagnetic radiation sources, the material outcome were significantly different.

Two copper ingots developed via an identical experimental plan except for the addition of electromagnetic radiation through third-body addition. The surface of ingot 14-03-02 was smooth and exhibits what could be described as a "wood grain" finish. Ingot 14-03-03 exhibited a "dimpled" rough finish, with what appeared to be mosaic patterning. Material expulsion to form a "crown" was also more significant in run 14-03-03. The color in ingot 14-03-02 followed the traditional copper coloring more closely than 14-03-03 that exhibited a broader spectrum of colors including red and brown tones. As Table 2 shows, the induced elements were different for the two runs despite being prepared in the same containment system, with identical operating conditions except for the addition of EM radiation to third body gases. Hence, the composition of matter has clearly been altered in both of these manufactured ingots.

Hardness Testing

Hardness testing was performed on material standards, natural copper, manufactured copper prepared via the technique outlined in U.S. Pat. No. 6,572,792 B1, and manufactured copper prepared by the technique delineated herein. Two primary hardness techniques were used: Rockwell Hardness and Moh's Hardness.

The Metals Handbook defines hardness as "Resistance of metal to plastic deformation, usually by indentation." However, the term may also refer to stiffness or temper, to resistance to scratching, abrasion, or cutting. Hardness testing does not give a direct measurement of an engineering performance property; it correlates well with strength, wear resistance, and other properties.

Rockwell Hardness testing is an indentation testing method in which an indenter is impressed into the test sample at a prescribed load to measure the material's resistance to deformation. A Rockwell hardness number is then calculated from the depth of permanent deformation of the sample after application and removal of the test load. Various indenter shapes and sizes combined with a range of test loads form a matrix of Rockwell hardness scales.

Moh's Hardness testing is a scratch test in which known standards are used to scratch materials to specify surface hardness through resistance to scratching. Interesting test results were obtained in the testing of many of the manufactured ingots. For example, a sample could exhibit an exceptionally high Moh's hardness (i.e., resistance to scratching indicative of strong interfacial energy enhancement) yet shatter under the Rockwell Hardness Test (i.e., highly brittle material).

A Moh's scratch test was performed on a manufactured Fe/V/Cr/Mn ingot. The surface was impervious to scratching by the Moh's Standard for a hardness of 10, diamond. In fact, the diamond tip was actually damaged by the manufactured alloy, indicating that the tailored material had an apparent Moh's Hardness>10. Tool steel, a man-made material of natural elements with a similar composition to this tailored ingot, typically has a Moh's hardness between 6 and 7. This tailored material exhibited a hardness far exceeding that which would be expected from natural materials and greater than that which had been seen in any previous manufactured material (i.e., materials prepared via the method presented in U.S. Pat. No. 6,572,792). Quite clearly, this process for tailoring material can significantly raise the hardness, with an abundance of beneficial, commercially-relevant implications (e.g., drilling, mining, etc.).

Similar results on another tailored copper ingot compared with some standards provided by the testing manufacturer. Note that the tailored material exhibited a very high Moh's hardness factor and exhibited greater hardness in the radial direction than in the axial direction. This anisotropic hardness behavior is generated through material tailoring. Despite this Moh's hardness factor, the same tailored ingot exhibited brittle failure during the Rockwell testing.

Magnetic and Material Attraction

Three different copper ingots were tailored via the techniques described herein. Each of these ingots was subjected to a slightly different experimental protocol. For example, the experimental program may have varied by the time, type, or method of EM radiation addition. The resultant magnetic and physical attraction properties of each ingot are significantly different from natural copper and significantly different from each other. The attraction behavior of these three ingots is summarized in below:

TABLE 3

Attraction Behavior of Tailored Copper Ingots (9080 g, 99.98% purity)

| Experimental Run Number | Experimental Protocol/ Method | NdFeB Magnet Attraction | Sulfur Attraction |
| --- | --- | --- | --- |
| 14-02-06 | "HA" | Observed | Observed |
| 14-04-05 | "HD" | Observed | Observed |
| 14-03-02 | "AB" | Observed | Observed |
| Natural Copper | | None | None |

Each ingot exemplified magnetic attraction induced by the tailoring process: behavior not present in natural copper. In addition to magnetic attraction, these ingots exhibited attraction to other non-magnetic materials, such as sulfur. In each case, the testing for the attraction behavior of the sulfur powder was performed on a clean, polished, dry surface of the ingot to prohibit any effects of surface tension or adhesion. Additionally, the areas of magnetic attraction and sulfur attraction were at significantly different locations on the ingot, removing the possibility of induced attraction or other extraneous surface effects.

Three important points to note:
1. The sulfur attraction was at different locations than the magnetic attraction, eliminating induction, surface irregularities, surface adhesion, etc. as possible explanations for the attraction.
2. The intensity of the sulfur attraction and the magnetic attraction mimicked each other. That is, ingots that exhibit multiple points of magnetic attraction (widespread) tend to have extensive regions of sulfur attraction.
3. The surfaces were polished, cleaned, and dried thoroughly before the testing was performed. Analysis was performed in a fully vertical position.

Each of these points supports the supposition of a change in the composition of matter affecting the electromagnetic behavior of the tailored material. Natural copper exhibits no attraction to either magnets or sulfur. Yet, the manufactured copper, tailored via three different protocols, all exhibited unique attraction behavior.

In addition to pure copper, various alloys were subjected to the experimental protocol outlined herein and similar results were obtained: non-ferromagnetic material attraction, ferromagnetic material attraction, and magnetic attraction.

The first example of such behavior is a Nickel/Rhenium ingot, Ingot 14-01-21. This ingot, composed predominantly of Ni, will attract a magnet in its natural state. Hence, no magnetic testing was performed. However the attraction of sulfur powder and various ferromagnetic materials (Fe chips (99%$_{wt}$ purity; 10-25 mesh), spherical sponge Fe (ranging from $^-$50 to $^+$100 mesh, 99.8%$_{wt}$ pure), and Fe powder 94%$_{wt}$ Fe, 3%$_{wt}$ S, and 3%$_{wt}$ C), none of which are attracted to natural nickel or rhenium in the absence of an induced magnetic field caused by the presence of a magnet) were tested.

The Nickel/Rhenium tailored ingot exhibited unique material attraction throughout the entire ingot (i.e., a volumetric property vs. a surface property) as exemplified on multiple faces of the cut ingot. To further demonstrate that surface irregularities are not the source of the unique attraction, an ingot was cut and the surface polished. The clean, dry, polished surface was then used for evaluating the attraction behavior of tailored materials.

In a similar emulation of the behavior observed in the tailored copper ingots, the tailored Nickel/Rhenium ingot also exhibited significant attraction to sulfur powder.

To further demonstrate that the attraction behavior is caused by a change in the composition of matter that in turn alters the electromagnetic behavior of the tailored material, a polished surface of the Ni/Re tailored ingot was tested for sulfur attraction (i.e., eliminate the effects of surface irregularities). Additionally, the ingot was rotated 180°. The same attraction patterning was observed independent of vertical orientation, eliminating a surface lip or defect as a possible explanation for the attraction.

To demonstrate that the attraction behavior observed was not unique to nickel alloys (e.g., due to their ferromagnetic behavior), a similar set of attraction experiments was performed on a tailored copper ingot containing Cu, Re, Ag, and Au. Sulfur attraction was achieved on multiple surfaces, in this instance, the top and the bottom.

This tailored copper alloy ingot exhibited multiple points of attraction to a Nd/Fe/B magnet.

In yet another set of experiments to investigate the behavior of tailored ingots that are ferromagnetic in their natural state (i.e., can be induced to have a magnetic field, through the alignment of magnetic moments using a natural magnet), a tailored cobalt alloy ingot (Co/V/Re Ingot 14-01-20) was tested for material attraction immediately following the end of the tailoring process. The manufactured Co/V/Re ingot did attract iron immediately following the tailoring process in limited regions.

Given these positive attraction-testing results, further tests were performed on the tailored copper and copper alloy (non-ferromagnetic) ingots. These non-ferromagnetic materials should not attract either a magnet or iron in their natural state. Yet, each of the manufactured copper ingots attracted spherical sponge iron (99.8%$_{wt}$ pure, $^-$50 to $^+$100 mesh). Ingots 14-04-05, 14-04-03, 14-02-06, all exhibited a fairly random patterning ("sprinkling") of attraction, while ingot 14-03-02 appears to have definite "lines" of attraction.

Magnetic Field Testing: Gauss Measurements

In a natural material, the attraction of a magnet or ferromagnet is accompanied by the appearance of a magnetic field (caused by the alignment of magnetic moments in the magnetic or ferromagnetic material creating a measurable field strength, magnetic density or magnetic flux). Since each of these tailored materials exhibited an attraction to a Nd/Fe/B magnet (and many attracted ferromagnetic iron), Gauss readings were taken at designated intervals across the ingot surface to observe any potential magnetic fields (using an F. W. Bell 4048 Gauss Meter). The detailed magnetic grids obtained from such testing may be found in Appendix 3. The results are summarized in Table 4 below.

TABLE 4

Gauss Meter Readings Showing No Significant Measurable Magnetic Fields on Tailored Ingots

| Expt'l Run Number | Tailored Material and Experimental "Method"/Protocol | Significant Magnetic Field[†] | Maximum Absolute Gauss Reading[‡,††] |
|---|---|---|---|
| 14-04-05 | Cu "HD" | None | 0.0 ± 0.2 |
| 14-02-06 | Cu "HA" | None | 0.0 ± 0.2 |
| 14-03-02 | Cu "AB" | None | 0.0 ± 0.2 |
| 14-01-21 | Ni/Re "HD" | None | 0.0 ± 0.5 |
| 14-04-03 | Cu/Re/Au/Ag "HD" | None | 0.0 ± 0.2 |

[†]The average magnetic field observed at the earth's surface is between 0.1-0.5 gauss.
[‡]The maximum absolute gauss reading for natural, high purity (99.9%$_{wt}$) copper was 0.0 ± 0.2.
[††]The maximum absolute gauss reading for natural, high purity (99.99%$_{wt}$) nickel was 0.0 ± 0.6.

Note, no significant detectable magnetic field was observed on any of these tailored ingots despite their ability to attract and hold a magnet at 90° (i.e., vertical orientation). The measured gauss strengths are comparable to the background levels measured at the earth's surface. The average magnetic field observed at the earth's surface is between 0.1-0.5 gauss. Commercially available magnets exhibit gauss strengths measured in the 1000's: Nd/Fe/B magnets 10,500-14,000 gauss, SmCo 8,000-12,000 gauss, AlNiCo 6,000-13,500 gauss and Ferrite 2,000-4,000 gauss. In addition, the areas exhibiting the greatest apparent magnetic force (0.5 gauss) were tested for attraction to iron filings. No iron filings held on these particular locations.

The conclusions that can be drawn from this series of documented attractions:

Tailored materials exhibit unique attraction to magnetic, ferromagnetic, and non-magnetic materials that are not observed in natural materials.

Unlike natural materials, tailored materials exhibit no correlation between observable magnetic field strength (as measured by a gauss meter) and material attraction (magnetic, ferromagnetic, or non-magnetic).

The unique attraction properties of tailored materials are attributable to a change in the electromagnetic behavior, indicative of a change in the composition of matter.

These surface attractions are not attributable to surface irregularities or induced magnetic fields as the tailored materials:
1. Have exhibited unique attraction in the "raw" and polished state, in multiple positions, and on multiple surfaces (both internal and external).
2. Have attracted fine particles (sulfur and spherical iron sponge) and large particles (⅛" diameter magnetic, iron chips).
3. Have exhibited multiple areas of attraction and those areas attracting sulfur are not necessarily the same areas that attract ferromagnetic or magnetic materials. Similarly, areas that attract magnets are not necessarily the areas that attract ferromagnets or non-magnets.

Exhibit negligible magnetic field strengths as measured by an F. W. Bell 4048 gauss meter.

[1]Zee, A. *Quantum Field Theory in a Nutshell*. Princeton: Princeton U P, 2003
[2]Wen, Xiao-Gang. *Quantum Field Theory of Many-Body Systems*. New York: Oxford U P, 2004

[3] Stormer, Horst, L., Daniel C. Tsui, Arthur C. Gossard. "The Fractional Quantum Hall Effect." *Reviews of Modern Physics* 71.2 (1999): S298-S305

[4] Thurston, William, P. *Three-Dimensional Geometry and Topology.* Vol. 1. Princeton: Princeton U P, 1997

[5] Thurston, William, P. *The Geometry and Topology of Three-Manifolds.* March 2002. Princeton U P <http://www.msri.org/publications/books/gt3m>

[6] Nakahara, Mikio. *Geometry, Topology and Physics.* Second Edition. London: Institute of Physics Publishing, 2003

[7] Nash, Charles. *Differential Topology and Quantum Field Theory.* London: Academic P, 1991

[8] Maskit, Bernard. "Moduli of Marked Reimann Surfaces." *Bulletin of the American Mathematical Society* 80.4 (1974): 773-777

[9] Kra, Irwin. "Horocyclic Coordinates for Riemann Surfaces and Moduli Spaces. 1: Teichmuller and Riemann Spaces of Kleinian Groups." *Journal of the American Mathematical Society* 3.3 (1990): 499-578

[10] Keen, Linda, Bernard Maskit, and Caroline Series. *Geometric Finiteness and Uniqueness for Kleinian Groups with Circle Packing Limit Sets.* December 1991. <www.arxiv.org/abs/math/9201299>

[1] Keen, Linda and Caroline Series. "Pleating Coordinates for the Maskit Embedding of the Teichmüller Space of Punctured Tori." *Topology* 32.4 (1993): 719-749.

While this invention has been particularly shown and described with references to preferred embodiments thereof, it will be understood by those skilled in the art that various changes in form and details may be made therein without departing from the scope of the invention encompassed by the appended claims.

APPENDIX 1

```
                         ANALYSIS REPORT                by Uniquant
--------------------------------------------------------------------------------
OLD.183
Spectrometers configuration:  ARL 8410 Rh 60kV LiF220 LiF420 Ge111 T1AP
Sample ident    =  ENERGY FILTER:  Tailored Material (RADIAL, INNER SURFACE)
Kappa list      =  15-Nov-94
Calculated as :    Elements     Spectral impurity data : CAL.909 Teflon
X-ray path      =  Vacuum       Film type    = No supporting film
Case number     =  0   Known Area, %Rest, Diluent/Sample and Mass/Area
Eff.Diam.       =  25.00 mm     Eff.Area     = 490.6 mm2
KnownConc       =  0    %
Rest            =  0    %
Dil/Sample      =  0
Viewed Mass     =  18000.00 mg
Sample Height   =  5  mm
                <    means that the concentration is <  20 ppm
                <2e  means wt% < 2 StdErr. The + in Z+El means involved in Sum=100%
     Z            wt%    StdErr     Z          wt%    StdErr       Z           wt%    StdErr
   ==========================     ==========================     ==========================
   SumBe..F       0      0.042     29+Cu      97.54   0.08        51  Sb       <
   11+Na          0.50   0.03      30+Zn       <                  52  Te       <
   12+Mg          0.046  0.005     31+Ga       0.007  0.003       53  I        <
   13+Al          0.91   0.04      32  Ge      <                  55  Cs       <
   14+Si          0.51   0.03      33  As      <                  56  Ba       <2e    0.003

15+P           0.009  0.001     34  Se      <                  SumLa..Lu    0.015  0.070
   16+S           0.118  0.009     35  Br      <                  72+Hf        <2e    0.022
   16  So                          37  Rb      <                  73+Ta        <
   17+Cl          0.23   0.02      38  Sr      <                  74  W        <
   18  Ar         <                39  Y       <                  75  Re       <

19+K           0.031  0.003     40  Zr      <                  76  Os       <
   20+Ca          0.033  0.003     41  Nb      <                  77+Ir        0.026  0.008
   21  Sc         <                42+Mo       0.007  0.002       78  Pt       <
   22+Ti          0.004  0.001     44  Ru      <                  79  Au       <2e    0.007
   23  V          <                45  Rh      <                  80  Hg       <2e    0.006

24+Cr          <                46  Pd      <                  81  Tl       <
   25  Mn         <                47  Ag      <2e    0.002       82  Pb       <2e    0.003
   26+Fe          0.012  0.001     48  Cd      <2e    0.002       83  Bi       <
   27+Co          <                49  In      <                  90+Th        0.009  0.003
   28  Ni         <                50  Sn      <                  92  U        <

==== Light Elements =====      ==== Noble Elements =====       ===== Lanthanides =======
    4  Be                          44  Ru      <                  57  La       <
    5  B                           45  Rh      <                  58  Ce       <
    6  C                           46  Pd      <                  59  Pr       <
    7  N                           47  Ag      <2e    0.002       60  Nd       <
    8  O                           75  Re      <                  62  Sm       <2e    0.002
    9  F          <                76  Os      <                  63  Eu       <2e    0.001
                                   77+Ir       0.026  0.008       64  Gd       <2e    0.001
                                   78  Pt      <                  65  Tb       <
                                   79  Au      <2e    0.007       66  Dy       <
                                                                  67  Ho       <
                                                                  68+Er        0.008  0.003
                                                                  69  Tm       <
                                                                  70  Yb       <
                                                                  71+Lu        <

KnownConc= 0                    REST= 0                      D/S= 0
Sum Conc's before normalisation to 100% :   98.3 %
```

```
ANALYSIS REPORT                                          by Uniquant
--------------------------------------------------------------------------------
OLD.184
Spectrometers configuration:  ARL 8410 Rh 60kV LiF220 LiF420 Ge111 TlAP
Sample ident    =  ENERGY FILTER:  Tailored Material (RADIAL, OUTER SURFACE)
Kappa list      =  15-Nov-94
Calculated as : Elements        Spectral impurity data : CAL.909 Teflon
X-ray path      =  Vacuum         Film type     = No supporting film
Case number     =  0    Known Area, %Rest, Diluent/Sample and Mass/Area
Eff.Diam.       = 25.00 mm        Eff.Area      = 490.6 mm2
KnownConc       =  0     %
Rest            =  0     %
Dil/Sample      =  0
Viewed Mass     = 18000.00 mg
Sample Height   =  5   mm
             <     means that the concentration is <  20 ppm
            <2e   means wt% < 2 StdErr. The + in Z+El means involved in Sum=100%
  Z       wt%      StdErr    Z         wt%     StdErr    Z              wt%     StdErr
============================  ============================  ============================
SumBe..F   0       0.045     29+Cu    98.84    0.05      51 Sb           <
11+Na      0.37    0.02      30+Zn     <                 52 Te           <
12+Mg      0.041   0.005     31 Ga    <2e      0.003     53 I            <
13+Al      0.26    0.02      32 Ge     <                 55 Cs           <
14+Si      0.083   0.007     33 As     <                 56+Ba           0.009   0.003

15+P       0.006   0.001     34 Se     <                 SumLa..Lu       0.007   0.071
16+S       0.099   0.008     35 Br     <                 72+Hf           <
16 So                        37 Rb     <                 73+Ta           <
17+Cl      0.22    0.02      38 Sr     <                 74 W            <
18 Ar      <                 39 Y      <                 75 Re           <

19+K       0.025   0.002     40 Zr     <                 76 Os           <
20+Ca      0.027   0.002     41 Nb     <                 77 Ir           <2e     0.008
21+Sc      0.0023  0.0008    42 Mo     <                 78 Pt           <
22 Ti      <                 44 Ru     <                 79 Au           <
23 V       <                 45 Rh     <                 80 Hg           <

24+Cr      0.0023  0.0006    46 Pd     <                 81 Tl           <
25 Mn      <                 47 Ag     <                 82 Pb           <
26+Fe      0.004   0.001     48 Cd     <                 83 Bi           <2e     0.005
27 Co      <                 49 In     <                 90 Th           <
28 Ni      <                 50 Sn     <                 92 U            <

==== Light Elements =====    ==== Noble Elements =====   ===== Lanthanides =======
 4 Be                        44 Ru     <                 57 La           <
 5 B                         45 Rh     <                 58 Ce           <
 6 C                         46 Pd     <                 59+Pr           0.006   0.002
 7 N                         47 Ag     <                 60 Nd           <
 8 O                         75 Re     <                 62 Sm           <
 9 F       <                 76 Os     <                 63 Eu           <
                             77 Ir    <2e      0.008     64 Gd           <
                             78 Pt     <                 65 Tb           <
                             79 Au     <                 66 Dy           <
                                                         67 Ho           <
                                                         68 Er           <
                                                         69 Tm           <
                                                         70 Yb           <
                                                         71+Lu           <

KnownConc= 0                    REST= 0                    D/S= 0
       Sum Conc's before normalisation to 100% :    97.7 %
```

Appendix 2

```
              ANALYSIS REPORT                              by Uniquant
--------------------------------------------------------------------------------
OLD.180
Spectrometers configuration: ARL 8410 Rh 60kV LiF220 LiF420 Ge111 TlAP
Sample ident   = 14-01-15     AXIAL
Kappa list     = 15-Nov-94
Calculated as  : Elements     Spectral impurity data : CAL.909 Teflon (7/94)
X-ray path     = Vacuum       Film type    = No supporting film
Case number    = 0    Known Area, %Rest, Diluent/Sample and Mass/Area
Eff.Diam.      = 25.00 mm     Eff.Area     = 490.6 mm2
KnownConc      = 0    %
Rest           = 0    %
Dil/Sample     = 0
Viewed Mass    = 18000.00 mg
Sample Height  = 5   mm
               <    means that the concentration is <  20 ppm
              <2e   means wt% < 2 StdErr. The + in Z+El means involved in Sum=100%
   Z       wt%    StdErr     Z        wt%     StdErr      Z         wt%     StdErr
===========================  ===========================  ===========================
SumBe..F    0      0.045    29+Cu     0.024   0.002     51 Sb      <
11 Na       <                30 Zn     <                 52 Te      <
12+Mg       0.010  0.005    31+Ga     0.003   0.001     53 I       <2e     0.002
13+Al       2.05   0.07     32 Ge     <                 55 Cs      <2e     0.002
14+Si       0.41   0.02     33 As     <                 56 Ba      <

15+P        0.0046 0.0004   34 Se     <                 SumLa..Lu  0.02    0.21
16+S        0.022  0.002    35 Br     <                 72+Hf      0.017   0.005
16 So                        37 Rb     <                 73 Ta      <
17+Cl       0.0060 0.0007   38 Sr     <                 74+W       0.033   0.004
18 Ar       <                39 Y      <                 75 Re      <2e     0.004

19+K        <                40 Zr     <                 76 Os      <
20+Ca       0.020  0.002    41 Nb     <                 77+Ir      <2e     0.004
21+Sc       <                42 Mo     <2e     0.002     78 Pt      <
22 Ti       <                44 Ru     <                 79 Au      <2e     0.003
23+V        2.03   0.07     45 Rh     <                 80 Hg      <

24+Cr       2.13   0.07     46 Pd     <                 81 Tl      <
25+Mn       2.07   0.07     47 Ag     <                 82 Pb      <2e     0.002
26+Fe       91.2   0.1      48 Cd     <                 83 Bi      <
27 Co       <                49 In     <                 90+Th      0.009   0.002
28 Ni       <2e    0.003    50 Sn     <2e     0.001     92 U       <

==== Light Elements =====    ==== Noble Elements =====    ===== Lanthanides =======
  4 Be                        44 Ru     <                 57 La      <
  5 B                         45 Rh     <                 58 Ce      <
  6 C                         46 Pd     <                 59+Pr      <2e     0.009
  7 N                         47 Ag     <                 60 Nd      <
  8 O                         75 Re     <2e     0.004     62+Sm      <
  9 F        <                76 Os     <                 63+Eu      <
                              77+Ir     <2e     0.004     64 Gd      <
                              78 Pt     <                 65+Tb      <
                              79 Au     <2e     0.003     66 Dy      <
                                                          67 Ho      <2e     0.007
                                                          68+Er      <
                                                          69+Tm      <
                                                          70 Yb      <
                                                          71 Lu      <

KnownConc= 0                  REST= 0                      D/S= 0
Sum Conc's before normalisation to 100% :   94.4 %
```

```
ANALYSIS REPORT                                         by Uniquant
--------------------------------------------------------------------------------
OLD.181
Spectrometers configuration: ARL 8410 Rh 60kV LiF220 LiF420 Ge111 TlAP
Sample ident   =  14-01-15      RADIAL
Kappa list     =  15-Nov-94
Calculated as :   Elements      Spectral impurity data : CAL.909 Teflon (7/94)
X-ray path     =  Vacuum        Film type      = No supporting film
Case number    =  0    Known Area, %Rest, Diluent/Sample and Mass/Area
Eff.Diam.      =  25.00 mm      Eff.Area       = 490.6 mm2
KnownConc      =  0    %
Rest           =  0    %
Dil/Sample     =  0
Viewed Mass    =  18000.00 mg
Sample Height  =  5   mm
          <    means that the concentration is <  20 ppm
          <2e  means wt% < 2 StdErr. The + in Z+El means involved in Sum=100%
     Z       wt%      StdErr       Z       wt%     StdErr      Z         wt%     StdErr
============================  ==========================  ==========================
SumBe..F     0        0.046     29+Cu     0.010    0.002    51 Sb         <
11+Na        0.057    0.010     30 Zn     <                 52 Te         <
12 Mg        <                  31 Ga     <                 53+I          0.005   0.002
13+Al        1.46     0.05      32 Ge     <                 55 Cs         <
14+Si        0.069    0.007     33 As     <                 56 Ba         <2e     0.003

15+P         0.0034   0.0003    34 Se     <                 SumLa..Lu     0.01    0.21
16+S         0.012    0.001     35 Br     <                 72+Hf         0.011   0.005
16 So                           37 Rb     <                 73 Ta         <
17+Cl        0.0020   0.0005    38 Sr     <                 74+W          0.031   0.004
18 Ar        <                  39 Y      <                 75 Re         <

19+K         <                  40 Zr     <                 76 Os         <
20+Ca        0.014    0.001     41+Nb     <                 77 Ir         <2e     0.004
21+Sc        0.0045   0.0006    42 Mo     <2e      0.002    78 Pt         <
22+Ti        0.0027   0.0006    44 Ru     <                 79 Au         <
23+V         2.00     0.07      45 Rh     <                 80 Hg         <2e     0.003

24+Cr        2.09     0.07      46 Pd     <                 81 Tl         <
25+Mn        2.07     0.07      47 Ag     <                 82 Pb         <2e     0.002
26+Fe        92.1     0.1       48 Cd     <2e      0.002    83 Bi         <
27 Co        <                  49 In     <                 90+Th         0.006   0.002
28 Ni        <                  50 Sn     <                 92 U          <

==== Light Elements =====       ==== Noble Elements =====   ===== Lanthanides =======
 4 Be                            44 Ru     <                57 La         <
 5 B                             45 Rh     <                58 Ce         <
 6 C                             46 Pd     <                59+Pr         <2e     0.009
 7 N                             47 Ag     <                60 Nd         <
 8 O                             75 Re     <                62+Sm         <
 9 F         <                   76 Os     <                63+Eu         <
                                 77 Ir     <2e      0.004   64 Gd         <
                                 78 Pt     <                65+Tb         <
                                 79 Au     <                66 Dy         <
                                                            67 Ho         <
                                                            68+Er         <
                                                            69+Tm         <
                                                            70 Yb         <
                                                            71 Lu         <

KnownConc= 0                    REST= 0                     D/S= 0
Sum Conc's before normalisation to 100% :    98.1 %
```

```
ANALYSIS REPORT                                         by Uniquant
--------------------------------------------------------------------------------
OLD.113
Spectrometers configuration:  ARL 8410 Rh 60kV LiF220 LiF420 Ge111 TlAP
Sample ident     =  14-03-02      AXIAL
Kappa list       =  15-Nov-94
Calculated as  :  Elements      Spectral impurity data : CAL.909  Teflon
X-ray path       =  Vacuum        Film type    = No supporting film
Case number      =  0    Known Area, %Rest, Diluent/Sample and Mass/Area
Eff.Diam.        =  25.00 mm      Eff.Area     = 490.6 mm2
KnownConc        =  0    %
Rest             =  0    %
Dil/Sample       =  0
Viewed Mass      =  18000.00 mg
Sample Height    =  5  mm
                 <      means that the concentration is <  20 ppm
                <2e     means wt% < 2 StdErr. The + in Z+El means involved in Sum=100%
  Z        wt%     StdErr       Z         wt%     StdErr       Z         wt%     StdErr
=============================  =============================  =============================
SumBe..F   0       0.042      29+Cu      97.95    0.07       51 Sb       <
11+Na      0.064   0.011      30+Zn      <                   52 Te       <
12 Mg      <                  31 Ga      <2e      0.003      53 I        <
13+Al      1.79    0.06       32 Ge      <2e      0.002      55 Cs       <
14+Si      0.111   0.009      33 As      <                   56 Ba       <2e      0.003

15+P       <                  34 Se      <                   SumLa..Lu   0.023    0.069
16+S       0.0042  0.0004     35 Br      <                   72+Hf       <
16 So                         37 Rb      <                   73+Ta       <
17+Cl      0.017   0.001      38 Sr      <                   74 W        <
18 Ar      <                  39 Y       <                   75 Re       <

19 K       <                  40 Zr      <                   76 Os       <
20+Ca      0.0056  0.0008     41 Nb      <                   77+Ir       0.032    0.008
21 Sc      <                  42+Mo      0.006    0.002      78 Pt       <
22+Ti      0.0062  0.0008     44 Ru      <                   79 Au       0.014    0.007
23 V       <                  45 Rh      <2e      0.002      80 Hg       <2e      0.006

24+Cr      <                  46 Pd      <                   81 Tl       <
25 Mn      <                  47 Ag      <                   82 Pb       <2e      0.003
26 Fe      <                  48 Cd      <                   83 Bi       <
27 Co      <                  49 In      <                   90 Th       <
28 Ni      <                  50 Sn      <                   92 U        <

==== Light Elements =====     ==== Noble Elements =====      ===== Lanthanides =======
  4 Be                        44 Ru      <                   57+La       0.012    0.003
  5 B                         45 Rh      <2e      0.002      58 Ce       <
  6 C                         46 Pd      <                   59 Pr       0.005    0.002
  7 N                         47 Ag      <                   60 Nd       <
  8 O                         75 Re      <                   62 Sm       <
  9 F       <                 76 Os      <                   63 Eu       <2e      0.002
                              77+Ir      0.032    0.008      64 Gd       <
                              78 Pt      <                   65 Tb       <2e      0.002
                              79 Au      0.014    0.007      66 Dy       <
                                                             67 Ho       <
                                                             68 Er       <
                                                             69 Tm       <
                                                             70 Yb       <
                                                             71+Lu       <

KnownConc= 0                  REST= 0                        D/S= 0
Sum Conc's before normalisation to 100% :    99.8 %
```

```
                                ANALYSIS REPORT              by Uniquant
------------------------------------------------------------------------------
OLD.114
Spectrometers configuration:  ARL 8410 Rh 60kV LiF220 LiF420 Ge111 TlAP
Sample ident    = 14-03-02     RADIAL
Kappa list      = 15-Nov-94
Calculated as : Elements     Spectral impurity data : CAL.909 Teflon
X-ray path      = Vacuum        Film type    = No supporting film
Case number     = 0    Known Area, %Rest, Diluent/Sample and Mass/Area
Eff.Diam.       = 25.00 mm      Eff.Area     = 490.6 mm2
KnownConc       = 0      %
Rest            = 0      %
Dil/Sample      = 0
Viewed Mass     = 18000.00 mg
Sample Height   = 5   mm
            <      means that the concentration is <  20 ppm
            <2e    means wt% < 2 StdErr. The + in Z+El means involved in Sum=100%
    Z       wt%     StdErr     Z           wt%    StdErr     Z            wt%     StdErr
========================    ========================    ========================
SumBe..F    0       0.044      29+Cu       99.03  0.05      51  Sb       <
11+Na       0.089   0.012      30+Zn       <                52  Te       <
12 Mg       <                  31+Ga       0.011  0.003     53  I        <
13+Al       0.79    0.04       32 Ge       <                55  Cs       <
14 Si       <                  33 As       <                56  Ba       <

15+P        <                  34 Se       <                SumLa..Lu    0.011   0.070
16+S        0.0061  0.0006     35 Br       <                72+Hf        <2e     0.022
16 So                          37 Rb       <                73+Ta        <
17+Cl       0.016   0.001      38+Sr       0.003  0.001     74 W         <
18 Ar       <                  39 Y        <                75 Re        <2e     0.008

19 K        <                  40 Zr       <                76 Os        <
20+Ca       0.0062  0.0008     41 Nb       <                77+Ir        0.025   0.008
21+Sc       0.0027  0.0010     42 Mo       <                78 Pt        <
22 Ti       <                  44 Ru       <                79 Au        <2e     0.007
23 V        <                  45 Rh       <                80 Hg        <2e     0.006

24 Cr       <                  46 Pd       <                81 Tl        <
25 Mn       <                  47+Ag       0.004  0.002     82 Pb        <
26 Fe       <                  48 Cd       <2e    0.002     83 Bi        <
27+Co       <                  49 In       <                90+Th        0.006   0.003
28 Ni       <                  50 Sn       <                92 U         <

==== Light Elements =====   ==== Noble Elements =====   ===== Lanthanides =======
  4 Be                         44 Ru       <                57 La        <
  5 B                          45 Rh       <                58 Ce        <
  6 C                          46 Pd       <                59 Pr        <
  7 N                          47+Ag       0.004  0.002     60 Nd        <
  8 O                          75 Re       <2e    0.008     62 Sm        <
  9 F        <                 76 Os       <                63 Eu        <
                               77+Ir       0.025  0.008     64 Gd        <
                               78 Pt       <                65 Tb        <
                               79 Au       <2e    0.007     66 Dy        <
                                                            67 Ho        <
                                                            68+Er        0.008   0.004
                                                            69 Tm        <
                                                            70 Yb        <
                                                            71+Lu        <

KnownConc= 0                        REST= 0                 D/S= 0
Sum Conc's before normalisation to 100% :   99.5 %
```

```
                              ANALYSIS REPORT                    by Uniquant
--------------------------------------------------------------------------------
OLD.180
Spectrometers configuration:  ARL 8410 Rh 60kV LiF220 LiF420 Ge111 TlAP
Sample ident    =  14-04-06      AXIAL
Kappa list      =  15-Nov-94
Calculated as : Elements       Spectral impurity data : CAL.909 Teflon
X-ray path      =  Vacuum       Film type    = No supporting film
Case number     =  0   Known Area, %Rest, Diluent/Sample and Mass/Area
Eff.Diam.       = 25.00 mm      Eff.Area     = 490.6 mm2
KnownConc       =  0     %
Rest            =  0     %
Dil/Sample      =  0
Viewed Mass     = 18000.00 mg
Sample Height   =  5   mm
           <    means that the concentration is <  20 ppm
           <2e  means wt% < 2 StdErr. The + in Z+El means involved in Sum=100%
   Z      wt%       StdErr       Z       wt%      StdErr       Z        wt%       StdErr
==========================   ==========================   ==========================
SumBe..F   0         0.045    29+Cu    97.48      0.08     51  Sb       <
11+Na      0.11      0.01     30+Zn    <                   52  Te       <
12 Mg      <                  31 Ga    <2e        0.003    53  I        <
13+Al      0.20      0.01     32 Ge    <2e        0.003    55  Cs       <
14+Si      2.10      0.07     33 As    <                   56  Ba       <2e        0.003

15+P       <                  34 Se    <                   SumLa..Lu   0.012       0.062
16 S                          35 Br    <                   72+Hf       <2e         0.022
16+So      0.0077    0.0007   37 Rb    <                   73+Ta       <
17+Cl      0.012     0.001    38 Sr    <2e        0.001    74 W        <
18 Ar      <                  39 Y     <                   75 Re       <

19 K       <                  40 Zr    <                   76 Os       <
20+Ca      0.0048    0.0008   41 Nb    <                   77+Ir       0.031       0.009
21+Sc      0.0076    0.0008   42 Mo    <                   78 Pt       <
22 Ti      <                  44 Ru    <                   79 Au       <2e         0.007
23 V       <                  45 Rh    <                   80 Hg       <2e         0.006

24 Cr      <                  46 Pd    <                   81 Tl       <
25 Mn      <                  47 Ag    <                   82 Pb       <2e         0.003
26 Fe      <                  48 Cd    <                   83 Bi       <
27+Co      0.0024    0.0007   49 In    <                   90 Th       <2e         0.003
28 Ni      <                  50 Sn    <                   92 U        <

==== Light Elements =====    ==== Noble Elements =====   ===== Lanthanides =======
 4 Be                         44 Ru    <                   57 La       <
 5 B                          45 Rh    <                   58 Ce       <
 6 C                          46 Pd    <                   59 Pr       <
 7 N                          47 Ag    <                   60 Nd       <
 8 O                          75 Re    <                   62 Sm       <
 9 F       <                  76 Os    <                   63 Eu       <
                              77+Ir    0.031      0.009    64 Gd       <
                              78 Pt    <                   65 Tb       <
                              79 Au    <2e        0.007    66 Dy       <
                                                           67 Ho       <
                                                           68+Er       0.012       0.003
                                                           69 Tm       <
                                                           70 Yb       <
                                                           71+Lu       <

KnownConc= 0                       REST= 0                     D/S= 0
Sum Conc's before normalisation to 100% :   94.5 %
```

```
                        ANALYSIS REPORT                          by Uniquant
--------------------------------------------------------------------------------
OLD.181
Spectrometers configuration:  ARL 8410 Rh 60kV LiF220 LiF420 Ge111 TlAP
Sample ident    =  14-04-06     RADIAL
Kappa list      =  15-Nov-94
Calculated as : Elements     Spectral impurity data : CAL.909 Teflon
X-ray path      =  Vacuum      Film type    = No supporting film
Case number     =  0    Known Area, %Rest, Diluent/Sample and Mass/Area
Eff.Diam.       =  25.00 mm    Eff.Area     = 490.6 mm2
KnownConc       =  0     %
Rest            =  0     %
Dil/Sample      =  0
Viewed Mass     =  18000.00 mg
Sample Height   =  5     mm
            <     means that the concentration is <  20 ppm
            <2e   means wt% < 2 StdErr. The + in Z+El means involved in Sum=100%
   Z        wt%       StdErr     Z         wt%      StdErr     Z          wt%       StdErr
===========================  ===========================  ===========================
SumBe..F   0         0.044    29+Cu      98.00     0.07     51 Sb       <
11+Na      0.10      0.01     30+Zn      <                  52 Te       <
12 Mg      <                  31 Ga      <2e       0.003    53 I        <
13+Al      0.19      0.01     32 Ge      <                  55 Cs       <2e       0.003
14+Si      1.66      0.06     33 As      <                  56 Ba       <2e       0.003

15+P       <                  34 Se      <                  SumLa..Lu   0.008     0.062
16+S       0.0066    0.0006   35 Br      <                  72+Hf       <2e       0.023
16 So                         37 Rb      <                  73+Ta       <
17+Cl      0.0075    0.0009   38 Sr      <                  74 W        <
18 Ar      <                  39 Y       <                  75 Re       <

19+K       0.0024    0.0007   40 Zr      <                  76 Os       <
20+Ca      0.0033    0.0008   41 Nb      <                  77+Ir       0.027     0.008
21 Sc      <                  42+Mo      0.007     0.002    78 Pt       <
22 Ti      <                  44 Ru      <                  79 Au       <2e       0.007
23 V       <                  45 Rh      <                  80 Hg       <

24 Cr      <                  46 Pd      <                  81 Tl       <2e       0.005
25 Mn      <                  47 Ag      <                  82 Pb       <
26 Fe      <                  48 Cd      <                  83 Bi       <
27+Co      0.0022    0.0006   49 In      <                  90 Th       <
28 Ni      <                  50 Sn      <                  92 U        <

==== Light Elements =====    ==== Noble Elements =====    ===== Lanthanides =======
 4 Be                         44 Ru      <                  57 La       <
 5 B                          45 Rh      <                  58 Ce       <
 6 C                          46 Pd      <                  59 Pr       <
 7 N                          47 Ag      <                  60 Nd       <
 8 O                          75 Re      <                  62 Sm       <
 9 F       <                  76 Os      <                  63 Eu       0.003     0.001
                              77+Ir      0.027     0.008    64 Gd       <
                              78 Pt      <                  65 Tb       <
                              79 Au      <2e       0.007    66 Dy       <
                                                            67 Ho       <
                                                            68+Er       <2e       0.003
                                                            69 Tm       <
                                                            70 Yb       <
                                                            71+Lu       <

KnownConc= 0                    REST= 0                       D/S= 0
Sum Conc's before normalisation to 100% :   96.7 %
```

```
ANALYSIS REPORT                                           by Uniquant
------------------------------------------------------------------------
OLD.363
Spectrometers configuration:   ARL 8410 Rh 60kV LiF220 LiF420 Ge111 TlAP
Sample ident     =   14-01-10      AXIAL
Kappa list       =   15-Nov-94
Calculated as  :   Elements      Spectral impurity data : CAL.909 Teflon
X-ray path       =   Vacuum        Film type     = No supporting film
Case number      =   0   Known Area, %Rest, Diluent/Sample and Mass/Area
Eff.Diam.        =   25.00 mm      Eff.Area      = 490.6 mm2
KnownConc        =   0     %
Rest             =   0     %
Dil/Sample       =   0
Viewed Mass      =   18000.00 mg
Sample Height    =   5   mm
              <     means that the concentration is <   20 ppm
              <2e   means wt% < 2 StdErr. The + in Z+El means involved in Sum=100%
   Z       wt%     StdErr        Z          wt%    StdErr       Z          wt%    StdErr
=========================    =========================    =========================
SumBe..F   0       0.015    29+Cu       0.0098  0.0009   51  Sb       <
11+Na      0.008   0.002    30+Zn       0.0037  0.0004   52  Te       <
12+Mg      <                31+Ga       0.0090  0.0008   53  I        <
13+Al      83.8    0.2      32  Ge      <                55  Cs       <
14+Si      15.9    0.2      33  As      <                56  Ba       <2e    0.003

15+P       0.011   0.001    34  Se      <                SumLa..Lu    0.004  0.016
16  S                       35  Br      <                72  Hf       <
16+So      0.045   0.004    37  Rb      <                73  Ta       <
17+Cl      0.034   0.003    38  Sr      <                74+W         0.013  0.001
18  Ar     <                39  Y       <                75  Re       <

19+K       0.007   0.001    40+Zr       <                76  Os       <
20+Ca      0.017   0.001    41  Nb      <                77  Ir       <
21  Sc     <                42  Mo      <                78  Pt       <
22+Ti      <                44  Ru      <                79  Au       <
23+V       <                45  Rh      <                80  Hg       <

24+Cr      <                46  Pd      <                81  Tl       <
25+Mn      0.0021  0.0004   47  Ag      <                82+Pb        <
26+Fe      0.16    0.01     48  Cd      <                83  Bi       <
27  Co     <                49  In      <                90  Th       <
28+Ni      0.014   0.001    50  Sn      <                92  U        <

==== Light Elements =====   ==== Noble Elements =====    ===== Lanthanides =======
 4  Be                      44  Ru      <                57  La       <
 5  B                       45  Rh      <                58  Ce       <
 6  C                       46  Pd      <                59  Pr       <
 7  N                       47  Ag      <                60  Nd       <
 8  O                       75  Re      <                62  Sm       <
 9  F      <                76  Os      <                63  Eu       <
                            77  Ir      <                64+Gd        0.0021 0.0010
                            78  Pt      <                65  Tb       <
                            79  Au      <                66  Dy       <
                                                         67  Ho       <
                                                         68  Er       <
                                                         69  Tm       <
                                                         70  Yb       <
                                                         71  Lu       <

KnownConc= 0                       REST= 0                    D/S= 0
Sum Conc's before normalisation to 100% :    85.8 %
```

```
                              ANALYSIS REPORT                    by Uniquant
--------------------------------------------------------------------------------
OLD.364
Spectrometers configuration:  ARL 8410 Rh 60kV LiF220 LiF420 Ge111 TlAP
Sample ident    = 14-01-10      RADIAL
Kappa list      = 15-Nov-94
Calculated as : Elements         Spectral impurity data : CAL.909 Teflon
X-ray path      = Vacuum         Film type     = No supporting film
Case number     = 0     Known Area, %Rest, Diluent/Sample and Mass/Area
Eff.Diam.       = 25.00 mm       Eff.Area      = 490.6 mm2
KnownConc       = 0     %
Rest            = 0     %
Dil/Sample      = 0
Viewed Mass     = 18000.00 mg
Sample Height   = 5     mm
            <     means that the concentration is <  20 ppm
            <2e   means wt% < 2 StdErr. The + in Z+El means involved in Sum=100%
    Z       wt%     StdErr      Z       wt%     StdErr      Z          wt%     StdErr
    ==========================  ==========================  ============================
    SumBe..F 0      0.016       29+Cu   0.013   0.001       51 Sb      <
    11 Na   <2e     0.002       30+Zn   0.0031  0.0004      52 Te      <
    12+Mg   <                   31+Ga   0.0107  0.0010      53 I       <
    13+Al   75.1    0.2         32 Ge   <                   55 Cs      <
    14+Si   24.5    0.2         33 As   <                   56+Ba     <2e      0.003

15+P    0.013   0.001       34 Se   <                   SumLa..Lu  0.002   0.015
    16 S                        35 Br   <                   72 Hf      <
    16+So   0.030   0.003       37 Rb   <                   73 Ta      <
    17+Cl   0.049   0.004       38 Sr   <                   74+W       0.009   0.001
    18 Ar   <                   39 Y    <                   75 Re      <

19+K    0.0061  0.0010      40+Zr   <                   76 Os      <
    20+Ca   0.0092  0.0008      41 Nb   <                   77 Ir      <
    21 Sc   <                   42 Mo   <                   78 Pt      <
    22+Ti   <                   44 Ru   <                   79 Au      <
    23+V    <                   45+Rh   <                   80 Hg      <

24+Cr   <                   46 Pd   <                   81 Tl      <
    25+Mn   0.0021  0.0004      47 Ag   <                   82+Pb      0.0026  0.0005
    26+Fe   0.18    0.01        48 Cd   <                   83 Bi      <
    27 Co   <                   49 In   <                   90 Th      <
    28+Ni   0.014   0.001       50 Sn   <                   92 U       <

==== Light Elements =====   ==== Noble Elements =====   ===== Lanthanides ========
    4 Be                        44 Ru   <                   57 La      <
    5 B                         45+Rh   <                   58 Ce      <
    6 C                         46 Pd   <                   59 Pr      <
    7 N                         47 Ag   <                   60 Nd      <
    8 O                         75 Re   <                   62 Sm      <
    9 F     <                   76 Os   <                   63 Eu      <
                                77 Ir   <                   64 Gd      <
                                78 Pt   <                   65 Tb      <
                                79 Au   <                   66 Dy      <
                                                            67 Ho      <
                                                            68 Er      <
                                                            69 Tm      <
                                                            70 Yb      <
                                                            71 Lu      <

KnownConc= 0                        REST= 0                     D/S= 0
    Sum Conc's before normalisation to 100% :    89.9 %
```

```
                                ANALYSIS REPORT                by Uniquant
----------------------------------------------------------------------------
OLD.412
Spectrometers configuration:  ARL 8410 Rh 60kV LiF220 LiF420 Ge111 TlAP
Sample ident   =  14-01-11     LOWER SECTION AXIAL (UNPOLISHED)
Kappa list     =  15-Nov-94
Calculated as  :  Elements     Spectral impurity data : CAL.909 Teflon
X-ray path     =  Vacuum       Film type    = No supporting film
Case number    =  0   Known Area, %Rest, Diluent/Sample and Mass/Area
Eff.Diam.      =  25.00 mm     Eff.Area     = 490.6 mm2
KnownConc      =  0    %
Rest           =  0    %
Dil/Sample     =  0
Viewed Mass    =  18000.00 mg
Sample Height  =  5    mm
               <     means that the concentration is <  20 ppm
               <2e   means wt% < 2 StdErr. The + in Z+El means involved in Sum=100%
    Z          wt%       StdErr        Z          wt%       StdErr        Z          wt%       StdErr
  ========================            ========================            ========================
  SumBe..F     0         0.020        29+Cu       0.24      0.02          51 Sb      <
  11+Na        0.095     0.008        30+Zn       0.0060    0.0006        52 Te      <
  12+Mg        <2e       0.004        31+Ga       0.015     0.001         53 I       <
  13+Al        98.35     0.06         32 Ge       <                       55+Cs      <2e       0.003
  14+Si        0.89      0.04         33 As       <                       56+Ba      0.012     0.004

15+P         0.017     0.002        34 Se       <                       SumLa..Lu  0.006     0.020
  16 S                                35 Br       <                       72+Hf      <2e       0.001
  16+So        0.038     0.003        37 Rb       <                       73 Ta      <
  17+Cl        0.109     0.009        38 Sr       <                       74+W       0.013     0.002
  18 Ar        <                      39 Y        <                       75 Re      <

19+K         0.029     0.002        40+Zr       <                       76+Os      0.0028    0.0010
  20+Ca        0.038     0.003        41 Nb       <                       77+Ir      <
  21 Sc        <                      42 Mo       <                       78 Pt      <
  22+Ti        0.0046    0.0008       44 Ru       <                       79 Au      <
  23+V         0.0022    0.0005       45 Rh       <                       80 Hg      <

24+Cr        0.0031    0.0005       46 Pd       <                       81 Tl      <
  25+Mn        0.0035    0.0005       47 Ag       <                       82+Pb      <
  26+Fe        0.098     0.008        48 Cd       <                       83 Bi      <
  27+Co        0.0045    0.0005       49 In       <                       90 Th      <
  28+Ni        0.0055    0.0006       50 Sn       <                       92 U       <

==== Light Elements =====           ==== Noble Elements =====           ===== Lanthanides =======
   4 Be                               44 Ru       <                       57 La      <
   5 B                                45 Rh       <                       58 Ce      <
   6 C                                46 Pd       <                       59 Pr      <
   7 N                                47 Ag       <                       60 Nd      <
   8 O                                75 Re       <                       62 Sm      <
   9 F         <                      76+Os       0.0028    0.0010        63 Eu      <2e       0.001
                                      77+Ir       <                       64 Gd      <2e       0.001
                                      78 Pt       <                       65 Tb      <
                                      79 Au       <                       66 Dy      <
                                                                          67 Ho      <
                                                                          68 Er      <
                                                                          69 Tm      <
                                                                          70 Yb      <
                                                                          71 Lu      <

KnownConc= 0                        REST= 0                             D/S= 0
  Sum Conc's before normalisation to 100% :   65.2 %
```

```
ANALYSIS REPORT                                           by Uniquant
--------------------------------------------------------------------------------
OLD.414
Spectrometers configuration:   ARL 8410 Rh 60kV LiF220 LiF420 Ge111 TlAP
Sample ident    =  14-01-11    LOWER SECTION RADIAL (UNPOLISHED)
Kappa list      =  15-Nov-94
Calculated as : Elements       Spectral impurity data : CAL.909 Teflon
X-ray path      =  Vacuum       Film type    = No supporting film
Case number     =  0    Known Area, %Rest, Diluent/Sample and Mass/Area
Eff.Diam.       = 25.00 mm      Eff.Area     = 490.6 mm2
KnownConc       =  0    %
Rest            =  0    %
Dil/Sample      =  0
Viewed Mass     = 18000.00 mg
Sample Height   =  5    mm
              <     means that the concentration is <  20 ppm
              <2e   means wt% < 2 StdErr. The + in Z+El means involved in Sum=100%
    Z       wt%    StdErr      Z       wt%    StdErr      Z          wt%    StdErr
   ========================   ========================   ===========================
   SumBe..F  0.032  0.019     29+Cu     0.13   0.01      51 Sb       <
   11+Na     0.032  0.003     30+Zn     0.0058 0.0005    52 Te       <
   12+Mg     <2e    0.004     31+Ga     0.016  0.001     53 I        <
   13+Al    96.85   0.09      32 Ge     <                55+Cs       <2e    0.003
   14+Si     2.37   0.07      33 As     <                56+Ba       <2e    0.004

15+P      0.015  0.001     34 Se     <                SumLa..Lu   0.005  0.018
   16 S                       35 Br     <                72+Hf       0.0027 0.0010
   16+So     0.23   0.02      37 Rb     <                73 Ta       <
   17+Cl     0.056  0.005     38 Sr     <                74+W        0.013  0.001
   18 Ar     <                39 Y      <                75 Re       <

19+K      0.024  0.002     40+Zr     0.0020 0.0003    76 Os       <
   20+Ca     0.15   0.01      41 Nb     <                77+Ir       <
   21 Sc     <                42 Mo     <                78 Pt       <
   22+Ti     0.015  0.001     44 Ru     <                79 Au       <
   23+V      0.0024 0.0004    45 Rh     <                80 Hg       <

24+Cr     <                46 Pd     <                81 Tl       <
   25+Mn     0.0031 0.0005    47 Ag     <                82 Pb       <
   26+Fe     0.054  0.005     48 Cd     <                83 Bi       <
   27 Co     <                49 In     <                90 Th       <
   28+Ni     0.0048 0.0006    50 Sn     <                92 U        <

==== Light Elements =====  ==== Noble Elements =====  ===== Lanthanides =======
    4 Be                      44 Ru     <                57 La       <
    5 B                       45 Rh     <                58 Ce       <
    6 C                       46 Pd     <                59 Pr       <
    7 N                       47 Ag     <                60 Nd       <2e    0.001
    8 O                       75 Re     <                62 Sm       <
    9 F      <2e    0.019     76 Os     <                63 Eu       <2e    0.001
                              77+Ir     <                64 Gd       <
                              78 Pt     <                65 Tb       <
                              79 Au     <                66 Dy       <
                                                         67 Ho       <
                                                         68 Er       <
                                                         69 Tm       <
                                                         70 Yb       <
                                                         71 Lu       <

KnownConc= 0                      REST= 0                  D/S= 0
   Sum Conc's before normalisation to 100% :   69.7 %
```

```
                                ANALYSIS REPORT              by Uniquant
--------------------------------------------------------------------------------
OLD.417
Spectrometers configuration:   ARL 8410 Rh 60kV LiF220 LiF420 Ge111 TlAP
Sample ident    =  14-01-11    UPPER SECTION AXIAL   (UNPOLISHED)
Kappa list      =  15-Nov-94
Calculated as : Elements       Spectral impurity data : CAL.909 Teflon
X-ray path      =  Vacuum       Film type    = No supporting film
Case number     =  0     Known Area, %Rest, Diluent/Sample and Mass/Area
Eff.Diam.       =  25.00 mm     Eff.Area     = 490.6 mm2
KnownConc       =  0     %
Rest            =  0     %
Dil/Sample      =  0
Viewed Mass     =  18000.00 mg
Sample Height   =  5     mm
                <    means that the concentration is <  20 ppm
                <2e  means wt% < 2 StdErr. The + in Z+El means involved in Sum=100%
   Z        wt%      StdErr    Z           wt%      StdErr    Z          wt%      StdErr
========================== ========================== ==========================
SumBe..F    0.054    0.019    29+Cu        0.16     0.01     51 Sb       <
11+Na       0.066    0.005    30+Zn        0.0062   0.0006   52 Te       <
12+Mg       0.014    0.004    31+Ga        0.024    0.002    53 I        <
13+Al      97.80     0.07     32 Ge        <                 55 Cs       <2e      0.003
14+Si       1.56     0.06     33 As        <                 56+Ba       0.009    0.004

15+P        0.035    0.003    34 Se        <                 SumLa..Lu   0.010    0.018
16 S                          35 Br        <                 72+Hf       <2e      0.001
16+So       0.027    0.002    37 Rb        <                 73 Ta       <
17+Cl       0.058    0.005    38 Sr        <                 74+W        0.010    0.001
18 Ar       <                 39 Y         <                 75 Re       <

19+K        0.021    0.002    40+Zr        <                 76 Os       <
20+Ca       0.017    0.002    41 Nb        <                 77 Ir       <
21 Sc       <                 42 Mo        <                 78 Pt       <
22+Ti       <                 44+Ru        <                 79 Au       <
23+V        <                 45 Rh        <                 80 Hg       <

24+Cr       <                 46 Pd        <                 81 Tl       <
25+Mn       0.0029   0.0005   47+Ag        <                 82 Pb       <
26+Fe       0.111    0.009    48 Cd        <                 83 Bi       <
27+Co       <                 49 In        <                 90 Th       <
28+Ni       0.0055   0.0006   50 Sn        <                 92 U        <

==== Light Elements =====    ==== Noble Elements =====    ===== Lanthanides =======
 4 Be                         44+Ru        <                 57 La       <
 5 B                          45 Rh        <                 58+Ce       0.004    0.002
 6 C                          46 Pd        <                 59 Pr       <
 7 N                          47+Ag        <                 60+Nd       0.003    0.001
 8 O                          75 Re        <                 62 Sm       <
 9+F        0.054    0.019    76 Os        <                 63+Eu       0.003    0.001
                              77 Ir        <                 64 Gd       <
                              78 Pt        <                 65 Tb       <
                              79 Au        <                 66 Dy       <
                                                             67 Ho       <
                                                             68 Er       <
                                                             69 Tm       <
                                                             70 Yb       <
                                                             71 Lu       <

KnownConc= 0                      REST= 0                      D/S= 0
Sum Conc's before normalisation to 100% :   68.1 %
```

```
                                 ANALYSIS REPORT                     by Uniquant
-------------------------------------------------------------------------------
OLD.423
Spectrometers configuration:  ARL 8410 Rh 60kV LiF220 LiF420 Ge111 TlAP
Sample ident    = 14-01-11    UPPER SECTION RADIAL   (UNPOLISHED)
Kappa list      = 15-Nov-94
Calculated as : Elements       Spectral impurity data : CAL.909 Teflon
X-ray path      = Vacuum       Film type     = No supporting film
Case number     = 0    Known Area, %Rest, Diluent/Sample and Mass/Area
Eff.Diam.       = 25.00 mm     Eff.Area      = 490.6 mm2
KnownConc       = 0     %
Rest            = 0     %
Dil/Sample      = 0
Viewed Mass     = 18000.00 mg
Sample Height   = 5    mm
            <   means that the concentration is <  20 ppm
           <2e  means wt% < 2 StdErr. The + in Z+El means involved in Sum=100%
   Z       wt%     StdErr      Z        wt%     StdErr      Z         wt%    StdErr
===========================   ==========================   ==========================
SumBe..F   0.035   0.019    29+Cu       0.16    0.01      51 Sb       <
11+Na      0.054   0.004    30+Zn       0.0064  0.0006    52 Te       <
12+Mg      0.013   0.004    31+Ga       0.025   0.002     53 I        <
13+Al      93.7    0.1      32 Ge       <                 55+Cs       <2e    0.003
14+Si      4.7     0.1      33 As       <                 56+Ba       0.010  0.004

15+P       0.019   0.002    34 Se       <                 SumLa..Lu   0.014  0.019
16 S                        35 Br       <                 72+Hf       <2e    0.001
16+So      0.63    0.03     37 Rb       <                 73 Ta       <
17+Cl      0.063   0.005    38 Sr       <                 74+W        0.007  0.001
18 Ar      <                39 Y        <                 75 Re       <

19+K       0.039   0.003    40+Zr       <                 76 Os       <
20+Ca      0.44    0.03     41 Nb       <                 77+Ir       <
21 Sc      <                42 Mo       <                 78 Pt       <
22+Ti      0.029   0.003    44 Ru       <                 79 Au       <
23+V       <                45 Rh       <                 80 Hg       <

24+Cr      <                46 Pd       <                 81 Tl       <
25+Mn      0.0030  0.0005   47 Ag       <                 82 Pb       <
26+Fe      0.097   0.008    48 Cd       <                 83 Bi       <
27+Co      <                49 In       <                 90+Th       <2e    0.001
28+Ni      0.0066  0.0006   50 Sn       <                 92 U        <

==== Light Elements =====   ==== Noble Elements =====   ===== Lanthanides =======
  4 Be                        44 Ru     <                 57 La       <
  5 B                         45 Rh     <                 58+Ce       0.004  0.002
  6 C                         46 Pd     <                 59 Pr       <
  7 N                         47 Ag     <                 60 Nd       <2e    0.001
  8 O                         75 Re     <                 62 Sm       <
  9 F     <2e     0.019       76 Os     <                 63+Eu       0.003  0.001
                              77+Ir     <                 64 Gd       <
                              78 Pt     <                 65 Tb       <
                              79 Au     <                 66 Dy       <
                                                          67 Ho       <
                                                          68 Er       <
                                                          69 Tm       <
                                                          70 Yb       <
                                                          71 Lu       <

KnownConc= 0                      REST= 0                     D/S= 0
Sum Conc's before normalisation to 100% :    68.9 %
```

```
                                      ANALYSIS REPORT                  by Uniquant
--------------------------------------------------------------------------------
OLD.446
Spectrometers configuration:  ARL 8410 Rh 60kV LiF220 LiF420 Ge111 TlAP
Sample ident    =  14-01-13      AXIAL
Kappa list      =  15-Nov-94
Calculated as : Elements         Spectral impurity data : CAL.909 Teflon
X-ray path      =  Vacuum         Film type   = No supporting film
Case number     =  0    Known Area, %Rest, Diluent/Sample and Mass/Area
Eff.Diam.       =  25.00 mm       Eff.Area    = 490.6 mm2
KnownConc       =  0     %
Rest            =  0     %
Dil/Sample      =  0
Viewed Mass     =  18000.00 mg
Sample Height   =  5    mm
              <    means that the concentration is <  20 ppm
              <2e  means wt% < 2 StdErr. The + in Z+El means involved in Sum=100%
  Z        wt%       StdErr       Z        wt%     StdErr       Z           wt%     StdErr
==========================   ==========================   ===========================

SumBe..F    0        0.037     29+Cu      0.114    0.009     51 Sb         <
11+Na       0.050    0.010     30 Zn      0.005    0.002     52 Te         <
12+Mg       0.023    0.004     31 Ga      <2e      0.002     53 I          <
13+Al       1.73     0.06      32 Ge      <                  55 Cs         <2e     0.004
14+Si       1.05     0.05      33 As      <                  56+Ba         0.009   0.004

15+P        0.0067   0.0006    34 Se      <                  SumLa..Lu     0       0.19
16 S                           35 Br      <                  72+Hf         0.043   0.008
16+So       0.45     0.03      37 Rb      <                  73 Ta         <
17+Cl       0.011    0.001     38+Sr      0.046    0.004     74+W          0.014   0.006
18 Ar       <                  39 Y       <                  75 Re         <

19+K        0.019    0.002     40+Zr      1.55     0.06      76 Os         <
20+Ca       0.82     0.04      41 Nb      <                  77 Ir         <2e     0.005
21 Sc       <                  42 Mo      <                  78 Pt         <
22+Ti       0.035    0.003     44 Ru      <                  79 Au         <2e     0.005
23+V        1.75     0.06      45 Rh      <2e      0.003     80 Hg         <

24+Cr       1.99     0.07      46 Pd      <                  81 Tl         <
25+Mn       1.72     0.06      47+Ag      0.005    0.002     82 Pb         <2e     0.002
26+Fe       88.6     0.2       48 Cd      <                  83 Bi         <
27 Co       <                  49 In      <                  90 Th         <
28 Ni       <                  50 Sn      <2e      0.002     92 U          <

==== Light Elements =====    ==== Noble Elements =====   ===== Lanthanides =======
  4 Be                          44 Ru      <                  57 La         <
  5 B                           45 Rh      <2e      0.003     58 Ce         <
  6 C                           46 Pd      <                  59+Pr         <
  7 N                           47+Ag      0.005    0.002     60 Nd         <
  8 O                           75 Re      <                  62+Sm         <
  9 F        <                  76 Os      <                  63+Eu         <
                                77 Ir      <2e      0.005     64 Gd         <
                                78 Pt      <                  65+Tb         <
                                79 Au      <2e      0.005     66 Dy         <
                                                              67 Ho         <
                                                              68+Er         <
                                                              69 Tm         <
                                                              70 Yb         <
                                                              71 Lu         <

KnownConc= 0                        REST= 0                  D/S= 0
Sum Conc's before normalisation to 100% :    60.3 %
```

```
ANALYSIS REPORT                                          by Uniquant
--------------------------------------------------------------------------------
OLD.447
Spectrometers configuration:  ARL 8410 Rh 60kV LiF220 LiF420 Ge111 TlAP
Sample ident     = 14-01-13      RADIAL
Kappa list       = 15-Nov-94
Calculated as :    Elements     Spectral impurity data : CAL.909 Teflon
X-ray path       = Vacuum        Film type   = No supporting film
Case number      = 0    Known Area, %Rest, Diluent/Sample and Mass/Area
Eff.Diam.        = 25.00 mm      Eff.Area    = 490.6 mm2
KnownConc        = 0      %
Rest             = 0      %
Dil/Sample       = 0
Viewed Mass      = 18000.00 mg
Sample Height    = 5   mm
              <     means that the concentration is <  20 ppm
              <2e   means wt% < 2 StdErr. The + in Z+El means involved in Sum=100%
    Z         wt%      StdErr       Z         wt%      StdErr       Z         wt%      StdErr
==========================   ==========================   ==========================
SumBe..F     0        0.032     29+Cu     0.096    0.008    51 Sb     <
11+Na        0.094    0.009     30+Zn     0.010    0.002    52 Te     <
12+Mg        0.030    0.003     31 Ga     <                 53 I      <
13+Al        0.59     0.03      32 Ge     <                 55 Cs     <
14+Si        0.14     0.01      33 As     <                 56 Ba     <

15+P         0.0047   0.0004    34 Se     <                 SumLa..Lu 0.01     0.19
16+S         0.044    0.004     35 Br     <                 72+Hf     0.015    0.005
16 So                           37 Rb     <                 73 Ta     <
17+Cl        0.017    0.002     38 Sr     <                 74+W      0.012    0.005
18 Ar        <                  39 Y      <                 75 Re     <

19+K         0.012    0.001     40+Zr     0.20     0.01     76 Os     <2e      0.004
20+Ca        0.023    0.002     41 Nb     <                 77 Ir     <2e      0.004
21+Sc        <                  42+Mo     0.004    0.002    78 Pt     <
22+Ti        0.0076   0.0007    44 Ru     <                 79 Au     <2e      0.004
23+V         1.95     0.06      45 Rh     <                 80 Hg     <2e      0.003

24+Cr        2.33     0.07      46 Pd     <                 81 Tl     <
25+Mn        1.74     0.06      47 Ag     <                 82 Pb     0.004    0.002
26+Fe        92.7     0.1       48 Cd     <                 83 Bi     <
27 Co        <                  49 In     <                 90 Th     <
28 Ni        <                  50 Sn     <                 92 U      <

==== Light Elements =====       ==== Noble Elements =====   ===== Lanthanides ========
   4  Be                           44 Ru     <                 57+La     0.010    0.002
   5  B                            45 Rh     <                 58+Ce     <
   6  C                            46 Pd     <                 59+Pr     <
   7  N                            47 Ag     <                 60 Nd     <
   8  O                            75 Re     <                 62+Sm     <
   9  F         <                  76 Os     <2e     0.004     63+Eu     <
                                   77 Ir     <2e     0.004     64 Gd     <
                                   78 Pt     <                 65+Tb     <
                                   79 Au     <2e     0.004     66 Dy     <
                                                               67 Ho     <2e      0.009
                                                               68+Er     <
                                                               69+Tm     <
                                                               70 Yb     <
                                                               71 Lu     <

KnownConc= 0                    REST= 0                   D/S= 0
Sum Conc's before normalisation to 100% :   84.4 %
```

```
                                ANALYSIS REPORT                      by Uniquant
------------------------------------------------------------------------------
OLD.488
Spectrometers configuration:  ARL 8410 Rh 60kV LiF220 LiF420 Ge111 TlAP
Sample ident    =  14-01-20     AXIAL (THIN SECTION)
Kappa list      =  15-Nov-94
Calculated as : Elements     Spectral impurity data : CAL.909 Teflon
X-ray path      =  Vacuum       Film type    = No supporting film
Case number     =  0    Known Area, %Rest, Diluent/Sample and Mass/Area
Eff.Diam.       = 25.00 mm      Eff.Area     = 490.6 mm2
KnownConc       = 0     %
Rest            = 0     %
Dil/Sample      = 0
Viewed Mass     = 18000.00 mg
Sample Height   = 5   mm
            <    means that the concentration is <  20 ppm
            <2e  means wt% < 2 StdErr. The + in Z+El means involved in Sum=100%
  Z         wt%      StdErr    Z          wt%     StdErr    Z          wt%     StdErr
========================   ========================   ========================
SumBe..F    0        0.87     29+Cu      0.37    0.02      51 Sb      <
11+Na       0.28     0.02     30+Zn      0.013   0.003     52 Te      <
12+Mg       0.035    0.004    31 Ga      <                 53 I       <
13+Al       2.49     0.07     32 Ge      <                 55 Cs      <2e     0.003
14+Si       0.32     0.02     33 As      <                 56 Ba      <

15+P        0.0081   0.0007   34 Se      <                 SumLa..Lu  0.01    10.00
16 S                          35 Br      <                 72 Hf      <2e     0.006
16+So       <                 37 Rb      <                 73 Ta      <
17+Cl       0.078    0.006    38 Sr      <                 74 W       <
18 Ar       <                 39 Y       <                 75+Re      0.046   0.006

19+K        0.0086   0.0008   40+Zr      <                 76 Os      <
20+Ca       0.054    0.005    41 Nb      <                 77 Ir      <
21+Sc       <                 42 Mo      <2e     0.002     78 Pt      <
22+Ti       <                 44 Ru      <                 79 Au      <
23+V        1.79     0.06     45 Rh      <                 80 Hg      <

24+Cr       0.022    0.007    46 Pd      <                 81 Tl      <2e     0.003
25+Mn       0.0082   0.0007   47 Ag      <2e     0.002     82 Pb      <2e     0.002
26+Fe       0.53     0.03     48 Cd      <2e     0.002     83 Bi      <
27+Co       93.8     0.1      49 In      <                 90 Th      0.005   0.002
28+Ni       0.18     0.01     50 Sn      <                 92 U       <

==== Light Elements =====    ==== Noble Elements =====    ===== Lanthanides =======
  4 Be                         44 Ru      <                 57 La      <
  5 B                          45 Rh      <                 58 Ce      <
  6 C                          46 Pd      <                 59+Pr      <
  7 N                          47 Ag      <2e     0.002     60 Nd      <
  8 O                          75+Re      0.046   0.006     62 Sm      <
  9+F       <                  76 Os      <                 63+Eu      0.006   0.002
                               77 Ir      <                 64 Gd      <2e     0.002
                               78 Pt      <                 65 Tb      <
                               79 Au      <                 66 Dy      <
                                                            67+Ho      <
                                                            68+Er      <
                                                            69 Tm      <
                                                            70 Yb      <
                                                            71+Lu      <

KnownConc= 0                   REST= 0                      D/S= 0
Sum Conc's before normalisation to 100% :    93.4 %
```

```
                              ANALYSIS REPORT                 by Uniquant
--------------------------------------------------------------------------------
OLD.792
Spectrometers configuration:  ARL 8410 Rh 60kV LiF220 LiF420 Ge111 TlAP
Sample ident     =  14-02-06      AXIAL
Kappa list       =  15-Nov-94
Calculated as :  Elements      Spectral impurity data : CAL.909 Teflon
X-ray path       =  Vacuum        Film type    = No supporting film
Case number      =  0    Known Area, %Rest, Diluent/Sample and Mass/Area
Eff.Diam.        =  25.00 mm      Eff.Area     = 490.6 mm2
KnownConc        =  0    %
Rest             =  0    %
Dil/Sample       =  0
Viewed Mass      =  18000.00 mg
Sample Height    =  5    mm
           <     means that the concentration is <  20 ppm
          <2e    means wt% < 2 StdErr. The + in Z+El means involved in Sum=100%
   Z     wt%     StdErr      Z        wt%     StdErr      Z          wt%     StdErr
============================  ============================  ============================
SumBe..F   0      0.043    29+Cu    98.80    0.05       51 Sb       <
11+Na    0.065    0.012    30+Zn     <                  52 Te       <
12 Mg     <                31 Ga    <2e      0.003      53 I        <
13+Al    0.47     0.03     32 Ge     <                  55 Cs       <
14+Si    0.59     0.03     33 As     <                  56 Ba       <

15+P      <                34 Se     <                  SumLa..Lu  0.015   0.073
16+S     0.0031   0.0003   35 Br     <                  72+Hf       <
16 So                      37 Rb     <                  73+Ta       <
17+Cl    0.0103   0.0009   38 Sr     <                  74 W        <
18+Ar    0.016    0.001    39 Y      <                  75 Re       <

19 K      <                40 Zr     <                  76 Os      <2e      0.007
20+Ca    0.0036   0.0008   41 Nb     <                  77+Ir      0.024    0.008
21 Sc     <                42 Mo     <                  78 Pt       <
22 Ti     <                44 Ru     <                  79 Au      <2e      0.007
23 V      <                45 Rh    <2e      0.002      80 Hg      <2e      0.006

24 Cr     <                46 Pd     <                  81 Tl       <
25 Mn     <                47+Ag    0.004    0.002      82 Pb       <
26 Fe     <                48 Cd     <                  83 Bi       <
27+Co     <                49 In     <                  90 Th      <2e      0.003
28 Ni     <                50 Sn     <                  92 U        <

==== Light Elements =====  ==== Noble Elements =====   ===== Lanthanides =======
  4 Be                     44 Ru     <                  57 La       <
  5 B                      45 Rh    <2e      0.002      58 Ce       <
  6 C                      46 Pd     <                  59 Pr       <
  7 N                      47+Ag    0.004    0.002      60 Nd      <2e      0.002
  8 O                      75 Re     <                  62 Sm       <
  9 F       <              76 Os    <2e      0.007      63 Eu       <
                           77+Ir    0.024    0.008      64 Gd      <2e      0.002
                           78 Pt     <                  65 Tb       <
                           79 Au    <2e      0.007      66 Dy       <
                                                        67 Ho       <
                                                        68+Er      0.009    0.004
                                                        69 Tm       <
                                                        70 Yb       <
                                                        71+Lu       <

KnownConc= 0                     REST= 0                     D/S= 0
Sum Conc's before normalisation to 100% :   98.6 %
```

```
                          ANALYSIS REPORT                    by Uniquant
--------------------------------------------------------------------------------
OLD.791 of 8-May-02                                           Today  8-May-02
Spectrometers configuration:  ARL 8410 Rh 60kV LiF220 LiF420 Ge111 TlAP
Sample ident    = 14-02-06        RADIAL
Kappa list      = 15-Nov-94
Calculated as : Elements      Spectral impurity data : CAL.909 Teflon
X-ray path      = Vacuum       Film type    = No supporting film
Case number     = 0   Known Area, %Rest, Diluent/Sample and Mass/Area
Eff.Diam.       = 25.00 mm       Eff.Area    = 490.6 mm2
KnownConc       = 0    %
Rest            = 0    %
Dil/Sample      = 0
Viewed Mass     = 18000.00 mg
Sample Height   = 5    mm
                <    means that the concentration is <  20 ppm
                <2e  means wt% < 2 StdErr. The + in Z+El means involved in Sum=100%
       Z       wt%      StdErr       Z       wt%      StdErr       Z       wt%      StdErr
       =========================     =========================     =========================
       SumBe..F  0       0.042       29+Cu   98.23    0.07         51  Sb    <
       11+Na   0.089     0.012       30+Zn   <                     52  Te    <
       12  Mg  <                     31+Ga   0.008    0.003        53  I     <
       13+Al   0.88      0.04        32  Ge  <                     55  Cs    <
       14+Si   0.69      0.03        33  As  <                     56+Ba   0.007    0.003

15+P    <                     34  Se  <                     SumLa..Lu 0.014  0.074
       16+S    0.0061    0.0006      35  Br  <                     72+Hf   <
       16  So                        37  Rb  <                     73+Ta   <
       17+Cl   0.027     0.002       38  Sr  <2e      0.001        74  W    <
       18+Ar   0.015     0.001       39  Y   <                     75  Re   <

19+K    0.0075    0.0008      40  Zr  <                     76  Os   <
       20  Ca  <                     41  Nb  <                     77+Ir   0.020    0.008
       21  Sc  <                     42  Mo  <                     78  Pt  <2e      0.007
       22+Ti   0.004     0.001       44  Ru  <                     79  Au   <
       23  V   <                     45  Rh  <                     80  Hg  <2e      0.006

24  Cr  <                     46  Pd  <                     81  Tl   <
       25  Mn  <                     47+Ag   0.004    0.002        82  Pb   <
       26  Fe  <                     48  Cd  <                     83  Bi   <
       27  Co  <                     49  In  <                     90  Th   <
       28  Ni  <                     50  Sn  <                     92  U   <2e      0.003

==== Light Elements =====     ==== Noble Elements =====     ===== Lanthanides =======
       4  Be                         44  Ru  <                     57+La  <2e       0.005
       5  B                          45  Rh  <                     58  Ce  <
       6  C                          46  Pd  <                     59  Pr  <
       7  N                          47+Ag   0.004    0.002        60  Nd  <
       8  O                          75  Re  <                     62  Sm  <
       9  F    <                     76  Os  <                     63+Eu   0.005    0.002
                                     77+Ir   0.020    0.008        64  Gd  <
                                     78  Pt  <2e      0.007        65  Tb  <
                                     79  Au  <                     66  Dy  <
                                                                   67  Ho  <
                                                                   68  Er  <
                                                                   69  Tm  <
                                                                   70  Yb  <
                                                                   71+Lu  <

KnownConc= 0                      REST= 0                   D/S= 0
       Sum Conc's before normalisation to 100% :    98.3 %
```

```
                                          ANALYSIS REPORT            by Uniquant
--------------------------------------------------------------------------------
OLD.582
Spectrometers configuration:  ARL 8410 Rh 60kV LiF220 LiF420 Ge111 TlAP
Sample ident      =  14-02-03      AXIAL
Kappa list        =  15-Nov-94
Calculated as :   Elements      Spectral impurity data : CAL.909 Teflon
X-ray path        =  Vacuum        Film type     = No supporting film
Case number       =  0    Known Area, %Rest, Diluent/Sample and Mass/Area
Eff.Diam.         =  25.00 mm       Eff.Area      =  490.6 mm2
KnownConc         =  0     %
Rest              =  0     %
Dil/Sample        =  0
Viewed Mass       =  18000.00 mg
Sample Height     =  5    mm
               <     means that the concentration is <  20 ppm
              <2e    means wt% < 2 StdErr. The + in Z+El means involved in Sum=100%
  Z         wt%      StdErr      Z           wt%    StdErr     Z              wt%     StdErr
==========================    ========================      ========================
SumBe..F    0        0.043    29+Cu         0.048   0.004    51 Sb           <
11+Na       0.13     0.01     30 Zn         <                52 Te           <
12+Mg       0.044    0.005    31 Ga         <                53 I            <2e     0.002
13+Al       0.080    0.007    32 Ge         <                55 Cs           <
14+Si       0.019    0.008    33 As         <                56 Ba           <

15+P        0.0042   0.0004   34 Se         <                SumLa..Lu       0       0.21
16+S        0.023    0.002    35 Br         <                72 Hf           <2e     0.005
16 So                         37 Rb         <                73+Ta           0.46    0.03
17+Cl       0.026    0.002    38 Sr         <                74+W            0.015   0.004
18+Ar       0.0055   0.0010   39 Y          <                75 Re           <2e     0.004

19+K        0.0022   0.0006   40 Zr         <                76 Os           <
20+Ca       0.014    0.001    41+Nb         <                77 Ir           <
21+Sc       0.0030   0.0006   42 Mo         <                78 Pt           <
22 Ti       <                 44 Ru         <                79 Au           <
23+V        2.14     0.07     45 Rh         <                80 Hg           <

24+Cr       2.54     0.07     46 Pd         <                81 Tl           <
25+Mn       2.34     0.07     47 Ag         <                82+Pb           0.005   0.002
26+Fe       92.1     0.1      48 Cd         <                83 Bi           <
27 Co       <                 49 In         <                90+Th           0.011   0.002
28 Ni       <2e      0.003    50 Sn         <                92 U            <

==== Light Elements =====     ==== Noble Elements =====     ===== Lanthanides =======
  4 Be                          44 Ru         <               57 La           <
  5 B                           45 Rh         <               58 Ce           <
  6 C                           46 Pd         <               59+Pr           <2e     0.010
  7 N                           47 Ag         <               60 Nd           <
  8 O                           75 Re         <2e     0.004   62+Sm           <
  9 F         <                 76 Os         <               63+Eu           <
                                77 Ir         <               64 Gd           <
                                78 Pt         <               65+Tb           <
                                79 Au         <               66 Dy           <
                                                              67 Ho           <
                                                              68+Er           <
                                                              69+Tm           <
                                                              70 Yb           <
                                                              71 Lu           <

KnownConc= 0                      REST= 0                      D/S= 0
Sum Conc's before normalisation to 100% :     96.6 %
```

```
                    ANALYSIS REPORT                by Uniquant
------------------------------------------------------------------------------
OLD.583
Spectrometers configuration:  ARL 8410 Rh 60kV LiF220 LiF420 Ge111 TlAP
Sample ident    =  14-02-03     RADIAL
Kappa list      =  15-Nov-94
Calculated as  :  Elements    Spectral impurity data : CAL.909 Teflon
X-ray path      =  Vacuum       Film type     = No supporting film
Case number     =  0    Known Area, %Rest, Diluent/Sample and Mass/Area
Eff.Diam.       =  25.00 mm     Eff.Area      = 490.6 mm2
KnownConc       =  0    %
Rest            =  0    %
Dil/Sample      =  0
Viewed Mass     =  18000.00 mg
Sample Height   =  5   mm
            <     means that the concentration is <  20 ppm
           <2e    means wt% < 2 StdErr. The + in Z+El means involved in Sum=100%
  Z       wt%      StdErr     Z        wt%     StdErr    Z           wt%     StdErr
=========================  =========================  ==========================
SumBe..F   0       0.041    29+Cu      0.031   0.003   51 Sb         <
11+Na      0.074   0.011    30+Zn      0.004   0.002   52 Te         <
12+Mg      0.066   0.005    31 Ga      <                53 I          <
13+Al      0.083   0.007    32 Ge      <                55 Cs         <2e     0.002
14+Si      0.027   0.008    33 As      <                56 Ba         <2e     0.003

15+P       0.0044  0.0004   34+Se      <                SumLa..Lu     0       0.21
16+S       0.022   0.002    35 Br      <                72 Hf         <2e     0.005
16 So                       37 Rb      <                73+Ta         0.51    0.03
17+Cl      0.040   0.003    38 Sr      <                74+W          0.013   0.004
18+Ar      0.0093  0.0009   39 Y       <                75 Re         <

19+K       <                40 Zr      <                76 Os         <
20+Ca      0.043   0.004    41 Nb      <                77 Ir         <
21+Sc      0.0031  0.0006   42+Mo      0.005   0.002    78 Pt         <
22 Ti      <                44 Ru      <                79 Au         <
23+V       2.17    0.07     45 Rh      <                80 Hg         <

24+Cr      2.57    0.07     46 Pd      <                81 Tl         <2e     0.002
25+Mn      2.37    0.07     47 Ag      <                82+Pb         0.004   0.002
26+Fe      91.9    0.1      48 Cd      <                83 Bi         <
27 Co      <                49 In      <                90+Th         <2e     0.002
28 Ni      <2e     0.002    50 Sn      <                92 U          <

==== Light Elements =====   ==== Noble Elements =====  ===== Lanthanides =======
  4 Be                       44 Ru      <                57 La         <
  5 B                        45 Rh      <                58 Ce         <
  6 C                        46 Pd      <                59+Pr         <
  7 N                        47 Ag      <                60 Nd         <
  8 O                        75 Re      <                62+Sm         <
  9 F       <                76 Os      <                63+Eu         <
                             77 Ir      <                64 Gd         <
                             78 Pt      <                65+Tb         <
                             79 Au      <                66 Dy         <
                                                         67 Ho         <
                                                         68+Er         <
                                                         69+Tm         <
                                                         70 Yb         <
                                                         71 Lu         <

KnownConc= 0                    REST= 0                  D/S= 0
Sum Conc's before normalisation to 100% :    98.5 %
```

```
ANALYSIS REPORT                                          by Uniquant
---------------------------------------------------------------------------------
OLD.177
Spectrometers configuration:  ARL 8410 Rh 60kV LiF220 LiF420 Ge111 TlAP
Sample ident   =  14-04-05      AXIAL
Kappa list     =  15-Nov-94
Calculated as :   Elements      Spectral impurity data : CAL.909 Teflon
X-ray path     =  Vacuum        Film type   = No supporting film
Case number    =  0    Known Area, %Rest, Diluent/Sample and Mass/Area
Eff.Diam.      =  25.00 mm      Eff.Area    = 490.6 mm2
KnownConc      =  0      %
Rest           =  0      %
Dil/Sample     =  0
Viewed Mass    =  18000.00 mg
Sample Height  =  5   mm
          <    means that the concentration is <  20 ppm
          <2e  means wt% < 2 StdErr. The + in Z+El means involved in Sum=100%
    Z      wt%      StdErr        Z       wt%     StdErr        Z         wt%     StdErr
==========================   ==========================   ==========================
SumBe..F   0        0.047    29+Cu    96.98    0.09      51 Sb      <
11+Na      0.081    0.012    30+Zn    <                  52 Te      <
12 Mg      <                 31 Ga    0.006    0.003     53 I       <
13+Al      0.36     0.02     32 Ge    <2e      0.003     55 Cs      <
14+Si      2.48     0.07     33 As    <                  56 Ba      <2e      0.003

15+P       <                 34 Se    <                  SumLa..Lu  0.027    0.070
16+S       0.0084   0.0008   35 Br    <                  72+Hf      <
16 So                        37 Rb    <                  73+Ta      <
17+Cl      0.019    0.002    38 Sr    <                  74 W       <
18 Ar      <                 39 Y     <                  75 Re      <

19+K       <                 40 Zr    <                  76 Os      <
20+Ca      0.0094   0.0009   41 Nb    <                  77+Ir      0.033    0.008
21+Sc      0.0025   0.0008   42 Mo    <2e      0.002     78 Pt      <
22+Ti      <2e      0.001    44 Ru    <                  79 Au      <
23 V       <                 45 Rh    <                  80 Hg      <2e      0.006

24 Cr      <                 46 Pd    <                  81 Tl      <
25 Mn      <                 47 Ag    <2e      0.002     82 Pb
26 Fe      <                 48 Cd    <2e      0.002     83 Bi      <
27+Co      0.0020   0.0008   49 In    <                  90 Th      <2e      0.003
28 Ni      <                 50 Sn    <                  92 U       <

==== Light Elements =====    ==== Noble Elements =====    ===== Lanthanides =======
  4 Be                         44 Ru    <                  57+La      0.012    0.004
  5 B                          45 Rh    <                  58 Ce      <
  6 C                          46 Pd    <                  59 Pr      <
  7 N                          47 Ag    <2e      0.002     60 Nd      <
  8 O                          75 Re    <                  62 Sm      <
  9 F       <                  76 Os    <                  63 Eu      <
                               77+Ir    0.033    0.008     64 Gd      <
                               78 Pt    <                  65 Tb      <
                               79 Au    <                  66 Dy      <
                                                           67 Ho      <
                                                           68+Er      0.013    0.004
                                                           69 Tm      <
                                                           70 Yb      <
                                                           71+Lu      <

KnownConc= 0                     REST= 0               D/S= 0
Sum Conc's before normalisation to 100% :   97.4 %
```

```
                       ANALYSIS REPORT                           by Uniquant
--------------------------------------------------------------------------------
OLD.178
Spectrometers configuration:  ARL 8410 Rh 60kV LiF220 LiF420 Ge111 TlAP
Sample ident   = 14-04-05      RADIAL
Kappa list     = 15-Nov-94
Calculated as :  Elements     Spectral impurity data : CAL.909 Teflon
X-ray path     = Vacuum        Film type     = No supporting film
Case number    = 0   Known Area, %Rest, Diluent/Sample and Mass/Area
Eff.Diam.      = 25.00 mm      Eff.Area      = 490.6 mm2
KnownConc      = 0    %
Rest           = 0    %
Dil/Sample     = 0
Viewed Mass    = 18000.00 mg
Sample Height  = 5  mm
           <     means that the concentration is <  20 ppm
           <2e   means wt% < 2 StdErr. The + in Z+El means involved in Sum=100%
   Z       wt%       StdErr    Z          wt%      StdErr    Z          wt%      StdErr
===========================   ===========================   ===========================
SumBe..F   0         0.049    29+Cu       97.84    0.07     51 Sb       <
11+Na      0.082     0.013    30+Zn       <                 52 Te       <
12 Mg      <                  31 Ga       <2e      0.003    53 I        <
13+Al      0.63      0.03     32 Ge       <                 55 Cs       <
14+Si      1.34      0.05     33 As       <                 56 Ba       <2e      0.003

15+P       <                  34 Se       <                 SumLa..Lu   0.032    0.071
16+S       0.0066    0.0006   35 Br       <                 72+Hf       <
16 So                         37 Rb       <                 73+Ta       <
17+Cl      0.018     0.002    38 Sr       <                 74 W        <
18 Ar      <                  39 Y        <                 75 Re       <2e      0.008

19+K       0.0021    0.0008   40 Zr       <                 76 Os       <
20+Ca      0.0058    0.0008   41 Nb       <                 77+Ir       0.032    0.009
21+Sc      0.0042    0.0009   42 Mo       <2e      0.002    78 Pt       <
22+Ti      0.004     0.001    44 Ru       <                 79 Au       <2e      0.007
23+V       <                  45 Rh       <                 80 Hg       <

24 Cr      <                  46 Pd       <                 81 Tl       <
25 Mn      <                  47 Ag       <2e      0.002    82 Pb       <
26 Fe      <                  48+Cd       0.004    0.002    83 Bi       <
27 Co      <                  49+In       0.004    0.002    90 Th       <2e      0.003
28 Ni      <                  50 Sn       <                 92 U        <

==== Light Elements =====     ==== Noble Elements =====     ===== Lanthanides =======
 4 Be                         44 Ru       <                 57+La       0.022    0.005
 5 B                          45 Rh       <                 58 Ce       <
 6 C                          46 Pd       <                 59 Pr       <
 7 N                          47 Ag       <2e      0.002    60 Nd       <
 8 O                          75 Re       <2e      0.008    62 Sm       <
 9 F       <                  76 Os       <                 63 Eu       0.003    0.002
                              77+Ir       0.032    0.009    64 Gd       <
                              78 Pt       <                 65 Tb       <
                              79 Au       <2e      0.007    66 Dy       <
                                                            67 Ho       <
                                                            68+Er       <2e      0.004
                                                            69 Tm       <
                                                            70 Yb       <
                                                            71+Lu       <

KnownConc= 0                          REST= 0                      D/S= 0
Sum Conc's before normalisation to 100% :   97.7 %
```

```
ANALYSIS REPORT                                            by Uniquant
--------------------------------------------------------------------------------
OLD.115
Spectrometers configuration:  ARL 8410 Rh 60kV LiF220 LiF420 Ge111 TlAP
Sample ident   = 14-03-03      AXIAL
Kappa list     = 15-Nov-94
Calculated as  : Elements     Spectral impurity data : CAL.909 Teflon
X-ray path     = Vacuum       Film type     = No supporting film
Case number    = 0   Known Area, %Rest, Diluent/Sample and Mass/Area
Eff.Diam.      = 25.00 mm     Eff.Area      = 490.6 mm2
KnownConc      = 0    %
Rest           = 0    %
Dil/Sample     = 0
Viewed Mass    = 18000.00 mg
Sample Height  = 5   mm
          <     means that the concentration is <  20 ppm
          <2e   means wt% < 2 StdErr. The + in Z+El means involved in Sum=100%
  Z       wt%      StdErr     Z          wt%     StdErr     Z           wt%     StdErr
==========================   ==========================   ==========================
SumBe..F  0        0.046     29+Cu       99.55    0.03     51 Sb        <
11+Na     0.079    0.012     30+Zn       <                 52 Te        <
12 Mg     <                  31 Ga       <2e      0.003    53 I         <
13+Al     0.23     0.02      32 Ge       <2e      0.003    55 Cs        <
14+Si     0.038    0.006     33 As       <                 56 Ba        <2e     0.003

15+P      <                  34 Se       <                 SumLa..Lu    0.038   0.069
16+S      0.0030   0.0003    35 Br       <                 72+Hf        <
16 So                        37 Rb       <                 73+Ta        <
17+Cl     0.0102   0.0009    38 Sr       <                 74 W         <
18 Ar     <                  39 Y        <                 75 Re        <

19+K      0.013    0.001     40 Zr       <                 76 Os        <
20+Ca     0.0031   0.0008    41 Nb       <                 77+Ir        0.030   0.008
21 Sc     <                  42 Mo       <                 78 Pt        <
22+Ti     0.0026   0.0007    44 Ru       <                 79 Au        <
23 V      <                  45 Rh       <2e      0.002    80 Hg        <2e     0.006

24 Cr     <                  46 Pd       <                 81 Tl        <
25 Mn     <                  47 Ag       <2e      0.002    82 Pb        <
26 Fe     <                  48 Cd       <2e      0.002    83 Bi        <
27+Co     <                  49 In       <                 90+Th        0.007   0.003
28 Ni     <                  50 Sn       <                 92 U         <

==== Light Elements =====    ==== Noble Elements =====    ===== Lanthanides =======
 4 Be                        44 Ru       <                 57+La        0.020   0.003
 5 B                         45 Rh       <2e      0.002    58 Ce        <2e     0.002
 6 C                         46 Pd       <                 59 Pr        <
 7 N                         47 Ag       <2e      0.002    60 Nd        <
 8 O                         75 Re       <                 62 Sm        <
 9 F      <                  76 Os       <                 63 Eu        <
                             77+Ir       0.030    0.008    64 Gd        0.003   0.002
                             78 Pt       <                 65 Tb        <
                             79 Au       <                 66 Dy        <
                                                           67 Ho        <
                                                           68+Er        0.013   0.004
                                                           69 Tm        <
                                                           70 Yb        <
                                                           71+Lu        <

KnownConc= 0                      REST= 0                    D/S= 0
Sum Conc's before normalisation to 100% :    99.0 %
```

```
ANALYSIS REPORT                                                by Uniquant
--------------------------------------------------------------------------------
OLD.116
Spectrometers configuration:  ARL 8410 Rh 60kV LiF220 LiF420 Ge111 TlAP
Sample ident    =  014-03-03     RADIAL
Kappa list      =  15-Nov-94
Calculated as : Elements      Spectral impurity data : CAL.909  Teflon
X-ray path      =  Vacuum       Film type   = No supporting film
Case number     =  0      Known Area, %Rest, Diluent/Sample and Mass/Area
Eff.Diam.       =  25.00 mm     Eff.Area    = 490.6 mm2
KnownConc       =  0    %
Rest            =  0    %
Dil/Sample      =  0
Viewed Mass     =  18000.00 mg
Sample Height   =  5    mm
              <     means that the concentration is <  20 ppm
              <2e   means wt% < 2 StdErr. The + in Z+El means involved in Sum=100%
    Z       wt%    StdErr     Z         wt%    StdErr     Z         wt%    StdErr
  =========================  =========================  =========================
  SumBe..F   0      0.045    29+Cu     99.23   0.04      51 Sb      <
  11+Na      0.086  0.011    30+Zn      <                52 Te      <
  12 Mg      <                31 Ga     0.006  0.003     53 I       <2e    0.002
  13+Al      0.29   0.02     32 Ge      <                55 Cs      <
  14+Si      0.27   0.02     33 As      0.009  0.004     56+Ba      0.007  0.003

15+P       <                34 Se      <               SumLa..Lu  0.027  0.069
  16+S       0.0034 0.0003   35 Br      <                72+Hf      <
  16 So                      37 Rb      <                73+Ta      <
  17+Cl      0.0100 0.0009   38+Sr     0.003  0.001      74 W       <
  18 Ar      <               39 Y       <                75 Re      <

19 K       <               40 Zr      <                76 Os      <2e    0.007
  20+Ca      0.0109 0.0010   41 Nb      <                77+Ir      0.022  0.008
  21 Sc      <               42 Mo      <                78 Pt      <
  22 Ti      <               44 Ru      <                79 Au      <2e    0.007
  23 V       <               45 Rh      <2e    0.002     80 Hg      <

24+Cr      0.0026 0.0006   46 Pd      <                81+Tl      0.019  0.005
  25 Mn      <               47 Ag      <2e    0.002     82 Pb      <2e    0.003
  26 Fe      <               48 Cd      <                83 Bi      <
  27+Co      <               49 In      <                90+Th      0.011  0.003
  28 Ni      <               50 Sn      <                92 U       <

==== Light Elements =====  ==== Noble Elements =====   ===== Lanthanides =======
   4 Be                      44 Ru      <                57 La      <
   5 B                       45 Rh      <2e    0.002     58 Ce      <
   6 C                       46 Pd      <                59+Pr      0.006  0.002
   7 N                       47 Ag      <2e    0.002     60 Nd      <
   8 O                       75 Re      <                62 Sm      <
   9 F       <               76 Os      <2e    0.007     63 Eu      <
                             77+Ir     0.022   0.008     64+Gd      0.003  0.002
                             78 Pt      <                65 Tb      <
                             79 Au      <2e    0.007     66 Dy      <
                                                         67 Ho      <
                                                         68+Er      0.017  0.004
                                                         69 Tm      <
                                                         70 Yb      <
                                                         71+Lu      <

KnownConc= 0                    REST= 0                    D/S= 0
  Sum Conc's before normalisation to 100% :    99.3 %
```

```
                             ANALYSIS REPORT                    by Uniquant
---------------------------------------------------------------------------
OLD.185
Spectrometers configuration:  ARL 8410 Rh 60kV LiF220 LiF420 Ge111 TlAP
Sample ident    =  14-01-21      AXIAL
Kappa list      =  15-Nov-94
Calculated as : Elements     Spectral impurity data : CAL.909 Teflon
X-ray path      =  Vacuum       Film type     = No supporting film
Case number     =  0   Known Area, %Rest, Diluent/Sample and Mass/Area
Eff.Diam.       =  25.00 mm     Eff.Area      =  490.6 mm2
KnownConc       =  0      %
Rest            =  0      %
Dil/Sample      =  0
Viewed Mass     =  18000.00 mg
Sample Height   =  5    mm
                <    means that the concentration is <  20 ppm
               <2e   means wt% < 2 StdErr. The + in Z+El means involved in Sum=100%
   Z        wt%      StdErr       Z        wt%     StdErr      Z         wt%     StdErr
=========================   =========================   =========================
SumBe..F    0        0.043     29 Cu       <                51 Sb        <
11+Na       0.046    0.010     30+Zn       0.008   0.003    52 Te        <
12 Mg       <                  31 Ga       <                53 I         <
13+Al       3.73     0.09      32 Ge       <                55 Cs        <
14+Si       0.63     0.03      33 As       <                56 Ba        <

15+P        0.0051   0.0005    34+Se       0.006   0.002    SumLa..Lu    0.10    1.19
16+S        0.0086   0.0008    35 Br       <                72+Hf        0.036   0.008
16 So                          37 Rb       <                73+Ta        <
17+Cl       0.0050   0.0009    38 Sr       <                74+W         <
18 Ar       <                  39 Y        <                75+Re        0.054   0.007

19 K        <                  40+Zr       2.05    0.07     76 Os        <
20+Ca       0.0038   0.0008    41 Nb       <                77 Ir        <2e     0.006
21 Sc       <                  42+Mo       <                78 Pt        <
22 Ti       <2e      0.001     44 Ru       <                79 Au        <2e     0.005
23+V        <                  45+Rh       0.004   0.002    80+Hg        <2e     0.005

24 Cr       <                  46 Pd       <                81 Tl        <
25 Mn       <                  47 Ag       <2e     0.002    82 Pb        <
26+Fe       <2e      0.002     48 Cd       <                83 Bi        <
27+Co       0.044    0.004     49 In       <                90 Th        <
28+Ni       93.3     0.1       50 Sn       <                92 U         <

==== Light Elements =====    ==== Noble Elements =====    ===== Lanthanides =======
  4 Be                         44 Ru       <                57 La        <
  5 B                          45+Rh       0.004   0.002    58 Ce        <
  6 C                          46 Pd       <                59 Pr        <
  7 N                          47 Ag       <2e     0.002    60 Nd        <
  8 O                          75+Re       0.054   0.007    62 Sm        <
  9 F        <                 76 Os       <                63 Eu        <
                               77 Ir       <2e     0.006    64 Gd        <
                               78 Pt       <                65 Tb        <
                               79 Au       <2e     0.005    66+Dy        <
                                                            67+Ho        <
                                                            68 Er        <
                                                            69 Tm        <
                                                            70+Yb        <2e     0.26
                                                            71 Lu        <

KnownConc= 0                    REST= 0                    D/S= 0
Sum Conc's before normalisation to 100% :   98.3 %
```

```
                                ANALYSIS REPORT                    by Uniquant
--------------------------------------------------------------------------------
OLD.186
Spectrometers configuration:  ARL 8410 Rh 60kV LiF220 LiF420 Ge111 TlAP
Sample ident    =  14-01-21      RADIAL
Kappa list      =  15-Nov-94
Calculated as   :  Elements      Spectral impurity data : CAL.909 Teflon
X-ray path      =  Vacuum        Film type    = No supporting film
Case number     =  0    Known Area, %Rest, Diluent/Sample and Mass/Area
Eff.Diam.       =  25.00 mm      Eff.Area     = 490.6 mm2
KnownConc       =  0    %
Rest            =  0    %
Dil/Sample      =  0
Viewed Mass     =  18000.00 mg
Sample Height   =  5   mm
            <     means that the concentration is <  20 ppm
           <2e    means wt% < 2 StdErr. The + in Z+El means involved in Sum=100%
  Z        wt%       StdErr       Z         wt%      StdErr      Z         wt%      StdErr
========================== ========================== ==========================
SumBe..F    0       0.043      29 Cu        <                  51 Sb       <
11+Na      0.060    0.010      30+Zn       0.006    0.003      52 Te       <
12 Mg       <                  31 Ga       <2e      0.002      53 I        <2e     0.002
13+Al      3.12     0.08       32 Ge        <                  55 Cs       <
14+Si      0.72     0.04       33 As        <                  56 Ba       <

15+P       0.0072   0.0006     34+Se       0.007    0.002      SumLa..Lu   0.13    1.18
16+S        <                  35 Br        <                  72+Hf       0.067   0.008
16 So                          37 Rb        <                  73+Ta       <
17+Cl      0.0025   0.0008     38 Sr        <                  74+W        <
18 Ar       <                  39 Y         <                  75+Re       0.041   0.007

19 K        <                  40+Zr       3.09     0.08       76 Os       <
20+Ca      0.0024   0.0007     41 Nb        <                  77 Ir       <2e     0.005
21 Sc       <                  42+Mo        <                  78 Pt       <2e     0.006
22+Ti      0.0071   0.0010     44 Ru        <                  79 Au       <
23+V        <                  45 Rh        <                  80+Hg       <2e     0.005

24 Cr       <                  46 Pd        <                  81 Tl       <
25 Mn       <                  47 Ag       <2e      0.002      82 Pb       0.005   0.002
26 Fe       <                  48 Cd        <                  83 Bi       <
27+Co      0.043    0.004      49 In        <                  90+Th       <2e     0.004
28+Ni     92.7      0.1        50 Sn        <                  92 U        <2e     0.003

==== Light Elements =====     ==== Noble Elements =====     ===== Lanthanides =======
 4 Be                          44 Ru        <                  57+La      0.008    0.004
 5 B                           45 Rh        <                  58 Ce       <
 6 C                           46 Pd        <                  59 Pr       <
 7 N                           47 Ag       <2e      0.002      60 Nd       <
 8 O                           75+Re       0.041    0.007      62 Sm       <
 9 F        <                  76 Os        <                  63 Eu       <2e     0.001
                               77 Ir       <2e      0.005      64 Gd       <
                               78 Pt       <2e      0.006      65 Tb       <
                               79 Au        <                  66+Dy       <
                                                               67+Ho       <
                                                               68 Er       <
                                                               69 Tm       <
                                                               70+Yb       <2e     0.26
                                                               71 Lu       <

KnownConc= 0                     REST= 0                      D/S= 0
Sum Conc's before normalisation to 100% :    98.4 %
```

```
                         ANALYSIS REPORT                      by Uniquant
------------------------------------------------------------------------------
OLD.187
Spectrometers configuration:  ARL 8410 Rh 60kV LiF220 LiF420 Ge111 TlAP
Sample ident    =  14-04-02    AXIAL
Kappa list      =  15-Nov-94
Calculated as : Elements     Spectral impurity data : CAL.909 Teflon
X-ray path     =  Vacuum       Film type    = No supporting film
Case number    =  0    Known Area, %Rest, Diluent/Sample and Mass/Area
Eff.Diam.      =  25.00 mm      Eff.Area     = 490.6 mm2
KnownConc      =  0    %
Rest           =  0    %
Dil/Sample     =  0
Viewed Mass    =  18000.00 mg
Sample Height  =  5   mm
            <     means that the concentration is <  20 ppm
            <2e   means wt% < 2 StdErr. The + in Z+El means involved in Sum=100%
  Z        wt%     StdErr    Z            wt%    StdErr    Z             wt%    StdErr
========================  ==========================  ============================
SumBe..F    0      0.021    29+Cu        0.025   0.002    51 Sb         <
11+Na       0.019  0.002    30+Zn        <                52 Te         <
12+Mg       0.011  0.004    31 Ga        <                53 I          <
13+Al      93.3    0.1      32 Ge        <                55 Cs         <
14+Si       6.4    0.1      33 As        <                56+Ba         <2e    0.004

15+P        0.016  0.001    34 Se        <                SumLa..Lu     0.006  0.017
16+S        0.045  0.004    35 Br        <                72+Hf         0.0042 0.0010
16 So                       37 Rb        <                73 Ta         <
17+Cl       0.029  0.003    38 Sr        <                74+W          0.014  0.001
18 Ar       <               39 Y         <                75 Re         <

19+K        0.0042 0.0010   40 Zr        <                76 Os         <
20+Ca       0.039  0.003    41 Nb        <                77 Ir         <
21 Sc       <               42 Mo        <                78 Pt         <
22+Ti       0.082  0.007    44 Ru        <                79 Au         <
23+V        <               45 Rh        <                80 Hg         <

24+Cr       <               46 Pd        <                81 Tl         <
25+Mn       <               47+Ag        0.0021  0.0007   82 Pb         <
26+Fe       0.028  0.002    48 Cd        <                83 Bi         <
27+Co       <               49 In        <                90 Th         <
28+Ni       0.0044 0.0005   50 Sn        <                92 U          <

==== Light Elements =====   ==== Noble Elements =====    ===== Lanthanides =======
 4 Be                        44 Ru        <                57 La         <
 5 B                         45 Rh        <                58 Ce         <
 6 C                         46 Pd        <                59 Pr         <
 7 N                         47+Ag        0.0021  0.0007   60 Nd         <
 8 O                         75 Re        <                62 Sm         <
 9 F        <                76 Os        <                63 Eu         <2e    0.001
                             77 Ir        <                64+Gd         <2e    0.001
                             78 Pt        <                65 Tb         <
                             79 Au        <                66 Dy         <
                                                           67 Ho         <
                                                           68 Er         <
                                                           69 Tm         <
                                                           70 Yb         <
                                                           71 Lu         <

KnownConc= 0                   REST= 0                     D/S= 0
Sum Conc's before normalisation to 100% :   80.0 %
```

```
ANALYSIS REPORT                                            by Uniquant
------------------------------------------------------------------------
OLD.188
Spectrometers configuration:  ARL 8410 Rh 60kV LiF220 LiF420 Ge111 TlAP
Sample ident   =  14-04-02      RADIAL
Kappa list     =  15-Nov-94
Calculated as  :  Elements     Spectral impurity data : CAL.909 Teflon
X-ray path     =  Vacuum       Film type     = No supporting film
Case number    =  0   Known Area, %Rest, Diluent/Sample and Mass/Area
Eff.Diam.      =  25.00 mm     Eff.Area      = 490.6 mm2
KnownConc      =  0    %
Rest           =  0    %
Dil/Sample     =  0
Viewed Mass    =  18000.00 mg
Sample Height  =  5  mm
              <    means that the concentration is <  20 ppm
             <2e   means wt% < 2 StdErr. The + in Z+El means involved in Sum=100%
    Z       wt%     StdErr     Z        wt%    StdErr      Z         wt%     StdErr
=========================   =========================   =========================
SumBe..F   0.048   0.020    29+Cu     0.027   0.002    51 Sb        <
11+Na      0.016   0.002    30+Zn     <                52 Te        <
12+Mg      0.012   0.004    31 Ga     <                53 I         <
13+Al      96.13   0.10     32 Ge     <                55+Cs        <2e     0.003
14+Si      3.16    0.08     33 As     <                56+Ba        0.009   0.003

15+P       0.015   0.001    34 Se     <                SumLa..Lu    0.002   0.017
16+S       0.029   0.003    35 Br     <                72+Hf        0.0027  0.0009
16 So                       37 Rb     <                73 Ta        <
17+Cl      0.035   0.003    38 Sr     <                74+W         0.014   0.001
18 Ar      <                39 Y      <                75 Re        <

19+K       0.009   0.001    40 Zr     <                76 Os        <
20+Ca      0.37    0.02     41 Nb     <                77 Ir        <
21 Sc      <                42 Mo     <                78 Pt        <
22+Ti      0.074   0.006    44 Ru     <                79 Au        <
23 V       <                45 Rh     <                80 Hg        <

24+Cr      0.0023  0.0005   46 Pd     <                81 Tl        <
25 Mn      <                47 Ag     <                82 Pb        <
26+Fe      0.027   0.002    48 Cd     <                83 Bi        <
27+Co      <                49 In     <                90 Th        <
28+Ni      0.0046  0.0005   50 Sn     <                92 U         <

==== Light Elements =====   ==== Noble Elements =====  ===== Lanthanides =======
 4 Be                       44 Ru     <                57 La        <
 5 B                        45 Rh     <                58 Ce        <
 6 C                        46 Pd     <                59 Pr        <
 7 N                        47 Ag     <                60 Nd        <
 8 O                        75 Re     <                62 Sm        <
 9+F       0.048   0.020    76 Os     <                63 Eu        <
                            77 Ir     <                64 Gd        <
                            78 Pt     <                65 Tb        <
                            79 Au     <                66 Dy        <
                                                       67 Ho        <
                                                       68 Er        <
                                                       69 Tm        <
                                                       70 Yb        <
                                                       71 Lu        <

KnownConc= 0                          REST= 0                D/S= 0
Sum Conc's before normalisation to 100% :    79.1 %
```

Appendix 3
Tailored Copper Ingot 14-04-05 "HD" Run:
F. W. Bell 4048 Gauss meter readings on the top surface of the bottom section (i.e., internal surface that exhibited attraction).
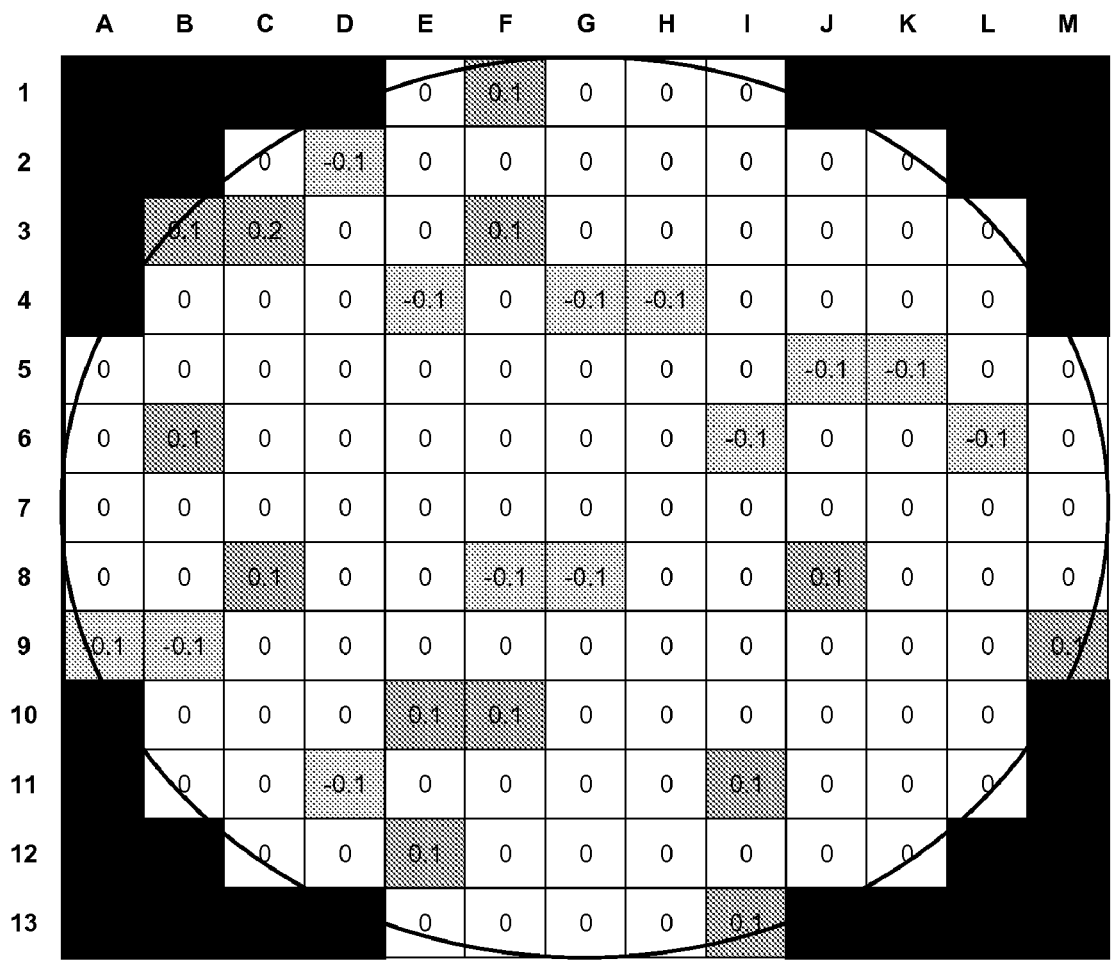
Average 0.019424
Maximum 0.2
Minimum 0
of Absolute Values
Measurements in Gauss

Tailored Copper Ingot 14-02-06 "HA" Run:
F. W. Bell 4048 Gauss meter readings on the top surface of the bottom section (i.e., internal surface that exhibited attraction).
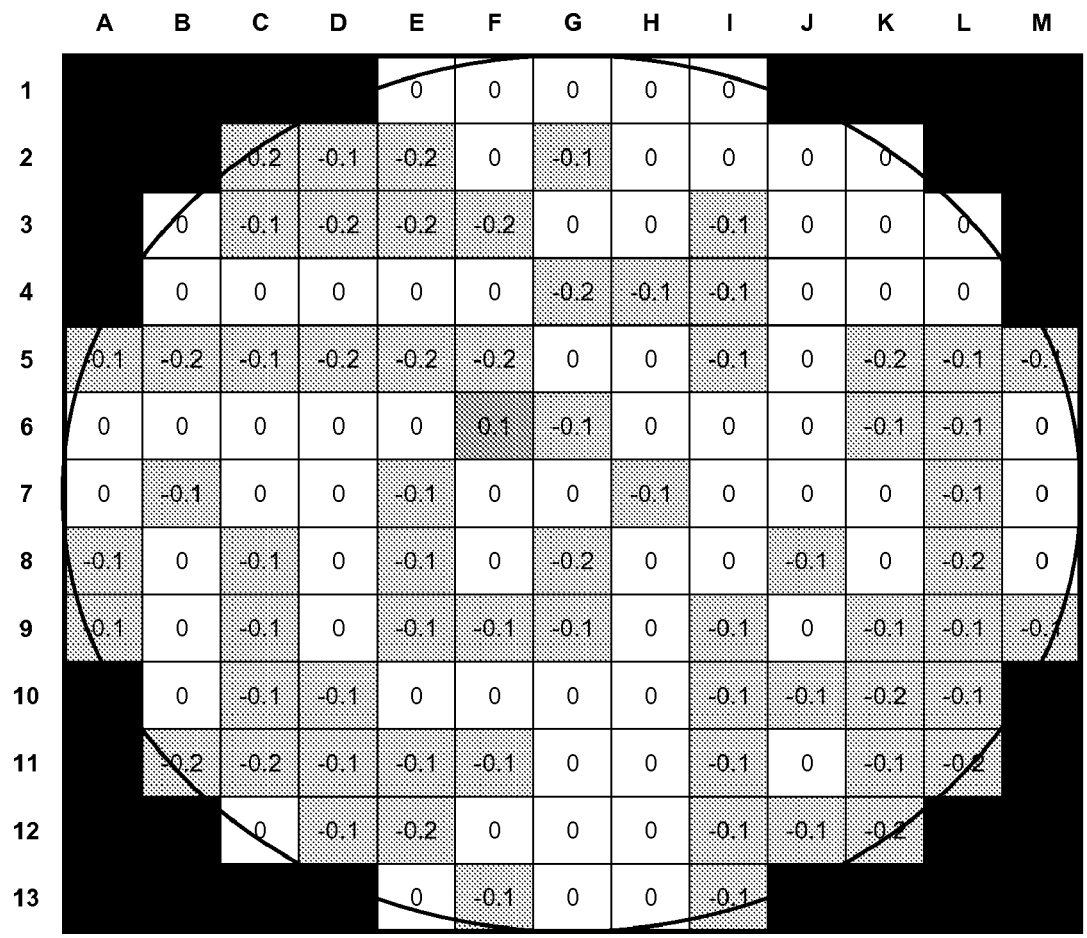
| | Average | 0.061151 |
| --- | --- | --- |
| | Maximum | 0.2 |
| | Minimum | 0 |
| | of Absolute Values | |
Measurements in Gauss

Tailored Copper Ingot 14-03-02 "AB" Run:
F. W. Bell 4048 Gauss meter readings on the top surface of the bottom section (i.e., internal surface that exhibited attraction).
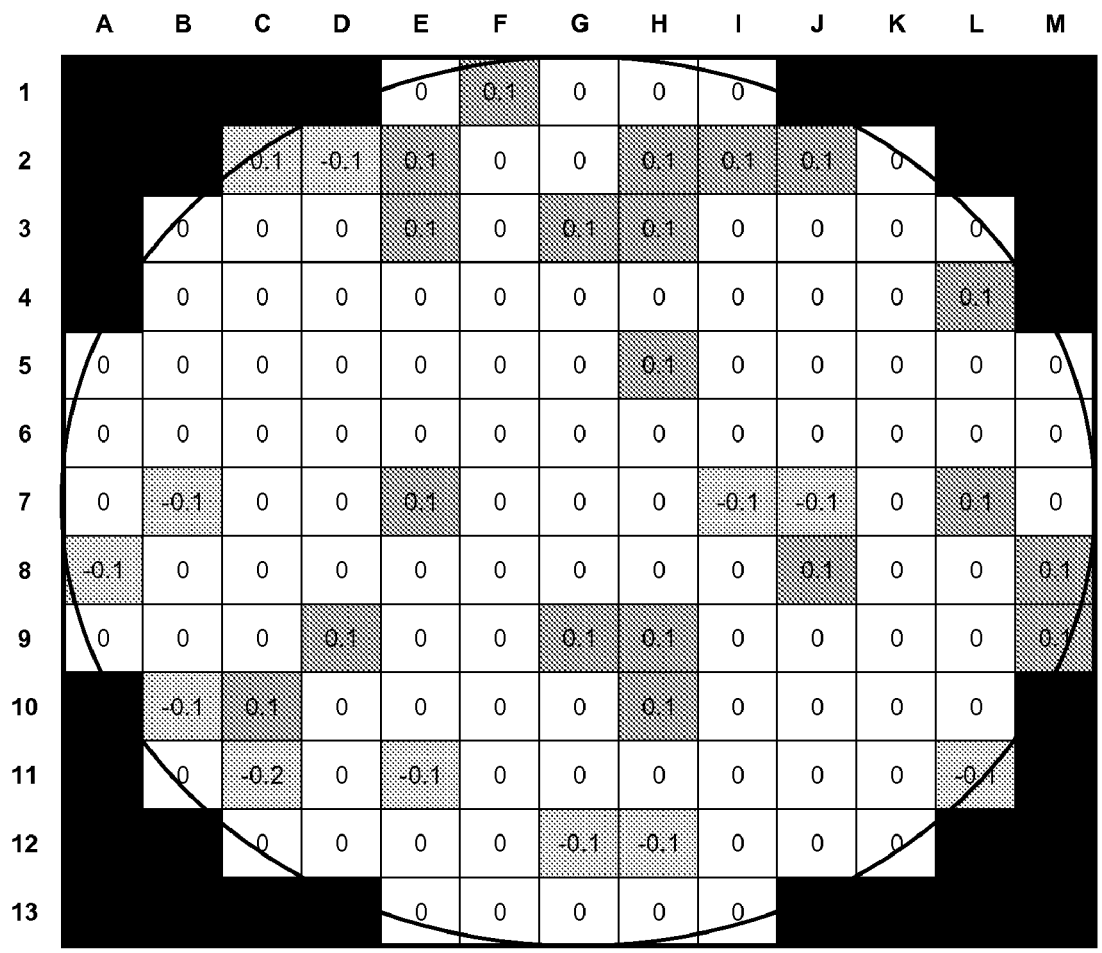
```
Average              0.023741
Maximum                   0.2
Minimum                     0
of Absolute Values
```
Measurements in Gauss

Tailored Alloy Ingot 14-01-21 Ni/Re Alloy "HD" Run:

F. W. Bell 4048 Gauss meter readings on the top surface of the bottom section (i.e., internal surface that exhibited attraction).[1]

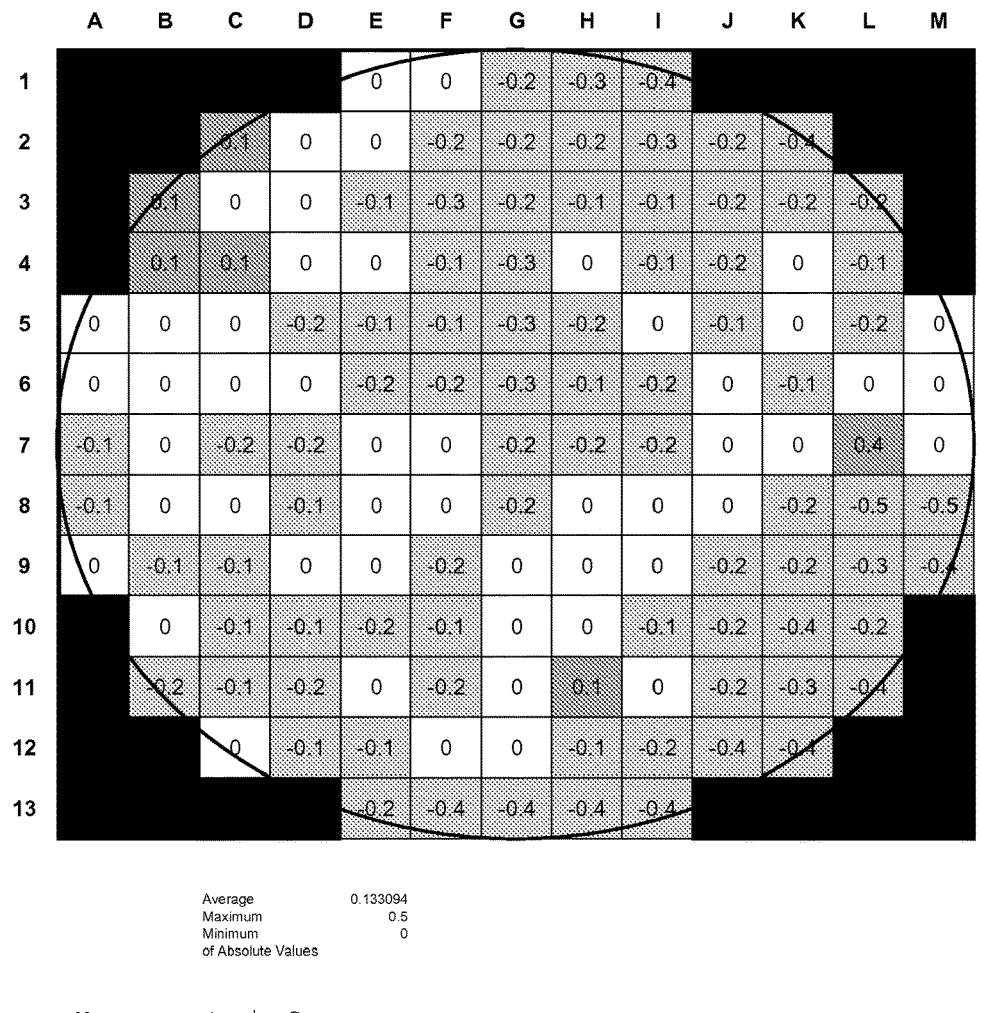

Average 0.133094
Maximum 0.5
Minimum 0
of Absolute Values

Measurements in Gauss

---

[1] The higher absolute values of the magnetic fields observable on this tailored ingot (i.e., 0.5 gauss vs. 0.2 gauss) may be due to the ferromagnetic nature of nickel (i.e., a slight, but measurable alignment of magnetic moments). However, even at an absolute value of 0.5 Gauss, these magnetic field strengths are negligible and comparable to the background levels measured at the earth's surface (0.1-0.5 gauss). The areas exhibiting the highest measurable magnetic fields on these tailored ingots (0.5 Gauss) were specifically measured for material attraction and none was observed (i.e., would not hold Fe filings). The areas with gauss readings of ±0.5 were not the areas that exhibited the greatest attraction.

Tailored Alloy Ingot 14-04-03 Cu/Re/Au/Ag Alloy "HD" Run:
F. W. Bell 4048 Gauss meter readings on the top surface of the bottom section (i.e., internal surface that exhibited attraction).
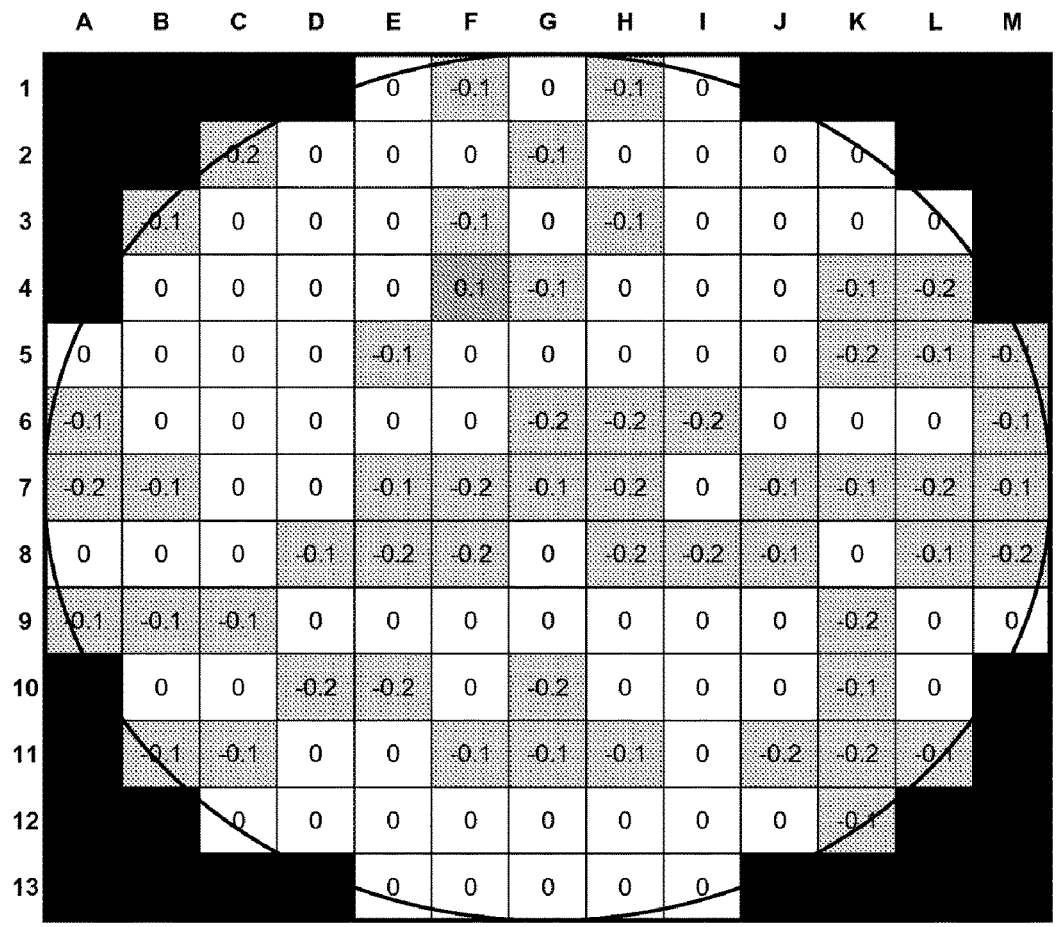
Average 0.054676
Maximum 0.2
Minimum 0
of Absolute Values
Measurements in Gauss

What is claimed is:
1. A method of modifying the electronic structure of a starting material to form a new material or new composition of matter that manifests itself as a transient, adjustable, or permanent change in energy and/or associated properties according to XRF spectrometry analysis, the method comprising the steps of:
- (1.) Melting the starting material in an induction furnace reactor to form a molten material in a process stage by supplying reactor power to the reactor;
- (2.) Adding a carbon source to the starting material and/or to the material in a process stage;
- (3.) Varying the temperature of the material in a process stage between two temperatures over one or more temperature cycles, wherein the material in a process stage remains at a temperature above the melting point during the entire step whereby at least a portion of the material in a process stage forms a tailored material; and
- (4.) Cooling the material in a process stage and/or the tailored material to room temperature;

the improvements comprising the steps of:
- (a) during one or more of steps (1.) to (4.) exposing at least one gas or gaseous addition to a radiation source and adding said gas or gaseous addition during one or more of the above steps; and/or during one or more of steps (1.) to (4.) exposing the starting material and/or the material in a process stage to a radiation source that is in addition to any thermal or background radiation, wherein said radiation source is selected from the group consisting of short arc lamps, high intensity discharge lamps, pencil lamps, lasers, light emitting diodes, a radiation source emitting wavelengths consisting of infrared wave lengths, a radiation source emitting wave lengths consisting of ultraviolet wave lengths, a radiation source emitting wave lengths consisting of long wave ultraviolet wave lengths and/or halogen lamps; and,
- (b) during step (4.), varying the reactor power between two power levels over ½, one or more cycles.

2. The method of claim 1, further comprising one or more of the following additional steps, in one or more iterations or cycles:
- (5.) Adding a flow of a gas through the starting material and/or the material in a process stage;
- (6.) Varying the temperature of the material in a process stage between two temperatures over one or more cycles, wherein the material in a process stage remains at a temperature above the melting point during the entire step;
- (7.) Adding a carbon source to the starting material and/or to the material in a process stage; and/or
- (8.) Holding the starting material and/or the material in a process stage with optional gas addition.

3. The method of claim 2, further comprising one or more of the following additional steps, in one or more iterations or cycles:
- (9.) Lowering the temperature of the molten material in a process stage, wherein the material in a process stage becomes supersaturated with carbon;
- (10.) Varying the temperature of the material in a process stage between two temperatures over one or more cycles, wherein supersaturation with carbon is maintained and the material in a process stage remains at a temperature above the melting point during the entire step, optionally in the presence of gas addition during the entire step or any portion of the step including during one or more or all of the steps wherein temperature increases or decreases;
- (11.) Holding the material in a process stage at a selected temperature, optionally in the presence of gas addition; and/or
- (12.) Cooling the tailored material, such that the tailored material continues to be supersaturated with carbon and the material remains at a temperature above the melting point, optionally in the presence of gas addition.

4. The method of claim 3, wherein steps 9, 10 and/or 11 are repeated at least one time.

5. The method of claim 3, wherein steps 9, 10 and/or 11 are repeated at least four times.

6. The method of claim 1, wherein a gas is added to the starting material and/or to the material in a process stage, and the gas comprises a combination of at least two of the following gases: hydrogen, helium, nitrogen, neon, argon, and krypton.

7. The method of claim 1, wherein during one or more of steps (1.) to (4.) a gas that has been exposed to radiation is added to the starting material and/or to the material in a process stage.

8. The method of claim 7, wherein the radiation is supplied by a pencil lamp.

9. The method of claim 7, wherein the radiation is supplied by a high intensity discharge lamp.

10. The method of claim 7, wherein the radiation is supplied by a short arc lamp.

11. The method of claim 7, wherein multiple radiation sources are used in combination.

12. The method of claim 1, wherein during one or more of steps (1.) to (4.) electric current is added to the starting material and/or to the material in a process stage.

13. The method of claim 12, wherein the current is AC.

14. The method of claim 12, wherein the current is DC.

15. A method according to claim 1 wherein the temperature cycles of step (3.) comprise sweep cycles consisting of a sweep-up increase in the energy/temperature level and a sweep-down decrease in the energy/temperature level, each lasting from about 2 mins. to about 90 mins.

16. A method according to claim 15 wherein a sweep cycle is symmetric.

17. A method according to claim 15 wherein a sweep cycle is asymmetric.

18. A method of modifying the electronic structure of a starting material to form a new material or new composition of matter that manifests itself as a transient, adjustable, or permanent change in energy and/or associated properties according to XRF spectrometry analysis, the method comprising the steps of:
- (1.) Melting the starting material in an induction furnace reactor to form a process material by supplying reactor power to the reactor;
- (2.) Adding a carbon source to the starting material and/or the process material;
- (3.) Varying the temperature of the process material between two temperatures over one or more temperature cycles, wherein the process material remains at a temperature above the melting point during the entire step to form at least in part a tailored material; and
- (4.) Cooling the tailored material to a temperature above but close to a solidification temperature $T_{solidus}$ and thereafter varying the reactor power to the reactor over multiple heating/cooling cycles by providing a sequence of power pulses, each introduced with a single continuous up/down sweep from normal holding power, to effect gradual, controlled cooling of the tailored material to temperatures that gradually approach and reach $T_{solidus}$, and subsequently cooling the material to below $T_{solidus}$.

19. A method according to claim 18, further comprising a step of adding at least one gas to the process material through a lance set at a level above the level of melted process material.

20. A method according to claim 18, further comprising a step of adding at least one gas or gaseous mixture to the process material.

21. A method according to claim 18, further comprising a step of adding at least one gas or gaseous mixture to the process material wherein the gas or gaseous mixture has been exposed to radiation.

22. A method according to claim 18, further comprising a step of adding electric current to the process material during any of the other steps.

23. A method according to claim 18, further comprising a cooling step during which a gas is added to the process material.

24. A method according to claim 18, further comprising a cooling step during which the tailored material is quenched with water that is not stirred.

25. A method according to claim 18, further comprising a step of adding at least one form of radiation that has been filtered to the process material.

26. A method according to claim 18, further comprising a step in which the process material is exposed to radiation during one or more of the other steps.

27. A method according to claim 18 wherein the temperature cycles of step (3.) and/or step (4.) comprise sweep cycles consisting of a sweep-up increase in the energy/temperature level and a sweep-down decrease in the energy/temperature level, each lasting from about 2 mins. to about 90 mins.

28. A method according to claim 27 wherein a sweep cycle is symmetric.

29. A method according to claim 27 wherein a sweep cycle is asymmetric.

30. A method of modifying the electronic structure of a starting material to form a new material or new composition of matter that manifests itself as a transient, adjustable, or permanent change in energy and/or associated properties according to XRF spectrometry analysis, the method comprising the steps of:
   (1.) Melting the starting material in an induction furnace reactor to form a process material by supplying reactor power to the reactor;
   (2.) Adding a carbon source to the starting material and/or the process material;
   (3.) Varying the temperature of the process material between two temperatures over one or more temperature cycles, wherein the process material remains at a temperature above the melting point during the entire step to form at least in part a tailored material; and
   (4.) Cooling the tailored material to a temperature above but close to a solidification temperature $T_{solidus}$ and thereafter varying the power to the reactor over multiple heating/cooling cycles by providing a sequence of power pulses, each introduced with a single continuous up/down sweep from normal holding power, to effect gradual, controlled cooling of the tailored material to temperatures that gradually approach and reach $T_{solidus}$ while maintaining a temperature lowering rate of no more than 3° F./hr., and subsequently cooling the material to below $T_{solidus}$.

31. A method according to claim 30 wherein the temperature cycles of step (3.) and/or step (4.) comprise sweep cycles consisting of a sweep-up increase in the energy/temperature level and a sweep-down decrease in the energy/temperature level, each lasting from about 2 mins. to about 90 mins.

32. A method according to claim 30 wherein a sweep cycle is symmetric.

33. A method according to claim 30 wherein a sweep cycle is asymmetric.

\* \* \* \* \*